Figure 1A:
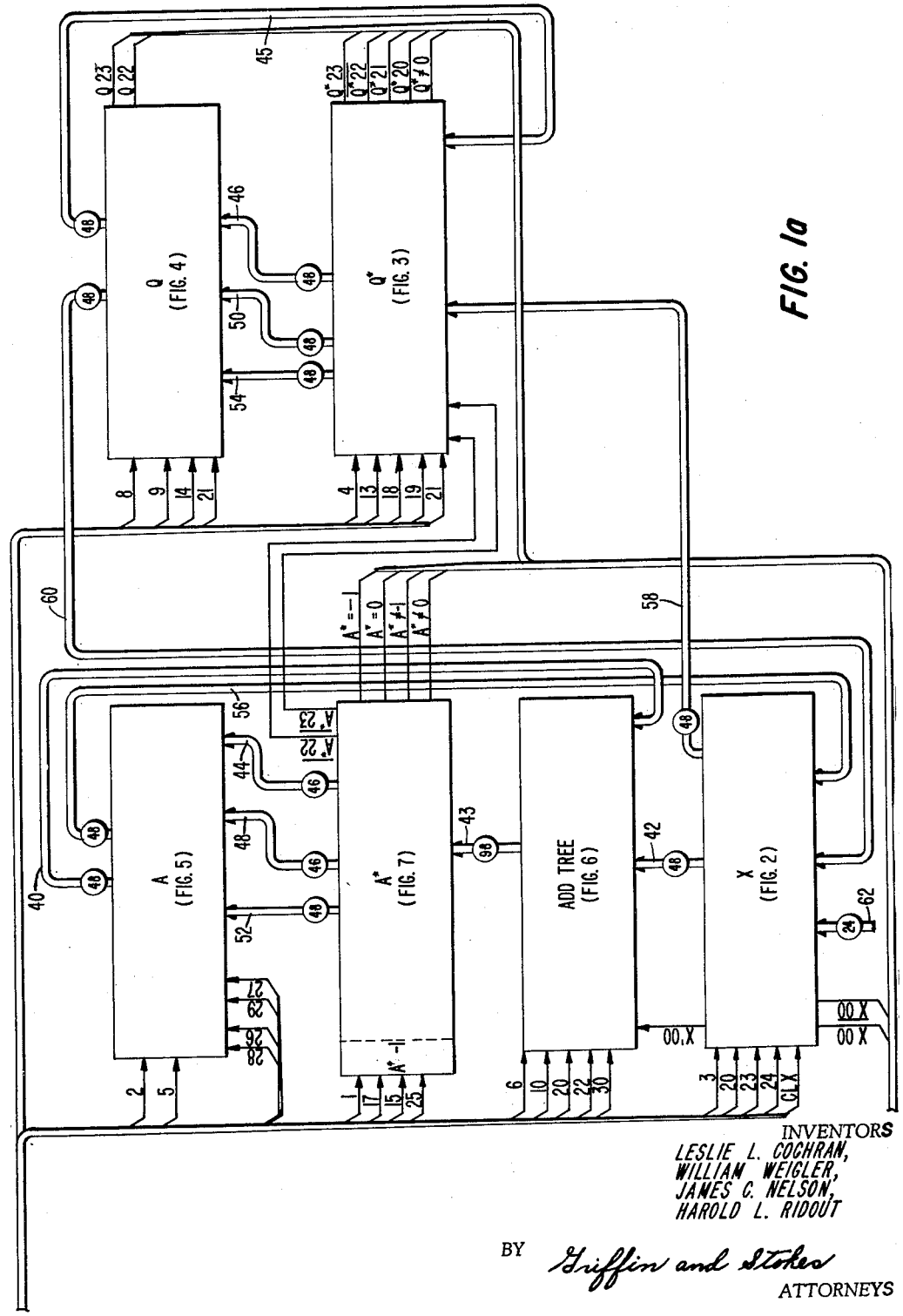

INVENTORS
LESLIE L. COCHRAN,
WILLIAM WEIGLER,
JAMES C. NELSON,
HAROLD L. RIDOUT
BY Griffin and Stokes
ATTORNEYS

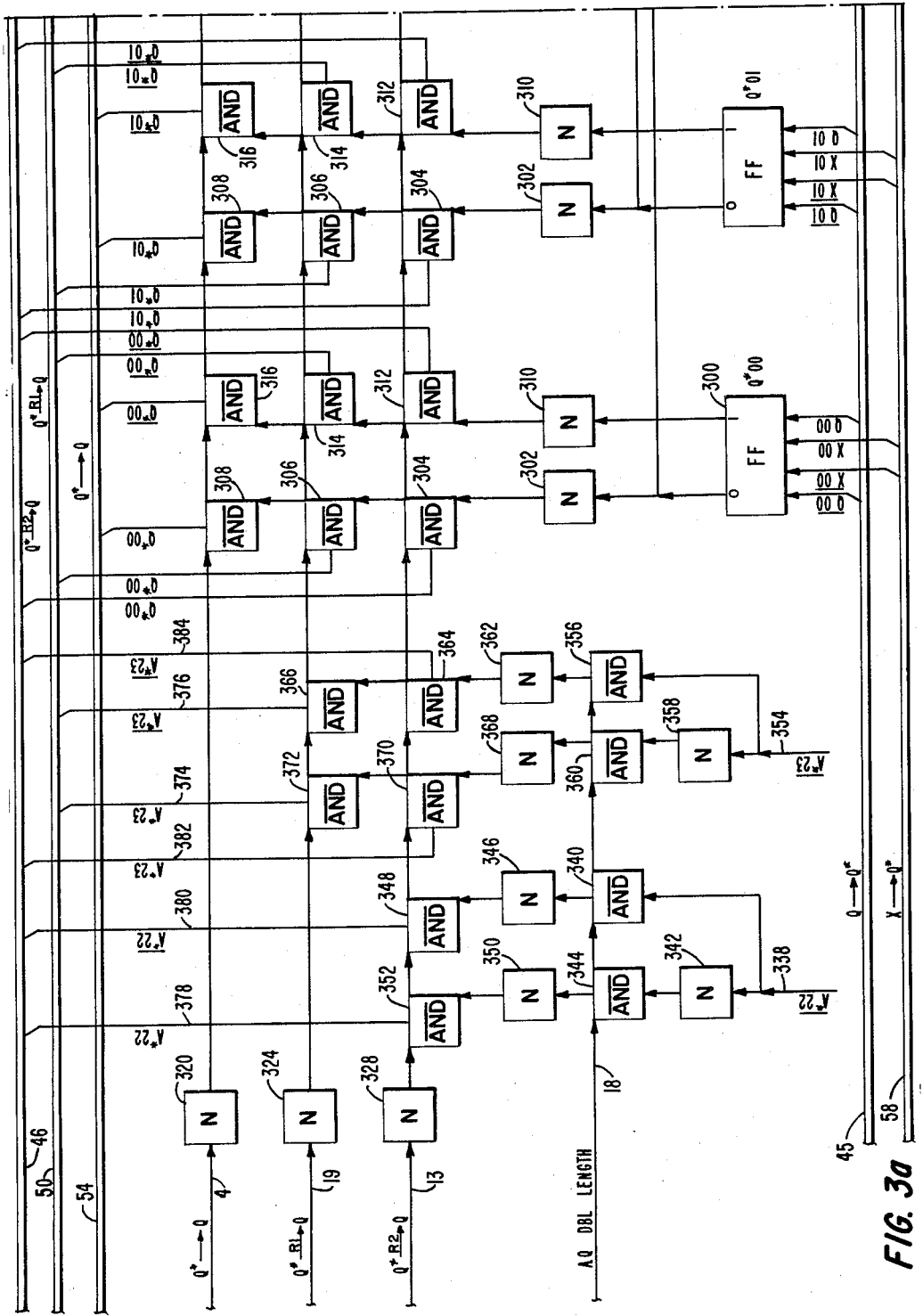

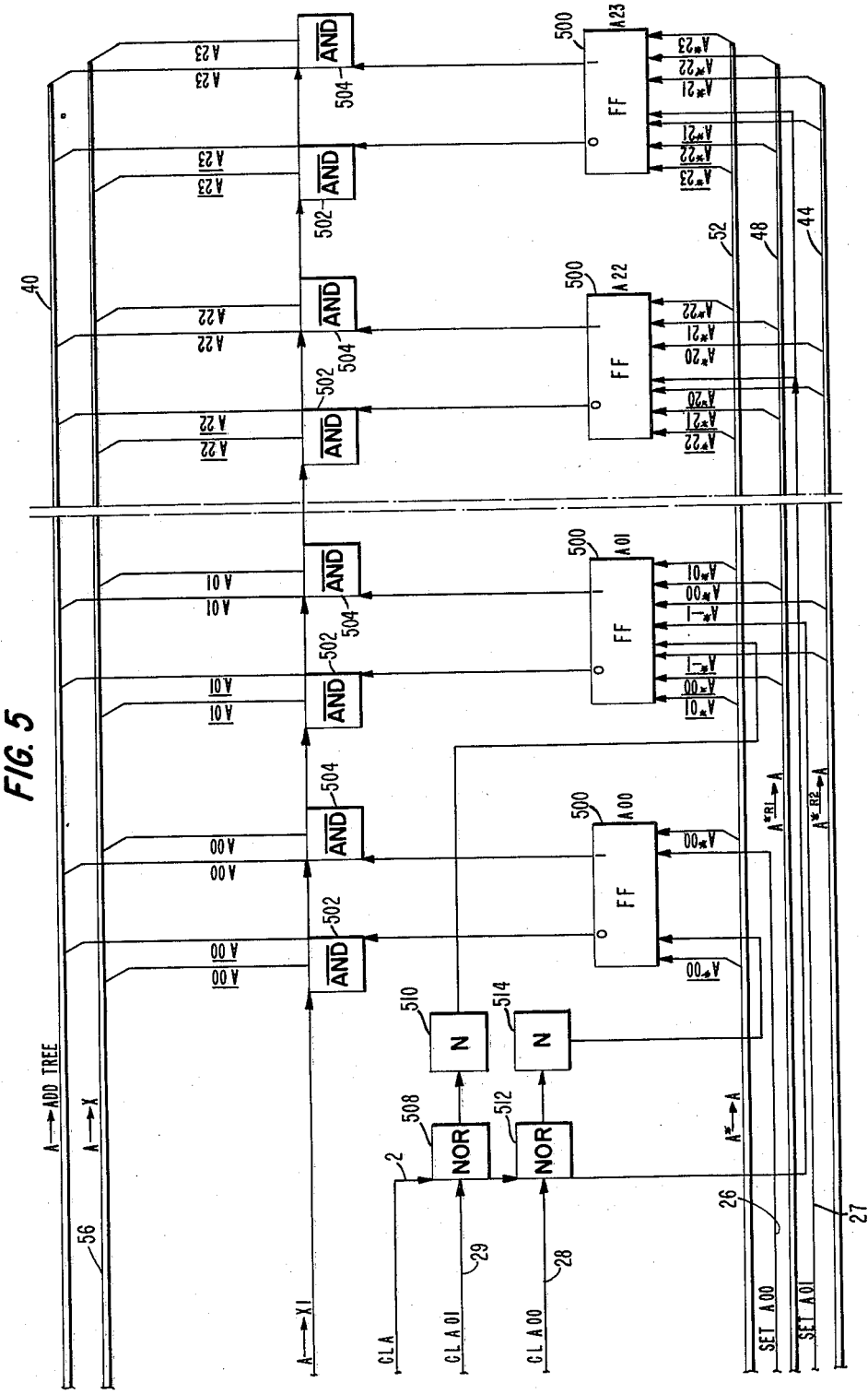

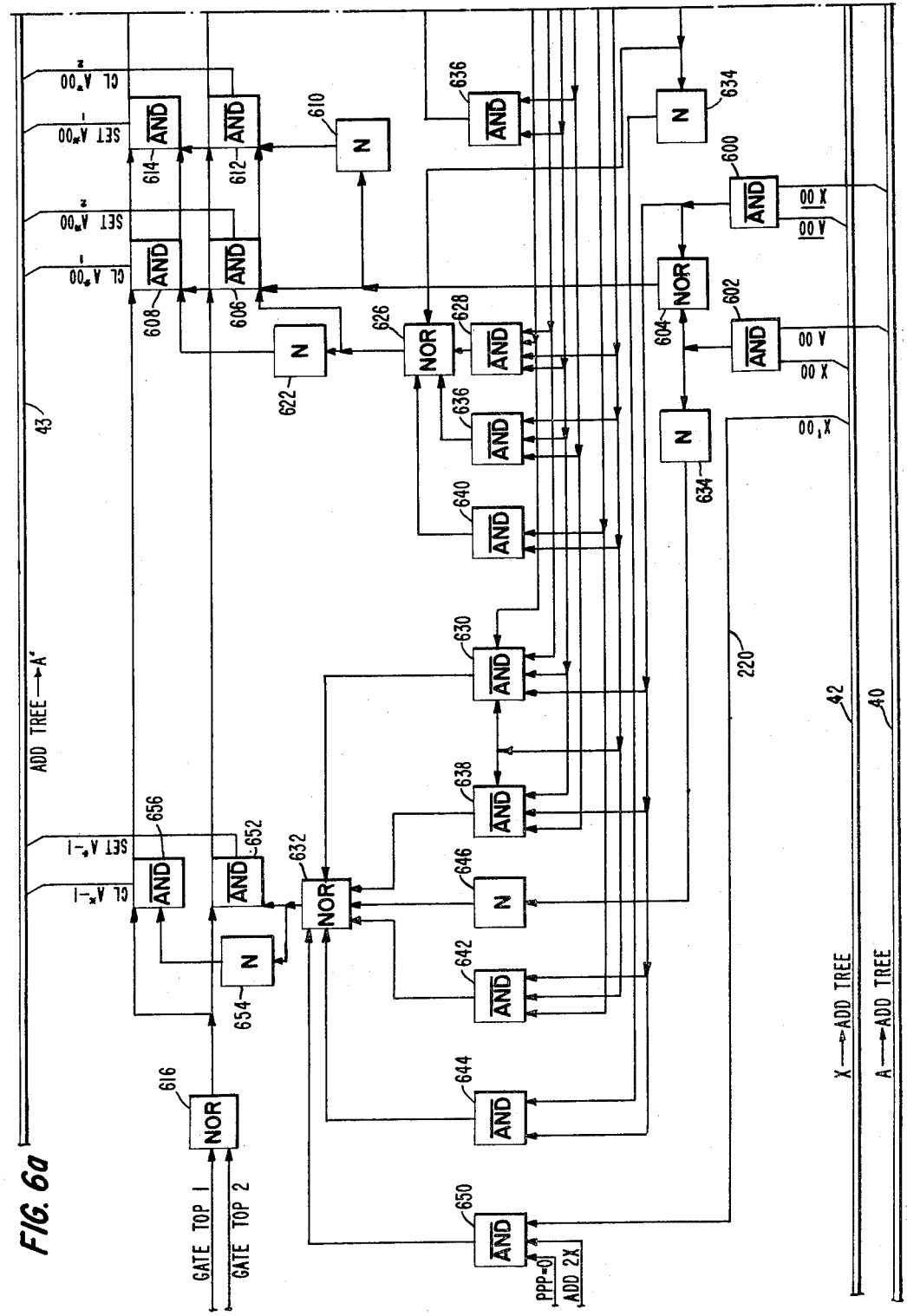

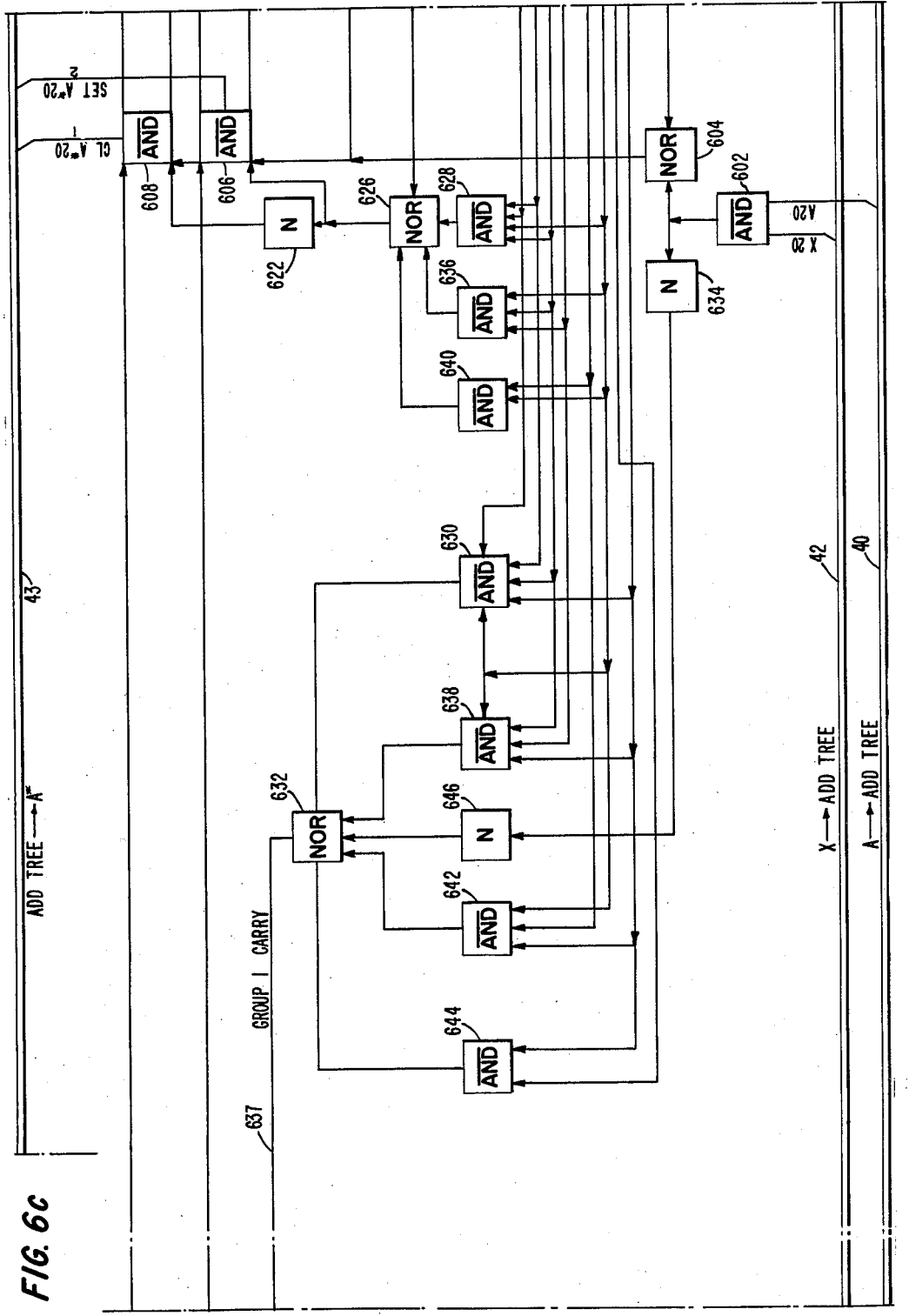

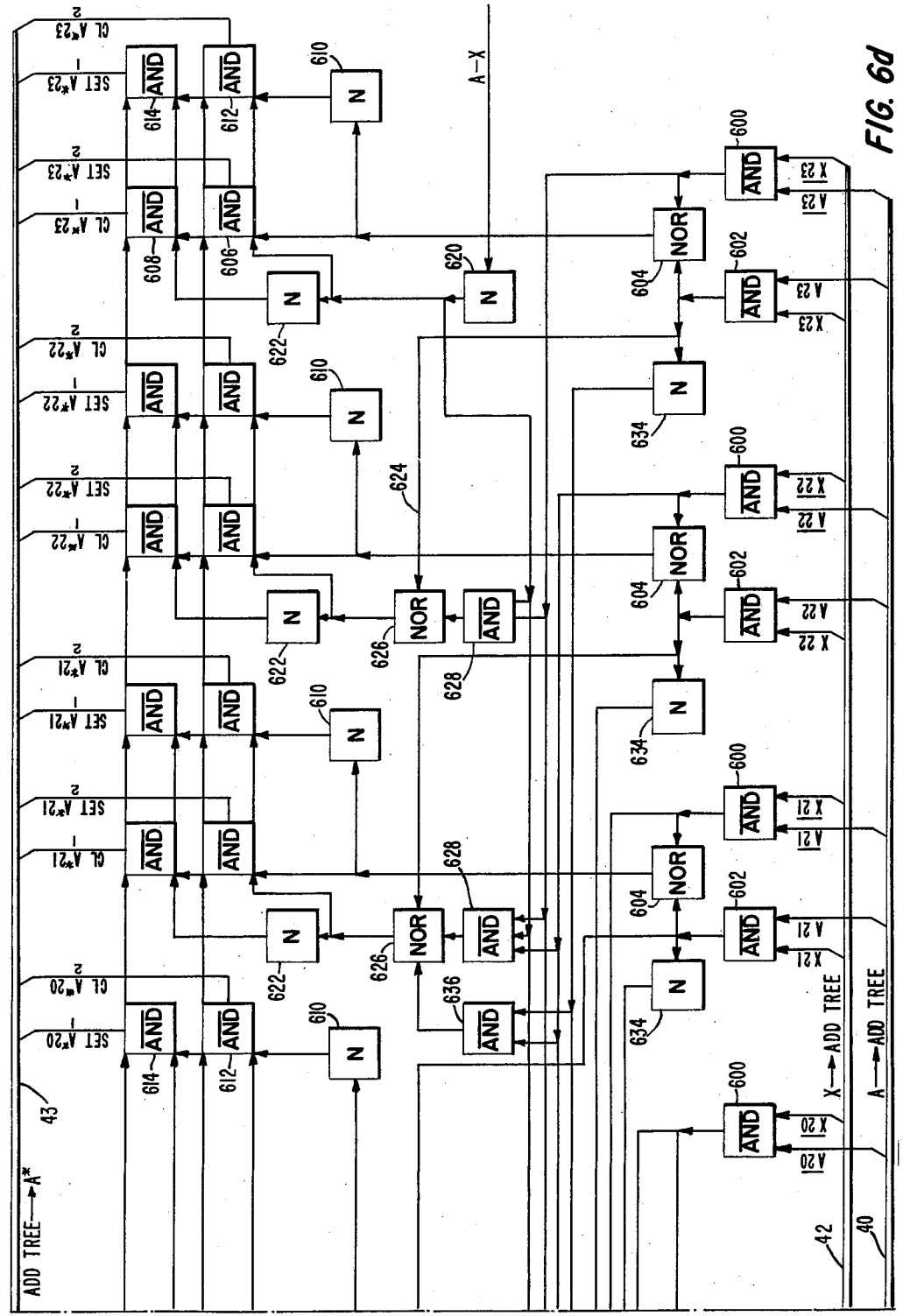

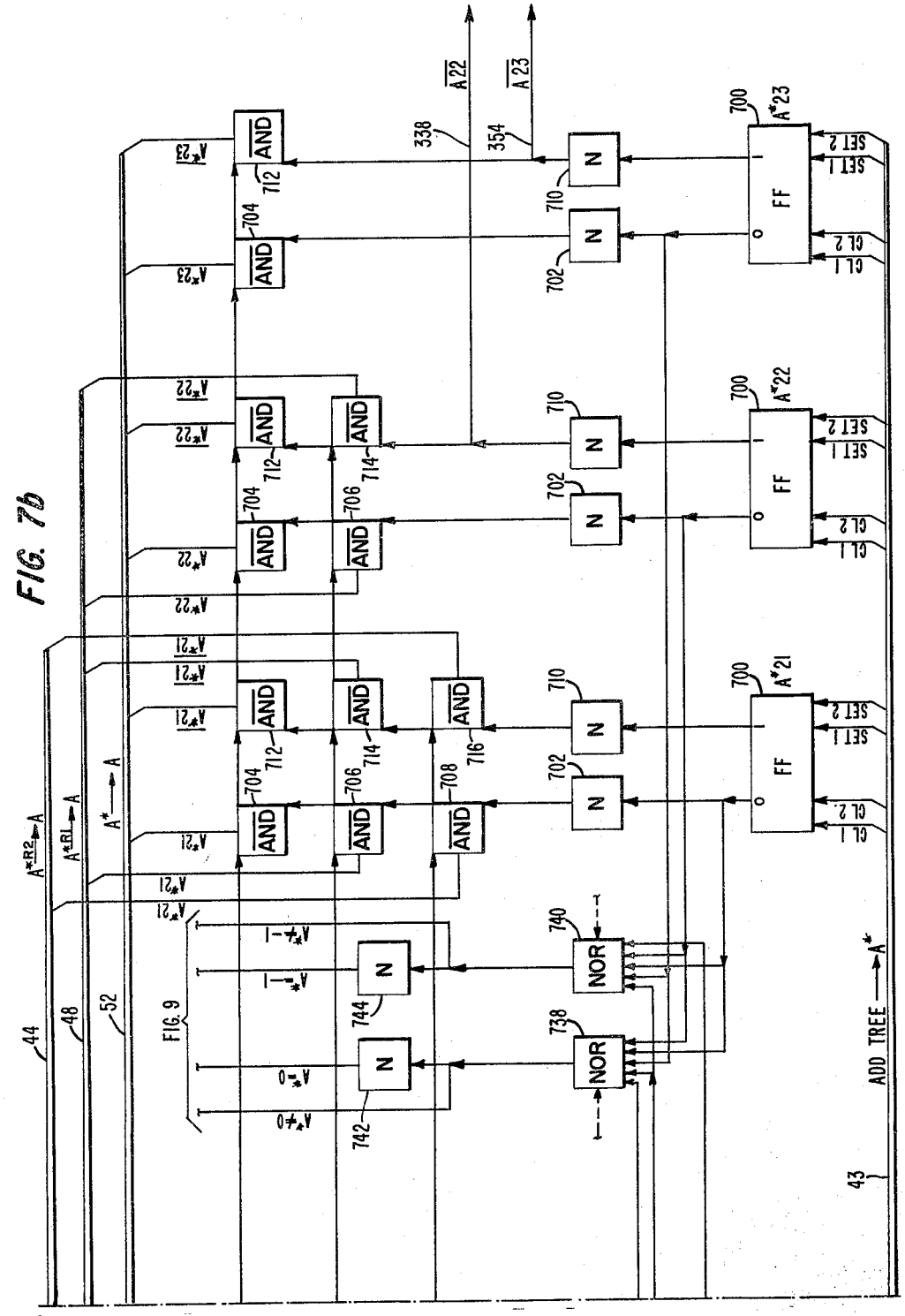

June 29, 1965  L. L. COCHRAN ETAL  3,192,366
FAST MULTIPLY SYSTEM
Filed Aug. 30, 1961  22 Sheets-Sheet 19

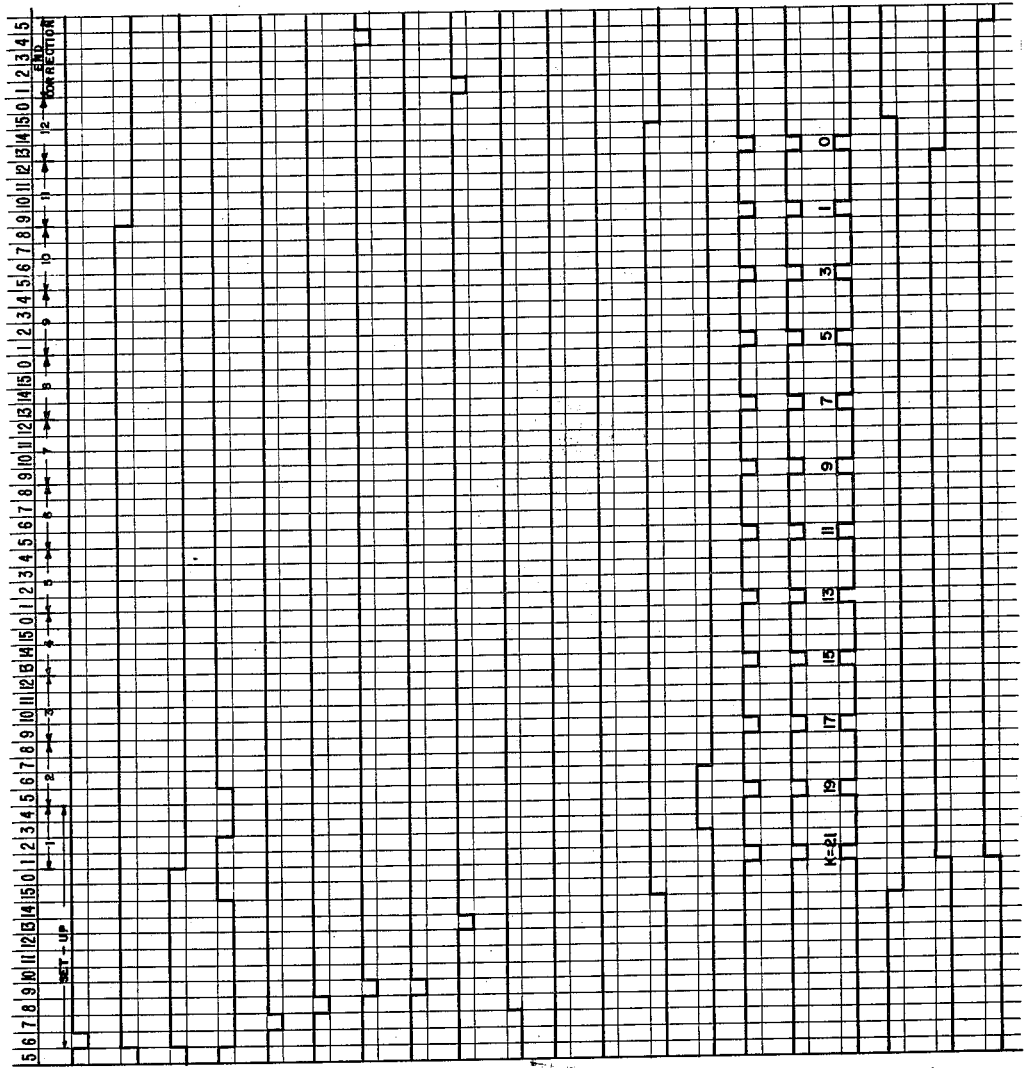

United States Patent Office 3,192,366
Patented June 29, 1965

3,192,366
FAST MULTIPLY SYSTEM
Leslie L. Cochran, Minneapolis, William Weigler, St. Paul, James C. Nelson, Rosemount, and Harold L. Ridout, Minneapolis, Minn., assignors to Sperry Rand Corporation, New York, N.Y., a corporation of Delaware
Filed Aug. 30, 1961, Ser. No. 134,945
17 Claims. (Cl. 235—164)

The present invention relates to binary multipliers and more particularly to parallel binary multipliers of the type wherein an N-bit multiplicand is multiplied by an N-bit multiplier in $N/2$ iterative cycles. The invention provides a multiplier wherein multiplication is accomplished in $N/2$ iterative cycles utilizing a single 2-input adder for performing the interative arithmetic operations. This is accomplished in part by sensing the multiplier digits in pairs.

In an effort to speed up multiplication operations, some devices of the prior art sense several multiplier digits simultaneously. The partial products developed are added in pairs in separate adders and the sums then added in pairs until a single sum representing the product is obtained. While this approach reduces the time required for the multiplication, it materially increases the complexity and cost of the multiplication unit.

Other devices of the prior art speed up the multiplication operation by taking advantage of the configuration of bits within the multiplier. These devices are number sensitive in that the configuration of bits determines the time required for the multiply operation. The advantage of these devices is lost when they are incorporated into a real-time system where allowance must be made for the possible occurrence of the worst configuration of binary bits requiring the longest multiplication time.

Therefore, a general object of this invention is to provide a multiplier which performs a complete multiplication of an N-bit multiplicand and an N-bit multiplier in $N/2$ iterative cycles.

An object of this invention is to provide a binary parallel multiplier having a single add tree for performing the multiplication of two N-bit numbers in $N/2$ iterative cycles.

An object of this invention is to provide a multiplier having only one add tree for performing the multiplication of two signed numbers in $N/2$ iterative cycles, N being the number of bits including sign in the multiplier.

A feature of the present invention is the provision of means for sensing two multiplier digits simultaneously whereby either 0, 1, 2, or 3 times the multiplicand may be added to the partial product. With a single add tree it is not possible to add three times the multiplicand during the arithmetic portion of a single iterative cycle. The present invention accomplishes this by subtracting one times the multiplicand during one iteration, shifting the partial product to the right two binary places, and then adding one times the multiplicand on the next iterative cycle. Shifting two binary places to the right and then adding the multiplicand is equivalent to adding four times the multiplicand before shifting. Thus, the present multiplier operates on a psuedo modulo 4 basis.

A further object of the invention is to provide means responsive to first and second pairs of multiplier digits for indicating whether 0, 1, 2, or 3 times the multiplicand is to be added to the partial product on the next iteration cycle. The first pair of multiplier digits are the digits of the preceding iteration and indicate whether one times the multiplicand must be added on the next cycle to complete the addition of three times the multiplicand carried over from the preceding cycle. The second pair of digits corresponds to the multiplier digits of the next iteration cycle and indicate whether 0, 1, 2, or 3 times the multiplicand must be added. The indications of the two pairs of digits are combined to produce a resultant indication which controls the arithmetic operation during the next iteration.

Another object of the invention is to provide a multiplier comprising a double length register for initially storing a multiplier and subsequently storing the accumulated partial products, a register for storing a multiplicand, an arithmetic unit, a storage register, means responsive to the two low order digits of said double length register for controlling the addition of 0, 1, or 2 times the multiplicand or the complement of the multiplicand to the partial product in the arithmetic unit, and means for shifting the result of each arithmetic operation as the result is transferred from the storage register to the double length register.

An object of this invention is to provide a multiplier-product register, a multiplicand register, an arithmetic unit, means for sensing the low order pair of multiplier digits to control the addition of 0, 1 or 2 times the multiplicand or the complement of the multiplicand to the high order positions of the multiplier-product register, and means for shifting the new partial product and the multiplier to the right two places as they are entered into the multiplier-product register.

There are several special conditions under which the result of the multiplication is known before the multiplication is performed. If either one or both operands are 0, then the product is 0. If either operand is $-1$, then the product is the complement of the other operand. If these conditions are recognized in advance, the normal multiplication need not be executed thus resulting in a considerable saving in time.

Therefore, a further object of this invention is to provide means responsive to an indication that one or both operands are 0 or $-1$ for performing a shortened multiply operation. Special note should be given to the case where both operands are $-1$. In the present invention numbers are represented as binary fractions with the binal point to the left of the most significant digit. A sign digit, 0 for plus and 1 for minus, is located to the left of the binal point. Negative numbers are stored in two's complement form. Thus, for the case where both operands are $-1$ the product is $+1$ which is outside the range of representation ($1 > X \geq -1$). In this case the multiply circuits perform a shortened multiplication operation and emit a signal indicating an error condition.

Figure 1B:
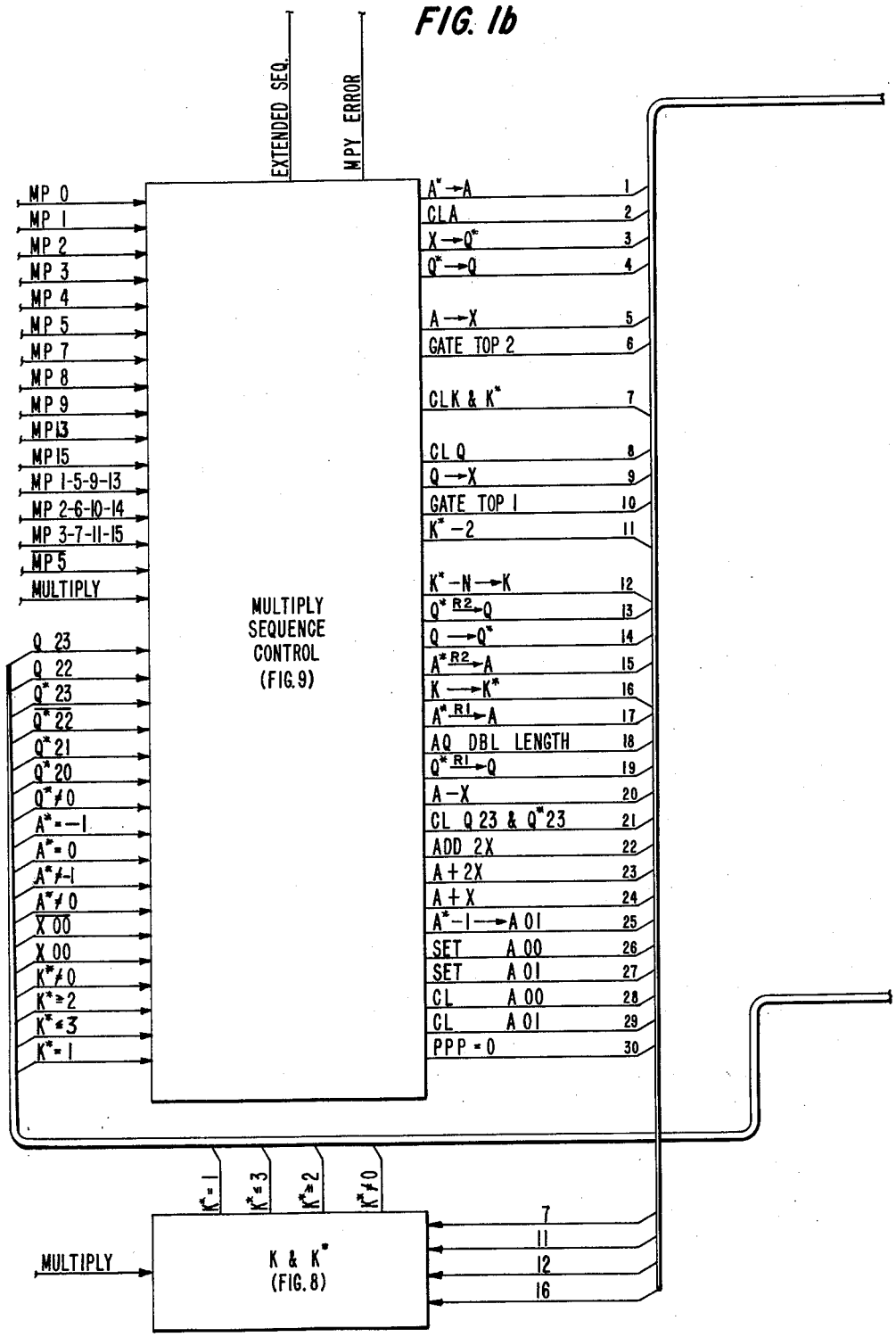
Figure 2:
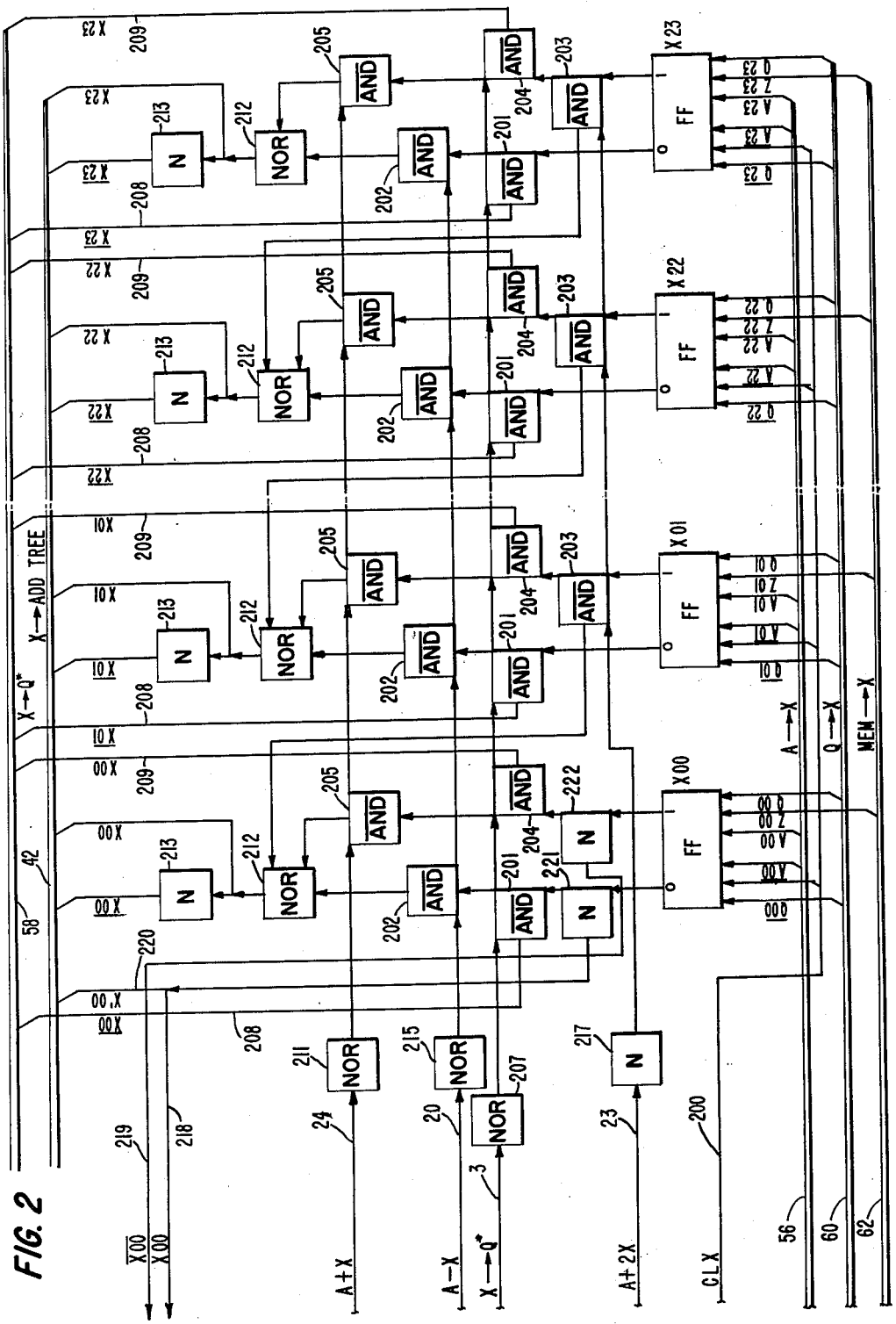
Figure 3B:
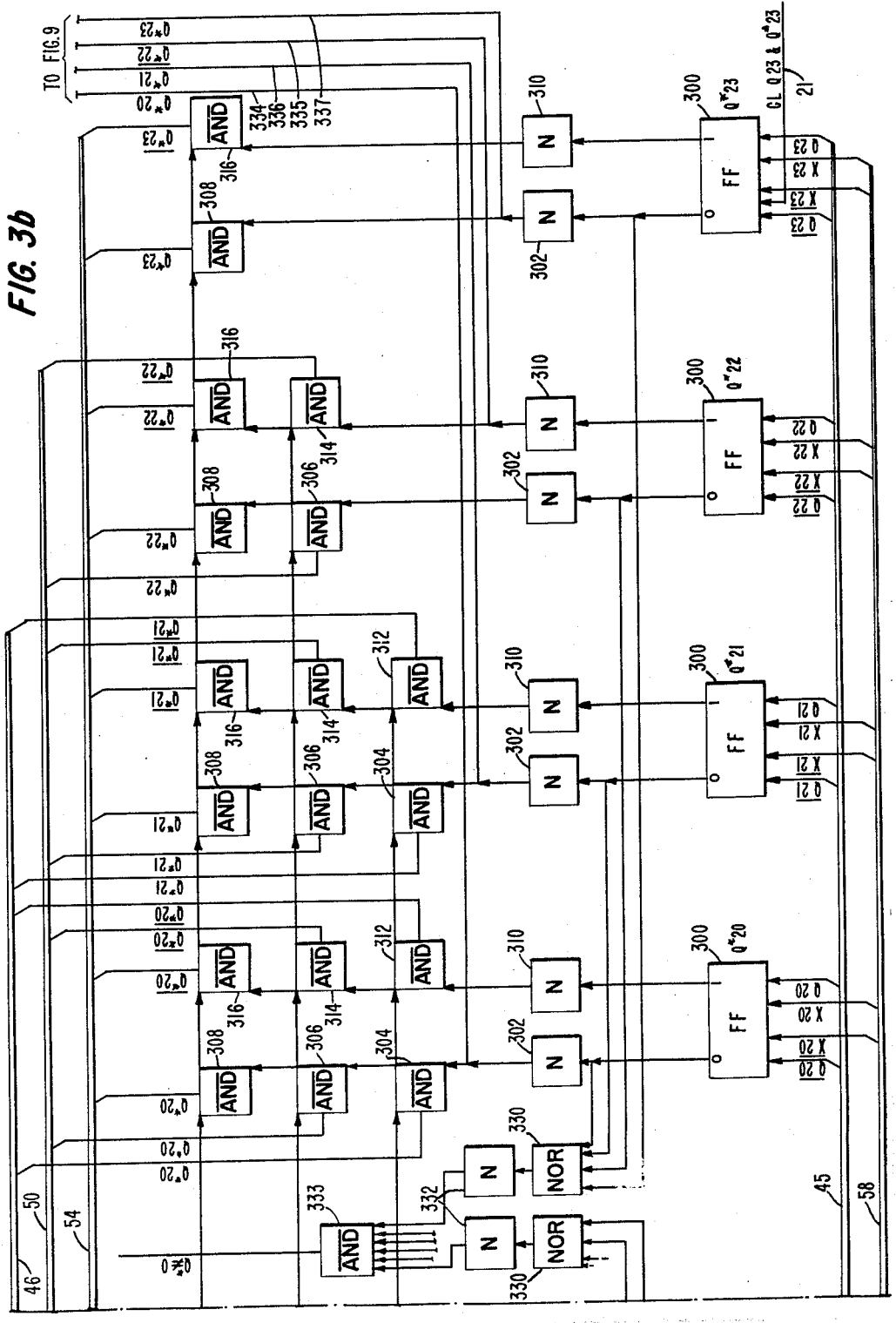
Figure 4A:
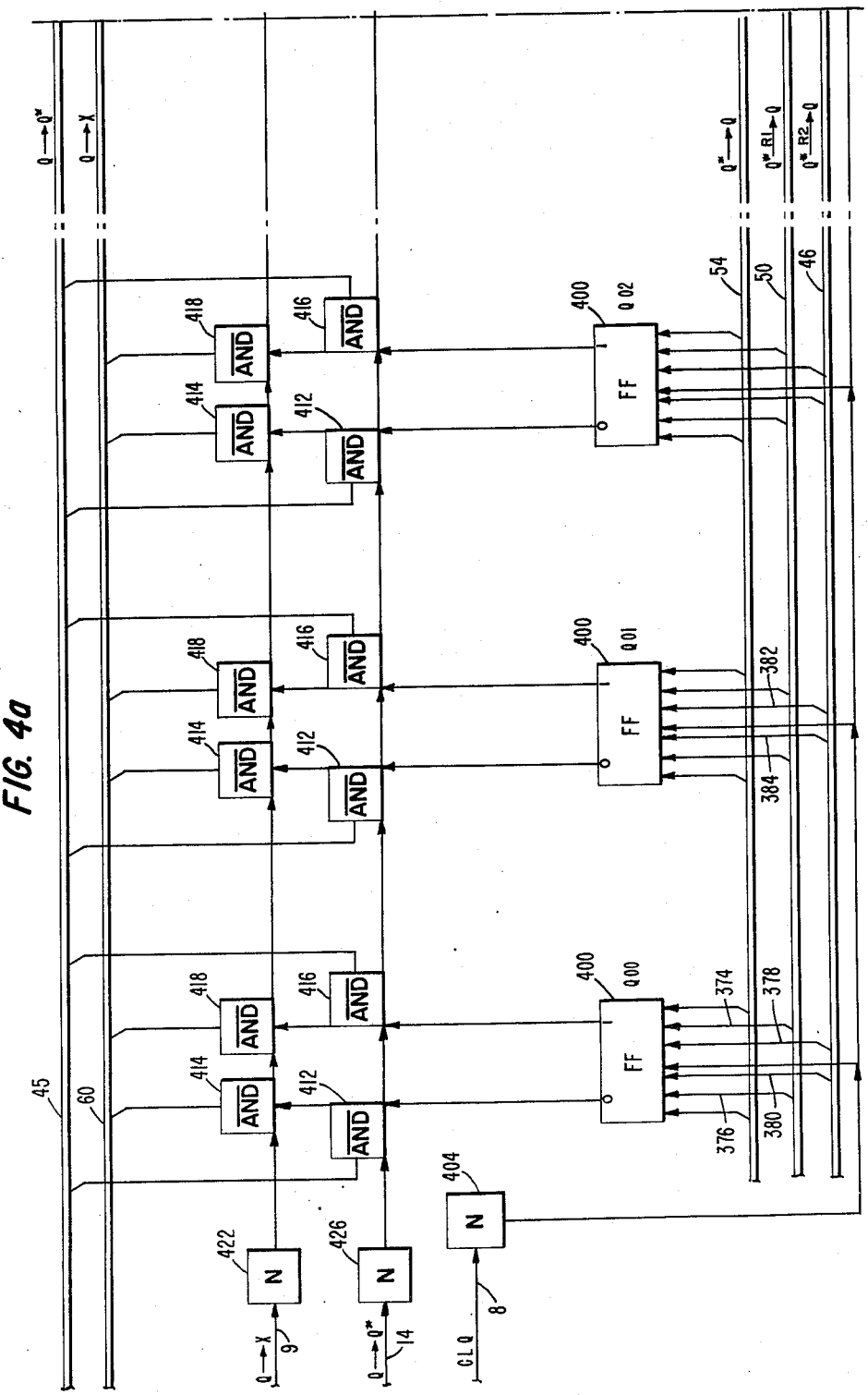
Figure 7A:
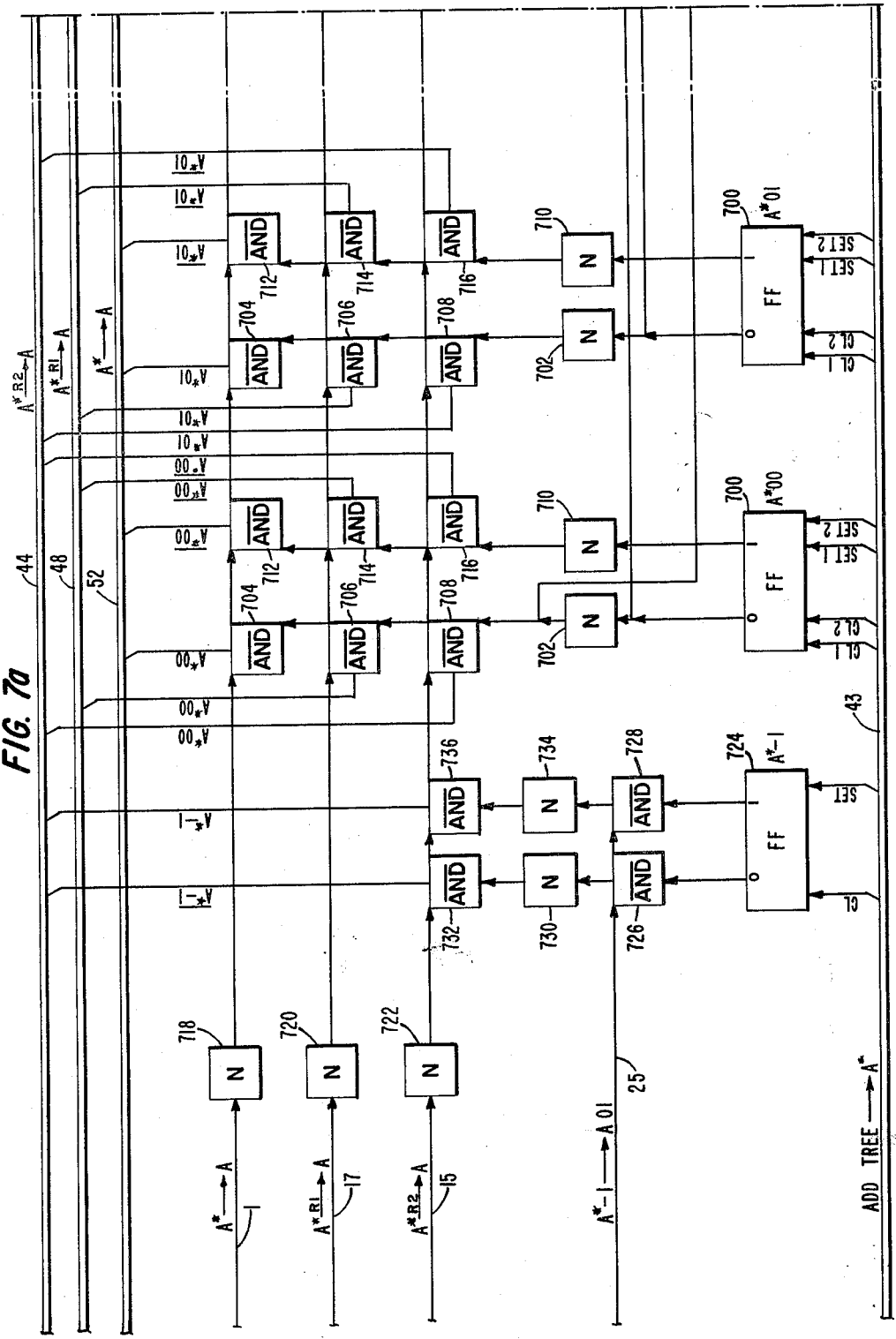
Figure 8:
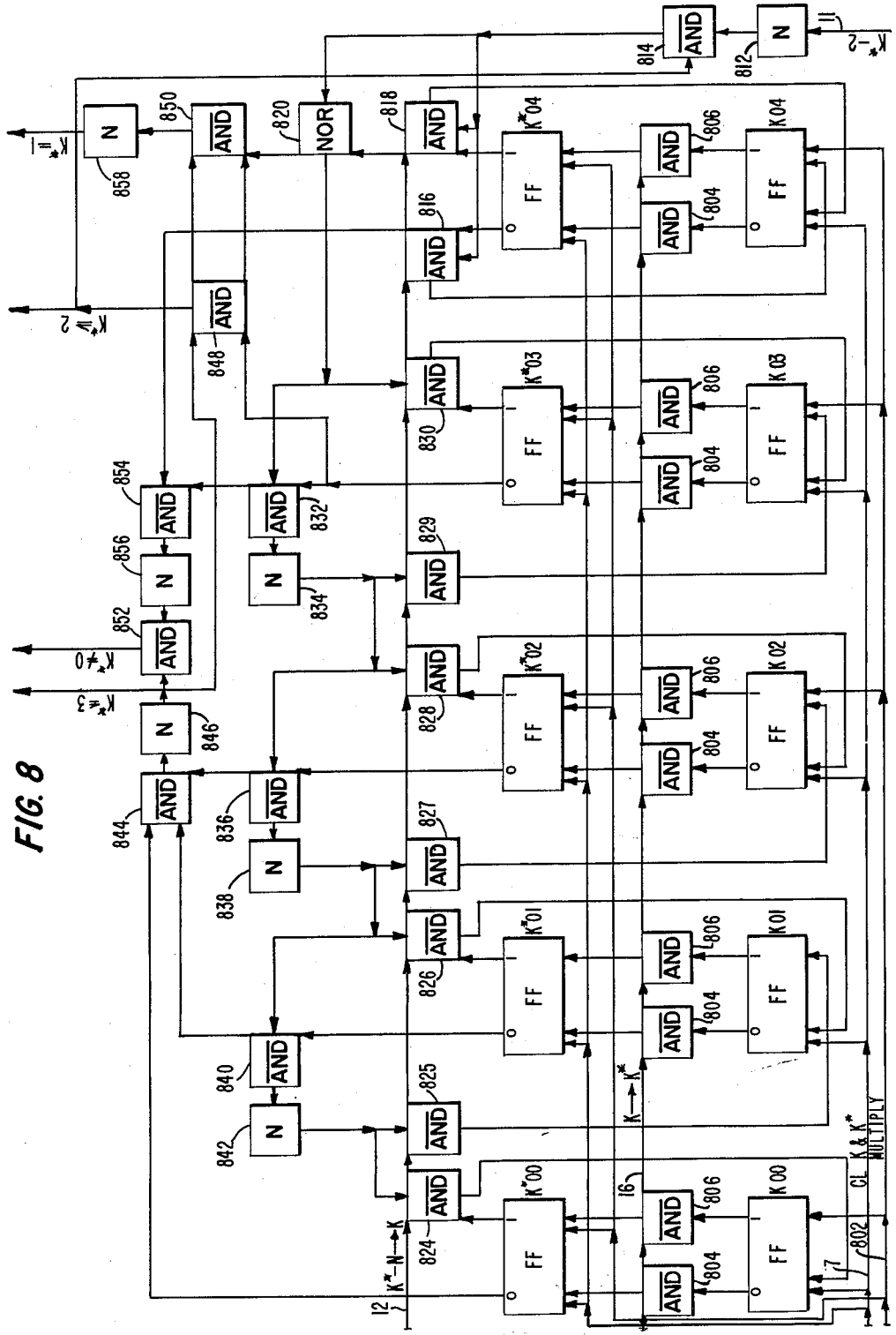
Figure 10C:
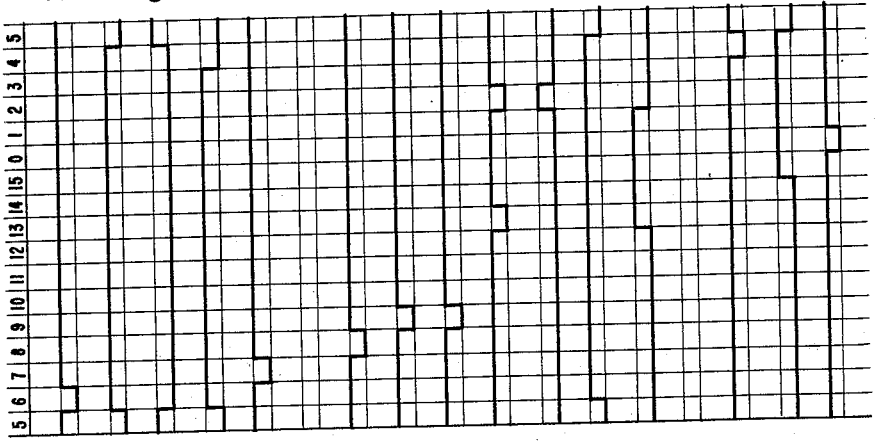
Figure 10B:
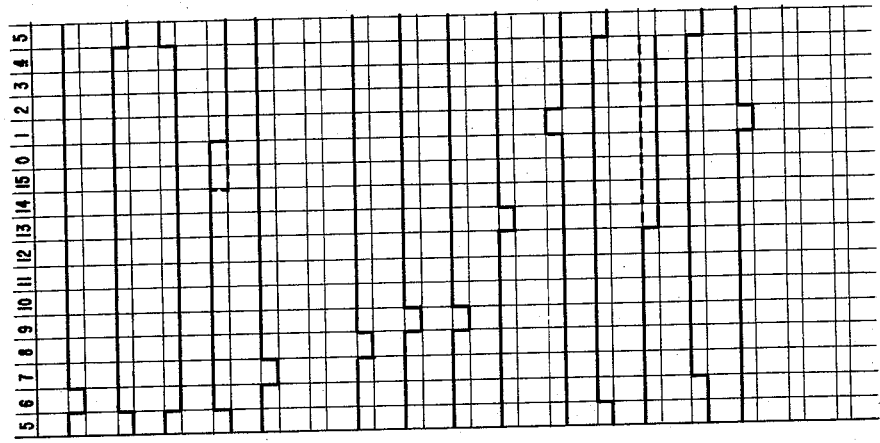
Figure 10A:
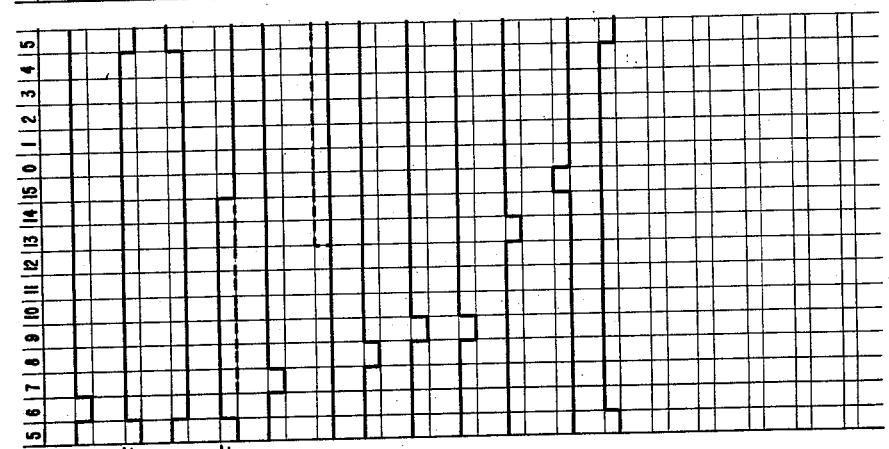
Figure 11B:
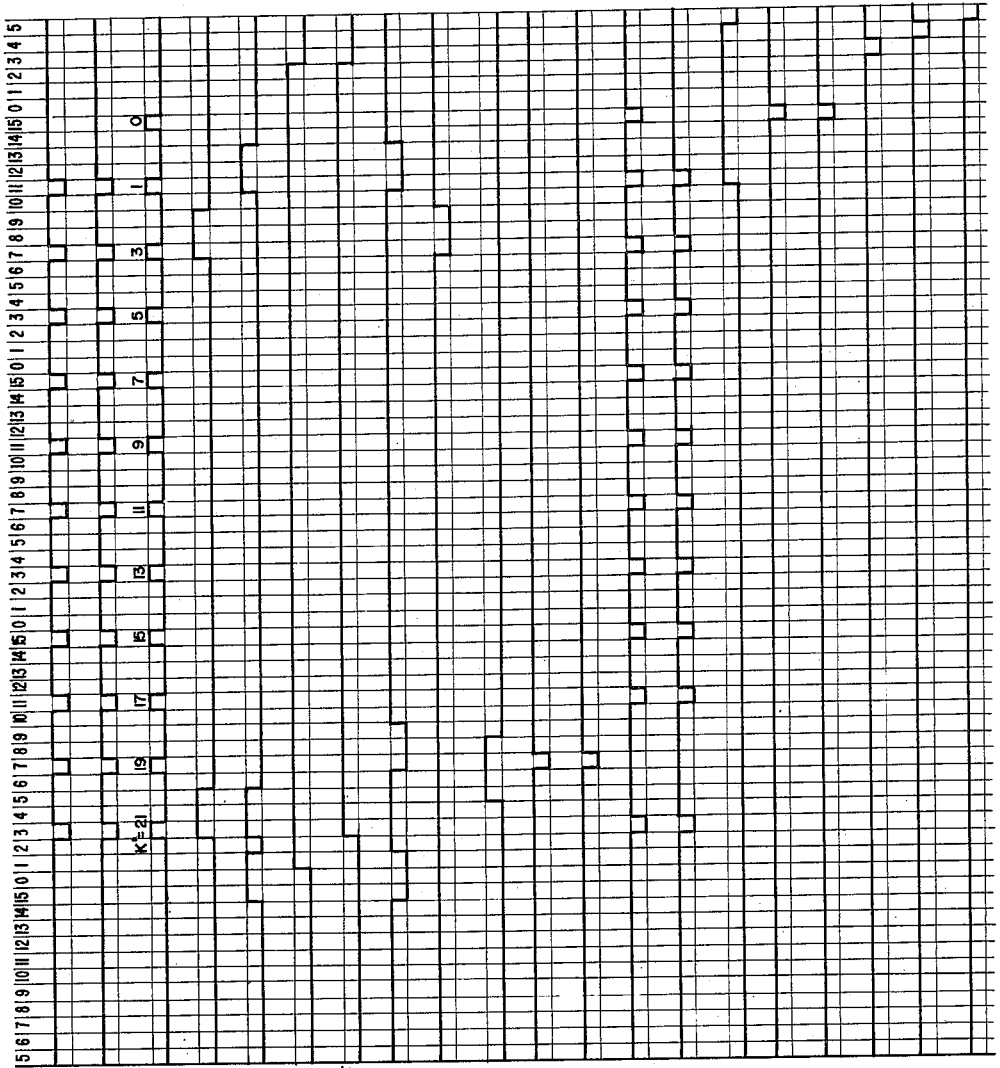

Other objects of the invention and its mode of operation will become apparent upon consideration of the following description and the accompanying drawings in which:

FIGURE 1 consisting of 1a and 1b is a block diagram of the invention;

FIGURE 2 shows the multiplicand register;

FIGURES 3a and b show the lower rank of the multiplier register;

FIGURES 4a and b show the upper rank of the multiplier register;

FIGURE 5 shows the upper rank of the accumulator register;

FIGURES 6a–d show the add tree;

FIGURES 7a and b show the lower rank of the accumulator register;

FIGURE 8 shows the iteration counter;

FIGURE 9a–d is a circuit diagram showing the multiply control circuits;

FIGURES 10a, b, and c are timing diagrams illustrating the operation of the present invention when performing short cut multiply operations; and FIGURE 11 consisting of 11a and 11b is a timing diagram illustrating the operation of the present invention when performing a regular multiply operation.

FIGURE 1 is a block diagram showing the registers and controls comprising the present invention. The multiplier is designed to operate as a sub-unit of a data processing system wherein one cycle of the system comprises sixteen pulse periods designated MP0 through MP15. These pulse periods are defined by a clock pulse generator which generates clock pulses MP0 through MP15 during consecutive time intervals. The clock pulse generator is not shown but may be any of the conventional generators of this type now known in the art.

The clock pulses are applied to the Multiple Sequence Controls of FIGURE 1 to control the timing of the commands generated by the sequence controls on leads 1 through 30. The multiply operation is initiated by the instruction MULTIPLY applied to the multiply sequence controls from the instruction decoder of the data processing system. During a regular multiply operation, the multiplier is held in the Q register and the multiplicand in the X register. The partial product is developed in the A register and as the multiplication sequence progresses, the partial product is right shifted into the Q register with the low order digits of the multiplier being lost or shifted out the right end of the Q register.

A regular multiplication operation includes a set-up interval for checking the operands for a possible short cut operation, twelve iterative cycles and an end correction cycle. If the operands indicate a short cut multiply operation is possible, the multiplication ends after the set-up interval. The first eleven iterative cycles are, generally speaking, the same. During each iteration the partial product in the A register is fed to the ADD TREE over buss 40 and added to a value Z which is applied to the ADD TREE over buss 42 from the X register. The command GATE TOP 1 appearing on lead 10 causes the sum of A and Z to be gated from the ADD TREE into the $A^*$ (A star) register over buss 43. During this time, the multiplier in the Q register is transferred over buss 45 to the $Q^*$ register in response to the command $Q$ to $Q^*$ appearing on lead 14. The next pair of multiplier digits are sensed while the multiplier is in $Q^*$. Stages $Q^*20$ and $Q^*21$ apply signals to the multiply Sequence Controls. The arithmetic operation on the next iteration cycle is determined by these digits in conjunction with an indication of whether or not there is a carry-over from the preceding cycle which must be taken into account. Stages $Q^*22$ and $Q^*23$ also apply signals to the multiply sequence controls. Thus, the signals from $Q^*20$ through $Q^*23$ are applied to the sequence controls to generate on the next iteration the commands $A-X$, $A+2X$, and $A+X$. These commands are applied to the X register over leads 20, 23, and 24 and cause the complement of X, 2X, or X to be read out to the ADD TREE. Under certain conditions none of the commands appear so no value is transferred from X to the ADD TREE. It is obvious, therefore, that the value Z may be 0 the complement X, X, or 2X.

$A^*$ and $Q^*$ are transferred to A and Q over busses 44 and 46 with a shift of two places to the right. The commands $A^*$ to $A(R2)$ and $Q^*$ to $Q(R2)$ appear on leads 13 and 15 to cause this transfer. On the shift to the right the two low order digits of $Q^*$ are lost and the two low order stages of $A^*$ are entered into Q. The leads $\overline{A^*22}$, and $\overline{A^*23}$ continuously apply signals to gates in the $Q^*$ register. These gates also receive the command AQ DOUBLE LENGTH from the sequence controls over lead 18. When the command $Q^*$ to $Q(R2)$ appears, the content of $A^*22$ is gated through $Q^*$ into Q00 and $A^*23$ is gated through $Q^*$ into Q01. Therefore, during the actual multiply operation the double rank registers A and Q are interconnected to form a double rank register having a double length.

When the double shift to the right is made, A00 and A01 are left vacant. The present method of multiplication requires that these stages be injected with correction digits. The correction digits may be inserted into A00 and A01 by the commands SET A00, SET A01, CLEAR A00, and CLEAR A01 appearing on leads 26 through 29. Under certain conditions when adding $A+2X$, it is necessary to inject the overflow digit from the operation into A01. The commands ADD 2X and Previous Partial Product $=0$ are applied to the ADD TREE over leads 22 and 30 and operate in conjunction with the signal on lead $X'00$ to control the production of an overflow digit. This digit is entered into $A^*-1$ in response to the GATE TOP 1 command and is transferred from $A^*-1$ to A01 in response to the command $A^*-1$ to A01 applied to $A^*$ over lead 25.

The above description briefly summarizes the operations which take place on the first eleven iteration cycles. During the eleventh cycle, the Iteration Counter is reduced so that it contains a value of 1. The Iteration Counter comprises two registers K and $K^*$ which are initially set to a value of $N-1$ by the MULTIPLY instruction. N is the number of digits, including sign, in the multiplier. On each iteration cycle the commands $K^*-N$ to K and $K^*-2$ appearing on leads 11 and 12 cause the value 2 to be subtracted from the value in $K^*$ and the result entered into K. The command $K^*$ to K appears on lead 16 to return the new count to the $K^*$ register. The $K^*$ register produces the output signals $K^*=1$, $K^*\leq3$, $K^*\geq2$ and $K^*\neq0$ depending upon the value it contains. When $K^*$ equals 1, eleven iterative cycles similar to the one described above have been completed and the signal $K^*=1$ causes the sequence controls to enter a new sequence for the twelfth iteration cycle. On the twelfth cycle only $Q^*23$ controls the addition of the multiplicand to the partial product. The sum is entered into $A^*$ and Q transferred to $Q^*$ as before but on this cycle the sequence controls issue the commands $Q^*$ to $Q(R1)$ and $A^*$ to $A(R1)$ on leads 17 and 19. This causes the contents of $A^*$ and $Q^*$ to be transferred to A and Q over transfer busses 48 and 50 with a shift of one binary place to the right.

An end correction cycle takes place after the twelfth iteration. On this cycle X is subtracted from the partial product if the sign of the multiplicand (now in $Q^*23$) is minus. If the sign is plus then nothing is subtracted. Thus, on this cycle A is transferred to the ADD TREE over buss 40, 0 or the complement of X added to it in the ADD TREE, and the result entered into $A^*$. At the same time Q is transferred to $Q^*$ over the buss 45. The sequence controls now generate the commands $A^*$ to A and $Q^*$ to Q which appear on leads 1 and 4. These commands cause the content of $A^*$ to be transferred without shift over buss 52 to the A register and the content of $Q^*$ to be transferred without shift over buss 54 to the Q register. The sequence controls also generate the command CLEAR Q23 and $Q^*23$ on lead 21 to clear the low order positions of Q and $Q^*$. The multiply operation is now complete with the A register containing the sign and 23 most significant digits and the Q register containing the 23 least significant digits of the product.

Reference to FIGURE 1 shows that there are several data transfer busses and multiply sequence control commands not utilized in the operations described above. These transfer paths and commands are utilized in the initial set up cycle and in those cases where a short cut multiply operation is permissible.

The command A to X applied to the A register over lead 5 gates the content of the A register on to the buss 56 so that it may be entered into the X register. The command X to $Q^*$ applied to the X register over lead 3 causes the value in X to be transferred over buss 58 and entered into the $Q^*$ register. The content of Q may be transferred to the X register over the buss 60 in response to the command Q to X applied to the Q register over lead 9. The signals $Q^*\neq0$, $A^*=-1$, $A^*=0$, $A^*\neq0$ and $A^*\neq1$ generated by the $A^*$ and $Q^*$ registers are used to indicate the possibility of a short cut multiply operation. These signals are applied to the multiply sequence controls and, in a manner to be described, determine whether or not a short cut multiply operation should take place.

Basic components

The specific embodiment of the present invention as described herein comprises a plurality of logic elements of four different types. These logic elements are the flip-flop, NOT, NOR and $\overline{AND}$.

The NOT circuit is an inverter having a single input. A negative input signal causes the NOT circuit to produce a positive output signal and a positive input signal cause it to produce a negative output signal.

The NOR circuit produces a positive output signal if any one of its inputs has a negative signal applied thereto. If all inputs of a NOR circuit are positive it produces a negative output signal.

The $\overline{AND}$ (negative AND) produces a negative output signal if all inputs are made positive simultaneously. Under all other conditions the output is positive. This element is sometimes referred to as a gate.

The flip-flop is a bistable element that responds to negative input signals only. The flip-flop has a set and a reset input terminal and a set and a reset output terminal. A negative signal applied to the set input terminal cause the set output terminal to rise to a positive level. It remains at this level until a negative signal is applied to the reset input terminal at which time it returns to a negative level and the reset output terminal rises to a positive level.

The present invention is not limited to any specific type of logic element and any of the devices now known in the art that perform the logic functions described above may be used in practicing the invention. Furthermore, the terms positive and negative are relative to each other and do not necessarily mean positive or negative with respect to zero.

X register

The X register shown in FIGURE 2 is a twenty-four bit register which holds the multiplicand during the multiply operation. Only the two high order stages and the two low order stages of the register are shown in FIGURE 2 since the intermediate stages X02 through X21 are identical to stage X01.

Each stage of the register contains a flip-flop for storing one binary bit of the multiplicand. The main computer controls generate a signal CLEAR X which appears on lead 200 at time MP10 of the set up portion of a multiply operation to reset each flip-flop in the X Register prior to receiving the multiplicand from memory. The multiplicand is entered into the X register from memory over buss 62 at MP11 of the set up portion of the multiply operation.

Information may be entered into the X register from the A register over buss 56. Noting stage X23 as an example, if stage 23 of the A register contains a binary 0 at the time the command A to X is generated, a negative signal appears on the lead $\overline{A23}$ to reset flip-flop X23. On the other hand, if stage 23 of the A register contains a binary 1 at the time the command A to X is generated, the lead A23 is negative to set flip-flop X23.

The content of the Q register is transferred to the X register over buss 60 in response to the command Q to X. If stage 23 of the Q register contains a binary 0 then the lead $\overline{Q23}$ becomes negative to reset flip-flop X23. If stage 23 of the Q register contains a binary 1, then lead Q23 is negative to set flip-flop X23.

The output of the X register may be transferred to the Q* register, to the ADD TREE without shift or to the ADD TREE with a shift of one binary place to the left. The output off the reset side of each flip-flop is connected to a pair of $\overline{AND}$ circuits 201 and 202. The output signal from the set side of each flip-flop is connected to $\overline{AND}$ circuits 203, 204, and 205.

The command X to Q* appears on lead 3 and is inverted at 207 before it is applied simultaneously to the $\overline{AND}$ circuits 201 and 204 in each stage. One of the conventions employed in the drawings should be noted at this point. An input lead connected to the corner of an element and extending along one side of the element to another element means that the input lead is connected to the elements in parallel. Thus, the output lead from NOR 207 is connected in parallel to each of the gates 201 and 204 and applies signals to them simultaneously. If a given stage contains a binary 0 then the corresponding $\overline{AND}$ circuit 201 produces a negative output pulse on the lead 208. This pulse enters the buss 58 and is applied to the reset side of the flip-flop in the corresponding stage of the Q* register. If a given stage of the X register contains a binary 1 at the time the command X to Q* appears on lead 3, $\overline{AND}$ circuit 204 produces a negative output signal on the lead 209 which is connected to the set side of the flip-flop in the corresponding stage of the Q* register.

The multiply control circuits generate the command $A+X$ which appears on lead 24 and is inverted at 211 before being applied to the $\overline{AND}$ circuit 205 in each stage of the X register. If a given stage of the X register contains a binary 1 at this time $\overline{AND}$ 205 produces an output signal which passes through NOR 212 before entering the buss 42. This positive signal is applied to the corresponding stage of the ADD TREE. Note that if a given stage of the X register does not contain a binary 1 at the time the command $A+X$ is generated $\overline{AND}$ circuit 205 does not produce an output signal. As a result, the output of NOR 212 is negative and this signal is inverted at 213 before being applied to the ADD TREE over buss 42 to indicate that the given stage of the X register contains a binary 0.

$\overline{AND}$ circuits 201 produce the 1's complement of the value standing in the X register in response to the command $A-X$ which appears on lead 20. The command signal is inverted at 215 before being applied in parallel to $\overline{AND}$ 202 in each stage of the X register. If a given stage of the X register contains a binary 0 $\overline{AND}$ 202 produces a negative output signal which passes through NOR 212 to become a positive signal applied to the ADD TREE over buss 42. If a given stage of the X register contains a binary 1 at the time the command $A-X$ appears, $\overline{AND}$ 201 does not produce an output signal and as a result the output of NOR 212 is negative. This signal is applied to the corresponding stage of the ADD TREE over buss 42 to indicate that this stage of the X register contains a binary 1.

The command $A+2X$ is generated by the multiply controls and appears on lead 23. The command is inverted at 217 before being applied to $\overline{AND}$ circuits 203 in stages X01 through X23. The output of $\overline{AND}$ circuit 203 in each stage is connected to the NOR circuit 212 in the next higher order of the X register. Thus, if a given stage of the X register contains a binary 1 at the time the command $A+2X$ appears, 203 produces a negative output signal which passes through NOR 212 of the next higher order stage before entering buss 42. This effectively produces a shift of one binary place to the left as the content of the X register is being transferred to the ADD TREE. It will be recognized by those skilled in the art that a shift of one binary place to the left is equivalent to multiplying the value in the X register by 2.

It will be noted that the high order stage X00 has no $\overline{AND}$ circuit 203 since there is no higher order stage to which the content of X00 may be transferred. In like manner, the NOR 212 in low order stage X23 has no input for shift since stage X23 is the low order stage.

High order stage X00 differs from the remaining stages of the X register in that it has three additional outputs 218, 219, and 220 which are connected to NOT circuits 221 and 222. The flip-flop X00 reset NOT 221 produces a negative signal on leads 218 and 220 and NOT 222 produces a positive signal on lead 219. If flip-flop X00 is set, then NOT 221 produces a positive output signal on the leads 218 and 220 while NOT 222 produces a negative output signal on lead 219. The signal on lead 220 is applied to the ADD TREE and the signals on leads 218 and 219 are applied to the multiply controls for the purpose of determining the binary values to be injected into the two high order stages of the A register made vacant when the A and Q registers are shifted right during the multiply operation.

Q* Register

The lower rank of the multiplier register is designated Q* and contains 24 stages each having flip-flop 300 for storing one binary digit. Stages Q*02 through Q*19 have been omitted from FIGURE 3 since these stages are identical to Q*00. Noting Q*00 as an example, the output of the reset side of the flip-flop is inverted by NOT circuit 302 and applied to $\overline{AND}$ circuits 304, 306, and 308. The output from the set side of the flip-flop is inverted by NOT circuit 310 and applied to $\overline{AND}$ circuits 312, 314, and 316.

The flip-flop 300 may be set or reset in response to negative signals on buss 58 from the X register or buss 45 from the Q register. Considering again stage Q*00, the flip-flop 300 may be set if X00 contains a binary 1 at the time the command X to Q* is generated or may be set if Q00 contains a binary 1 at the time the command Q to Q* is generated. The flip-flop 300 may be reset if Q00 contains a binary 0 at the time the command Q to Q* is generated or reset if X00 contains a binary 0 at the time the command X to Q* is generated.

The value standing in Q* may be transferred to the Q register without shift in response to the command Q* to Q. This command is generated by the multiply control circuits and appears on lead 4. It is inverted at 320 before being applied to $\overline{AND}$ circuits 308 and 316. If a given stage of Q* contains a binary 1, then the command Q* to Q conditions $\overline{AND}$ 308 thereby producing a negative output signal which passes over buss 54 to set the corresponding stage of the Q register. If a given stage Q* contains binary 0, then the command Q* to Q conditions the gate 316 which produces a negative output signal to reset the corresponding stage of the Q register.

Information in the Q register may be transferred to Q* with a shift of one binary place to the right. The multiply control circuits generate the command Q* to Q(R1) which appears on the lead 19 and is inverted at 324 before being applied to the $\overline{AND}$ circuits 306 and 314. If a given stage of Q* contains a binary 1 at the time the command Q* to Q(R1) is generated, $\overline{AND}$ circuit 306 produces a negative output signal which enters buss 59. On emerging from buss 50 the signal is applied to the set input of the flip-flop in the next lower order stage of the Q Register. If a given stage of Q* contains a binary 0 at the time the command Q* to Q(R1) is generated, $\overline{AND}$ 314 generates a negative output signal which resets the flip-flop in the next lower order stage to the Q register.

The value standing in Q* may also be transferred to Q with a shift of two places to the right. The multiply controls generate tre command Q* to Q(R2) which appears on lead 13 and is inverted at 328 before being applied to $\overline{AND}$ circuits 304 and 312. If a given stage of Q* contains a binary 1 at the time the command Q* to Q(R2) is generated, $\overline{AND}$ 304 produces a negative output signal that passes over buss 46 and is applied to the set side of the flip-flop in the Q register which is two stages to the right of the stage in Q* which generated the signal. If a given stage of Q* contains a binary 0 at the time the command Q* to Q(R2) is generated $\overline{AND}$ 312 produces a negative output signal to reset the flip-flop in the Q register which is two stages to the right of the stage Q* which generated the signal.

It will be noted that stage Q*23 does not have gates 304, 306, 312, and 314. Since these gates are used for shifts to the right between Q* and Q and since Q23 is the low order stage of Q, there is no stage in Q to receive the right shifted output of Q*23. It is apparent that any shifts to the right from this stage result in the information being deleted. Also, stage Q*22 does not have read-out gates 304 and 312 which are the double right shift read-out gates. A double shift to the right from Q*22 would normally result in the information being entered into Q24, but since Q23 is the lowest order stage of the Q register, this information would be lost.

In sensing for the possibility a short-cut multiplication operation it is necessary to determine whether or not Q* contains a 0 value. In order to determine this, the reset side of each flip-flop in the Q register is connected to a NOR circuit 330. The outputs of the NOR circuits are inverted at 332 and applied to $\overline{AND}$ 333. If all stages of Q* contain binary zeros then all inputs to NORS 330 will be positive resulting in positive signals on all inputs to $\overline{AND}$ 333. The negative output from 333 indicates that Q* contains a value of 0. If one or more stages of Q* contain a binary 1, then at least one input of a NOR circuit 330 will be negative resulting in a negative input on at least one of the leads of $\overline{AND}$ 334. This blocks 333 resulting in a positive output signal indicating that Q* does not contain a 0 value.

Stages Q*20 through Q*23 contain an additional output. Because of certain timing considerations, it is not always possible to wait until the multiplier has been entered into the Q register in order to sense the two lowest order multiplier digits. Therefore, on all cycles except the first iteration cycle and the end-correction cycle, the multiplier digits are sensed while they are stored in Q*20 and Q*21. Output leads 334 and 336 are connected to the outputs of inverters 302 in stages Q*20 to Q*21. These leads are connected to the multiplier control circuits shown in FIGURE 9. It should be noted that on the first eleven iteration cycles the content of Q* is transferred to Q with a shift to the right in two places. Therefore, the multiplier digits appearing in Q*20 and Q*21 are entered into Q22 and Q23 when the transfer operation takes place to thus become the low order multiplier digits.

On each iterative cycle it is necessary to know the value of the multiplier digits of the preceding cycle. For this reason output leads 335 is connected to NOT 310 of stage Q*22 and lead 337 is connected to NOT 302 of stage Q*23 so that indications of the values of binary bits in these stages may be applied to the multiply control circuits. Leads 335 and 337 also indicate the value of the two low order multiplier digits on the first iterative cycle.

The circuits shown to the left of stage Q*00 are employed during the multiply operation when A and Q are connected together to form a double length register and a shift to the right is being performed.

The signal A*22 is negative if A*22 contains a binary 1. This signal is applied to $\overline{AND}$ 340 and is inverted at 342 and applied to $\overline{AND}$ 344. The output to $\overline{AND}$ 340 is inverted at 346 and applied to $\overline{AND}$ 348 and the output of $\overline{AND}$ 344 is inverted at 350 and applied to $\overline{AND}$ 352.

The signal appearing on lead 354 is negative if A*23 contains a binary 1. This signal applies to $\overline{AND}$ 356 and inverted at 358 and applied to $\overline{AND}$ 360. The output of $\overline{AND}$ 356 is inverted at 362 and applied to $\overline{AND}$ circuits 364 and 366 while the output of $\overline{AND}$ 360 is inverted at 368 and applied to $\overline{AND}$ circuits 370 and 372.

Figure 4B:
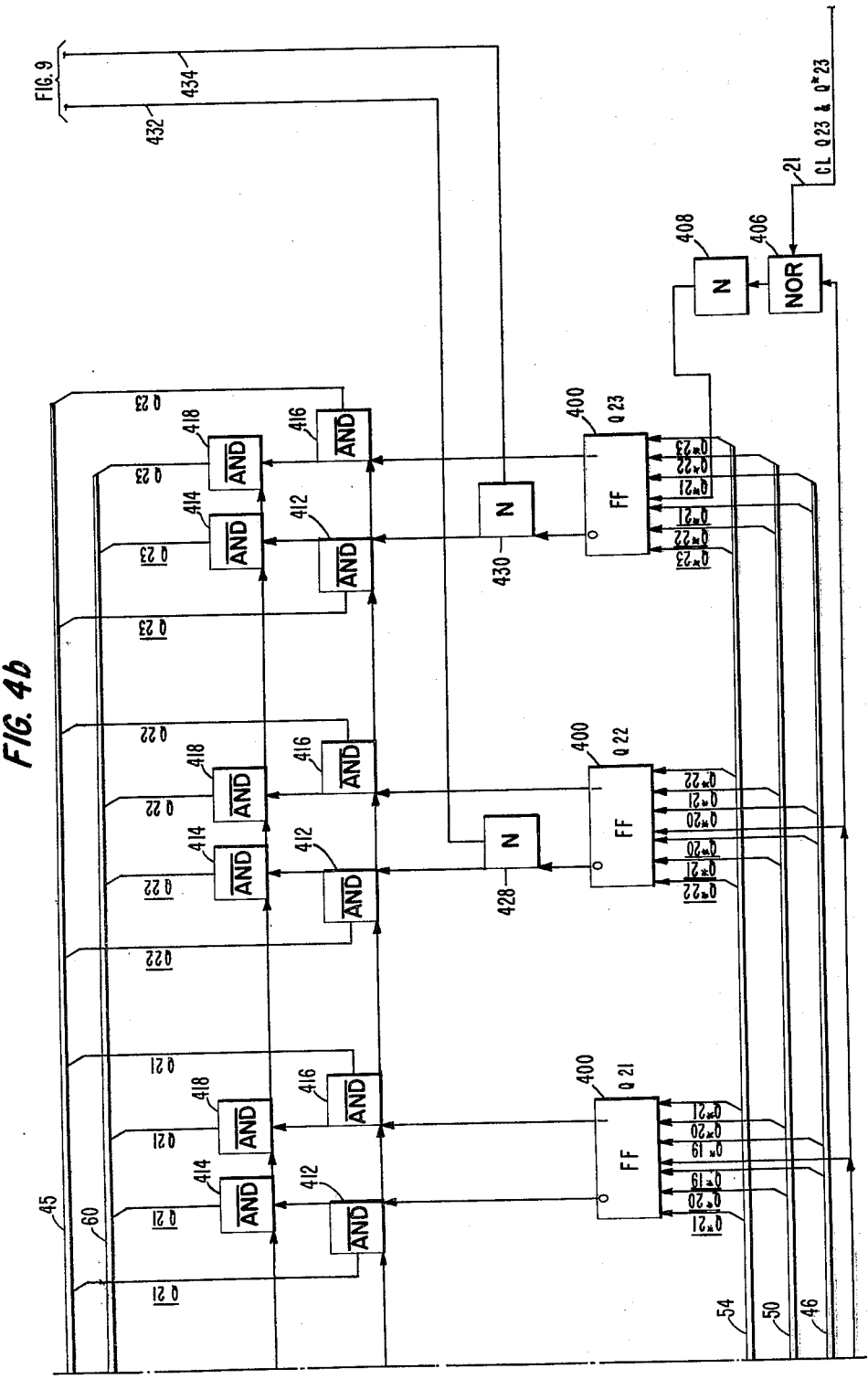

Assume for the moment that both A*22 and A*23 contain binary ones and is desired to transfer A* and Q* to A and Q with a shift to the right of one binary place. The multiply control circuits generate the command Q* to Q(R1) which conditions one input of $\overline{AND}$ circuits 366 and 372 and the command AQ DOUBLE LENGTH which appears on lead 18 to condition one input of AND's 340, 344, 356, and 360. Due to the absence of the command Q* to Q(R2) $\overline{\text{AND}}$ circuits 348, 352, 364 and 370 are blocked at this time. Since $\overline{\text{AND}}$ circuits 348 and 352 are blocked, the signal applied on lead 338 from A*22 will have no effect. This is as it should be since on a single shift to the right A*22 should be entered into A23, and not into Q00. However, the negative signal appearing on lead 354 passes through 358, 360, 368, and 372 and appears on lead 374. This lead enters buss 50 and emerges from the buss in FIGURE 4a. As shown in FIGURE 4, the lead 374 is connected to the set side of Q00 so that a negative signal on this lead sets the flip-flop. Therefore, a shift of one binary place to the right causes the binary value of 1 standing in A*23 to be entered into Q00. If A*23 had contained a binary 0 then the positive pulse on lead 354 would pass through 356, 362 and 366. The negative output of 366 is connected by way of lead 376 to the reset input of the flip-flop in stage Q00.

Assume now that it is desired to transfer the double length value in A*Q* to AQ with a shift of two places to the right. The multiply controls generate the command Q* to Q(R2) which appears on lead 13 and is inverted at 328 to condition one input of $\overline{\text{AND}}$ circuits 348, 352, 364, and 370. The multiply control circuits also generate the command AQ DOUBLE LENGTH which appears on lead 372 to condition one input of $\overline{\text{AND}}$ circuits 340, 344, 356, and 360. If A*22 contains a binary 1 the negative signal on lead 338 passes through NOT 342, $\overline{\text{AND}}$ 344, NOT 350, and $\overline{\text{AND}}$ 352 before appearing on output lead 378. Lead 378 enters buss 46 and emerges from the buss in FIGURE 4a where it is connected to the set side of the flip-flop in stage Q00. If A*22 contains a binary 0, then the positive pulse appearing on lead 338 passes through $\overline{\text{AND}}$ 340, NOT 346, and $\overline{\text{AND}}$ 348, to appear on output lead 380. Lead 380 enters buss 46 and emerges from the buss in FIGURE 4a where it is connected to the reset input of the flip-flop in stage Q00. If A*23 contains a binary 1, the negative signal on lead 354 passes through NOT 358, $\overline{\text{AND}}$ 360, NOT 368, and $\overline{\text{AND}}$ 370 to appear on lead 382. This lead enters buss 46 and emerges from the buss in FIGURE 4a where it is applied to the set side of the flip-flop in stage Q01. If A*23 contains a binary 0, then the positive pulse on lead 354 passes through $\overline{\text{AND}}$ 356, NOT 362, $\overline{\text{AND}}$ 364, and appears on lead 384. Lead 384 enters buss 46 and emerges from the buss in FIGURE 4 where it is applied to the reset input of the flip-flop in stage Q01.

Q register

The upper rank of the multiplier register (Q) contains 24 binary stages designated Q00 through Q23. Stages Q03 through Q20 are not shown in FIGURE 4 since these stages are identical to Q02. Each stage includes a flip-flop 400 which may be reset in response to the command CLEAR Q generated by the multiply controls. The CLEAR Q command is a positive signal appearing on lead 8 and is inverted at 404 before being applied to the reset input of each of the flip-flops. Before being applied to stage 23, the CLEAR Q signal passes through NOR 406 and NOT 408. Stage Q23 is also reset in response to the command CLEAR Q23 and Q*23 generated by the multiply control circuits. This signal appears on lead 21 and passes through NOR 406 and NOT 408 to reset Q23. This special reset for Q23 is necessary for making certain corrections during the multiply end correction cycle.

Data is entered into Q from the Q* register only. The data signals appear on buss 54, 50, or 46 as explained with reference to the Q* register.

The reset output from each flip-flop 400 is connected to a $\overline{\text{AND}}$ circuit 412 and a $\overline{\text{AND}}$ circuit 414. The set output from each flip-flop is connected to a $\overline{\text{AND}}$ circuit 416 and a $\overline{\text{AND}}$ circuit 418.

The value stored in the Q register may be transferred to the X register in response to the command Q to X. The multiply control circuits generate the command Q to X which appears on lead 9 and is inverted at 422 before applied to each of the $\overline{\text{AND}}$ circuits 414 and 418. If a flip-flop 400 is set at the time the command Q to X appears on lead 9, 418 produces a negative output pulse which passes over the buss 60 and is applied to the set input of the flip-flop in the corresponding stage of the X register. If the flip-flop 400 is reset at the time the command Q to X appears on lead 9 then $\overline{\text{AND}}$ 414 produces a negative pulse which passes over the buss 60 and is applied to the reset input of the flip-flop in the corresponding stage of the X register.

Binary information in the Q register may also be transferred to Q*. The multiply control circuits generate the command Q to Q* which appears on lead 14 and is inverted at 426 before being applied to $\overline{\text{AND}}$ circuits 412 and 416. If a given stage of Q contains a binary 1 at the time the command Q to Q* appears 416 produces an output signal to set the corresponding stage of Q*. If a given stage of Q contains a binary 0 at the time the command Q to Q* is generated, then 412 generates an output signal which is applied to the reset input of the flip-flop in the corresponding stage of the Q* register.

Stages Q22 and Q23 differ somewhat from the remaining stages of the Q register. NOT circuits 428 and 430 are connected to the reset outputs of the flip-flops 400 of these stages. If Q22 contains a binary 1, NOT 428 produces a positive output signal on lead 432 and if Q23 contains a binary 1 NOT circuit 430 produces a positive output signal on lead 434. Leads 432 and 434 are connected to the multiply control circuits of FIGURE 9 and provide an indication of the two low order multiplier digits. The signals on lead 432 and 434 are utilized as indications of the low order multiplier digits only during the first iterative cycle, with the low order digits of the multiplier being sensed in Q*20 and Q*21 on the second and subsequent iterations in the manner described above. However, leads 432 and 434 are used on the second and succeeding iteration cycles to provide an indication of the low order multiplier digits of the preceeding cycle.

A register

The upper rank of the accumulator register is the 24 stage A register shown in FIGURE 5. Each stage contains a binary flip-flop 500 for storing one binary bit of information. Initially the A register holds the multiplier. During the multiply operation the A register holds the partial products and at the completion of the multiplication operation the A register contains the sign and 23 most significant digits of the product. Stages A02 through A21 are not shown in FIGURE 5 since these stages are identical to stage A22. The A register receives information only from the A* register. Binary values standing in A* may be transferred to the A register without shift, with a shift of one binary place to the right or with a shift of two binary places to the right. Information is double gated from the A* register to the A register. That is, both binary 0 and binary 1 are represented by negative pulses. Considering stage A22 as an example, flip-flop 500 may be set if A*22 contains a binary 1 and the command A* to A is given, if A*21 contains a binary 1 and the command A* to A(R1) is given, or if A*20 contains a binary 1 and the command A* to A(R2) is given. In like manner, the flip-flop 500 in stage A22 may be reset if A*22 contains a binary 0 and the command A* to A is given, A*21 contains a binary 0 and the command A* to A(R1) is given, or if stage A*20 contains a binary 0 and the command A* to A(R2) is given. These signals appear on busses 44, 48, or 52 which are connected to the read-out gates of the A* register in the manner described below.

The output off both the set side and the reset side of the flip-flop 500 in each stage of the A register is continuously applied over buss 40 to the ADD TREE shown in FIGURE 6. In addition, each stage of the A register has a $\overline{AND}$ circuit 502 connected to the reset side of the flip-flop and a $\overline{AND}$ circuit 504 connected to the set side of the flip-flop. These gates are pulsed simultaneously by the command A to X appearing on lead 5 from the multiply control circuits. This command conditions one input of each of the circuits 502 and 504. If any flip-flop 500 is set then the corresponding circuit 504 produces a negative output pulse that passes over buss 56 to set the corresponding flip-flop in the X register. If any flip-flop 500 is reset then the corresponding circuit 502 is conditioned to produce a negative output to reset the corresponding stage of the X register.

The multiply controls generate the command CLEAR A which appears on lead 2. This command is applied to the reset input of stages A02 through A23 to reset the flip-flops in these stages. The CLEAR A command also passes through NOR 508 and NOT 510 to reset the flip-flop A01 and passes through NOR 512 and NOT 514 to reset the flip-flop in stage A00.

The commands CLEAR A01 and CLEAR A00 as well as the commands SET A00 and SET A01 are generated by the multiply control circuits. These commands are for the purpose of injecting digits into the stages A00 and A01 which are left blank during the multiply operation as the combined AQ register is shifted to the right. The command CLEAR A01 appears on lead 29 and passes through NOR 508 and NOT 510 to reset flip-flop 500 in stage A01. The command CLEAR A00 appears on lead 28 and passes through NOR 512 and NOT 514 to reset flip-flop 500 in stage A00. The command SET A00 appears on lead 26 and is applied directly to the set input of stage A00. The command SET A01 appears on the lead 27 and is applied directly to the set input of the flip-flop in stage A01.

It will be noted that the flip-flop in stage A00 receives no inputs over buss 44 or buss 43. This is to be expected since on a right shift operation of either one or two places the left most register position is left blank. Normally, A01 would receive no input signals when information is transferred from A* with a shift of two places to the right. However, in some instances stage A01 may receive an input signal over the buss 44 at this time. This signal comes from stage $A*-1$ and is for the purpose of injecting a correction digit into A01 under conditions more fully described hereinafter.

ADD TREE

The ADD TREE adds the value in A to the value read out from X. The value in A is continuously applied to the ADD TREE over buss 40 with the reset side of each flip-flop in A being connected to a $\overline{AND}$ circuit 600 and the set side of each flip-flop connected to a $\overline{AND}$ circuit 602.

As explained with reference to FIGURE 2, the value read out of X may be the multiplicand, two times the multiplicand, or the one's complement of the multiplicand. The binary indications of these values are applied to $\overline{AND}$ circuits 600 and 602 over the buss 42.

Considering stage 23 of the ADD TREE as an example, each stage includes a pair of input gates 600 and 602 for receiving the binary indications from the A and X registers. The outputs of 600 and 602 are both connected to a NOR circuit 604. The output of NOR 604 is connected to $\overline{AND}$ circuits 606 and 608 and NOT 610. The output of 610 is connected to $\overline{AND}$ circuits 612 and 614.

The commands Gate Top 1 and Gate Top 2, generated by the multiply controls, pass through NOR 616, and are applied to $\overline{AND}$ circuits 606, 608, 612, and 614. The ADD TREE has no storage ability but merely performs an addition on the values applied to gates 600 and 602 and applies the result to the read out gates 606, 608, 612, and 614. This result is read out to the A* register over buss 43 when the command Gate Top appears to condition the read out gates.

As noted above, the one's complement of the multiplicand is read out of X for a subtraction (complement addition) operation. This necessitates the addition of a carry signal into the low order position 23. The negative command $A-X$ is generated by the multiply controls on a subtraction operation and is inverted at 620 and applied to read out gates 606 and 612. The output of 620 is also inverted at 622 and applied to read out gates 608 and 614. Thus, gates 608 and 614 are blocked during subtraction and gates 606 and 612 are blocked during addition.

Assume that $A23=X23=0$, $\overline{AND}$ 600 produces a negative output signal that is inverted at 604 and applied to read out gates 606 and 608. If an addition is being performed $A-X$ is positive thereby conditioning the second input of 608. Upon occurrence of a Gate Top command, the output of 608 goes negative to reset A*23. If the operation is a subtraction operation then the command $A-X$ blocks 608 and conditions 606 thereby setting A*23.

If $A23=X23=1$, $\overline{AND}$ 602 produces a negative output signal which is inverted at 604 to condition gates 606 and 608. Again, if the operation is an addition, gate 608 is conditioned by the $A-X$ command to clear A*23, but if the operation is a subtraction gate 606 is conditioned to set A*23.

If $A23 \neq X23$, both 600 and 602 apply positive signals to 604. The negative output of 604 is inverted at 610 and conditions one input of gates 612 and 614. If a subtraction operation is being performed the command $A-X$ conditions a second input of 612 so that A*23 is cleared when the GATE TOP command appears. If an addition operation is being performed then the command $A-X$ is positive thus blocking 612 but conditioning 614 to set A*23.

The output of $\overline{AND}$ 602 is connected by lead 624 to a NOR circuit 626 in the next higher order stage 22. If both A23 and X23 are binary 1, 602 produces a negative carry signal on lead 624 which is added to the binary bits applied to stage 23 of the ADD TREE by A22 and X22.

The command $A-X$ is inverted at 620 and applied to $\overline{AND}$ circuits 628 of stages 22, 21, and 20. Thus, on each subtraction operation one input of each gate 628 is conditioned by the $A-X$ command which inserts the carry of 1.

Gate 628 of stage 22 has a second input connected to the output of $\overline{AND}$ 600 in stage 23. If either A23 or X23 or both A23 and X23 are 1, the carry applied to NOT 626 cannot be absorbed in stage 23 of the ADD TREE. The output of $\overline{AND}$ 600 conditions the second input of 628 in stage 22 in order to enter the carry into this stage. If neither stage 23 nor stage 22 can absorb the carry digit it is applied to stage 21 through the gate 628 of this stage. Gate 628 of this stage has a second input from 600 of stage 23 and a third input from 600 of stage 22 so that if A23 and X23 are not both 0, and A22 and X22 are not both 0, gate 628 of stage 21 is conditioned to accept the carry signal.

In like manner, stage 20 has a carry input gate 628 which is connected to the output of gates 600 in stages 21, 22, and 23. Thus, if stages 21, 22, and 23 cannot absorb the carry signal it is applied to stage 20 through the gate 628 of the stage.

Finally, the carry signal is applied to $\overline{AND}$ circuit 630. This circuit has 2nd, 3rd, 4th, and 5th inputs connected to the outputs of gates 600 in stages 20, 21, 22, and 23. If none of these stages can absorb the carry signal $\overline{AND}$ 630 is conditioned to produce an output signal which passes through NOR 632 and is applied as a carry signal to the input of groups 1 through 5.

Figure 6B:
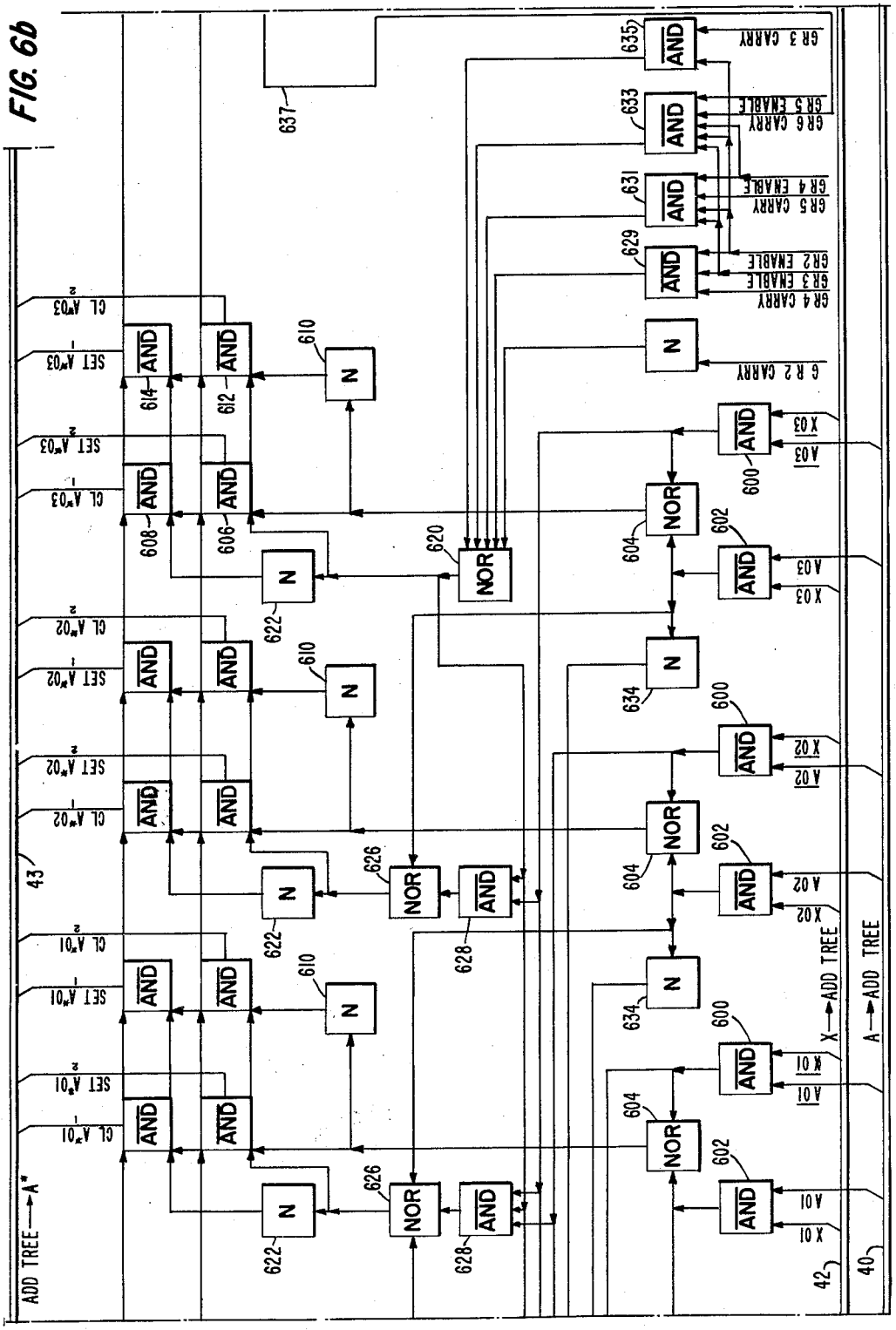

In order to speed up the carry operation, the ADD TREE is divided into six groups of four stages each. Group 1 comprising stages 00 through 03 and group 6 comprising stages 20 through 23 are shown in FIGURE 6, the remaining groups 2 through 5 being similar in operation to the groups shown. A carry output signal from any group is applied to each group containing higher order stages of the ADD TREE. Also, each group (except 6) produces a carry enable signal if none of the stages within that group are able to absorb a carry signal from a lower order group. Thus, the output of NOR circuit 632 is applied to an input gate in each of the groups 1 through 5 and passes through the gate of the group which is receiving enable signals from each of the lower order groups. For example, if none of the groups 2 through 5 are able to absorb the carry signal from group 6, they will condition an input gate of group 1 and the carry signal from NOR 632 will pass through this gate and appear on the lead 637. The carry input gates of group 1 are shown in FIGURE 6b comprise the gates 627, 629, 631, 633 and 635. For the assumed example where there is a carry from group 6 and groups 2 through 5 cannot absorb the carry the output of NOR 632 passes over lead 637 and through $\overline{\text{AND}}$ 633 to the carry input NOR circuit 620 in stage 03.

Consider now the case where stage 23 generates a carry bit which cannot be absorbed by stage 22. The output of $\overline{\text{AND}}$ 602 in stage 23 is inverted at 634 and applied to one input of $\overline{\text{AND}}$ circuits 636 in stages 21 and 20. The output of $\overline{\text{AND}}$ 600 in stage 22 is applied as a second input to the gates 636. In addition, gate 636 of stage 20 has a third input which is connected to the output of $\overline{\text{AND}}$ 600 in stage 21. If stage 23 generates a carry bit through NOT 634 and stage 22 cannot absorb the carry because A22 and/or X22 is a binary 1, the carry bit passes through $\overline{\text{AND}}$ 636 of stage 21. If neither stage 22 nor 21 can absorb the carry bit from stage 23, all inputs to gate 636 in stage 20 are positive and the carry bit enters this stage. The output of NOT circuit 634 is also connected to $\overline{\text{AND}}$ circuit 638. The 2nd, 3rd, and 4th inputs of 638 are connected to $\overline{\text{AND}}$ circuits 600 of stages 20, 21, and 22. Therefore, if stage 23 generates a carry bit which cannot be absorbed by either stage 20, 21, or 22, $\overline{\text{AND}}$ 638 produces a carry output signal which passes through NOR 632 to groups 1 through 5.

$\overline{\text{AND}}$ circuits 640 and 642 handle the carry bit generated by stage 22. $\overline{\text{AND}}$ 602 of stage 22 is connected through NOT circuit 634 to $\overline{\text{AND}}$ circuits 640 and 642. The output of $\overline{\text{AND}}$ 600 of stage 21 is also connected to $\overline{\text{AND}}$ circuits 640 and 632. In addition, the third input of $\overline{\text{AND}}$ 642 is connected to the $\overline{\text{AND}}$ circuit 600 of stage 20. If stage 22 produces a carry signal which cannot be absorbed by stage 21, all inputs to $\overline{\text{AND}}$ 640 are conditioned and the carry bit is applied to stage 20. If stage 22 produces a carry bit which cannot be absorbed by either stage 21 or 20, all inputs to $\overline{\text{AND}}$ 642 are conditioned and it produces a carry output signal through NOR 632 to groups 1 through 5.

$\overline{\text{AND}}$ 644 has one input connected to $\overline{\text{AND}}$ 600 of stage 20 and a second input connected to the NOT circuit 634 of stage 21. If stage 21 produces a carry which cannot be absorbed by stage 20, all inputs to 644 are conditioned and it produces a carry output signal which passes through NOR 632 to groups 1 through 5.

The output of $\overline{\text{AND}}$ 602 of stage 20 is connected through NOT 634 and NOT 646 to NOR 632. If both X20 and A20 are binary 1's, $\overline{\text{AND}}$ 602 of stage 20 produces a negative output signal which passes through 634, 646, and 632 to become the carry signal applied to groups 1 through 5.

Group 1 comprising stages 00 through 03 of the ADD TREE is similar in operation to group 6 described above and the elements in group 1 bear the same reference numerals as the corresponding elements of group 6.

It will be noted, however, that NOR 632 of group 1 has an additional input not present in group 6. This input comes from $\overline{\text{AND}}$ 650 which receives the commands PREVIOUS PARTIAL PRODUCT=0 and ADD 2X from the multiply controls. The third input of $\overline{\text{AND}}$ 650 is the signal X'00 which is the inverted output off the reset side of the sign stage X00 of the X register. The output of NOR 632 is applied to $\overline{\text{AND}}$ 652 and is inverted at 654 and applied to $\overline{\text{AND}}$ 656. If during the multiplier operation the previous partial product is 0, 2X is being added to A and the sign of the multiplicand is minus, all inputs to $\overline{\text{AND}}$ 650 are positive. The output of 650 is inverted at 632 and conditions 652. Upon occurrence of the GATE TOP command the output signal from 652 passes over buss 43 to set the flip-flop $A*-1$.

In like manner, any carry out of stage 1 makes the output of 632 positive thus conditioning 652 to set $A*-1$.

If $\overline{\text{AND}}$ 650 is blocked and there is no carry out of group 1, the output of 632 is negative. The signal is inverted at 654 and conditions $\overline{\text{AND}}$ 656 which then passes the command GATE TOP to reset flip-flop $A*-1$. As will be shown subsequently, stage $A*-1$ is provided for the insertion of correction digits during the multiply operation.

*A\* register*

The lower rank of the accumulator register, shown in FIGURE 7 and designated A*, stores the result of the addition operation performed in the ADD TREE. The sign of the sum is stored in stage A*00 and the twenty-three digits of the sum are stored in stages A*01 through A*23. Stages A*01 through A*23 are not shown in FIGURE 7 since these stages are similar to stage A*21.

Considering stage A*21 as an example, each stage includes a flip-flop 700 and a plurality of readout gates through which the content of the flip-flop may be transferred to the A register without shift, with a shift of one binary place to the right, or with a shift of two binary places to the right. The output from the reset side of the flip-flop is connected through a NOT circuit 702 to $\overline{\text{AND}}$ circuits 704, 706 and 708. The output from the set side of the flip-flop is connected through a NOT circuit 710 to $\overline{\text{AND}}$ circuits 712, 714, and 716.

The command A* to A generated by the multiply sequence controls appears on lead 1 and is inverted at 718 before being applied to the gates 704 and 712. If the flip-flop is set, the output of NOT circuit 702 is positive to condition gate 704. The signal A* to A passes through gate 704 and over buss 52 to set stage A21. If the flip-flop in stage A*21 is reset then the output of NOT 710 conditions gate 712 which passes the signal A* to A. The output from gate 712 passes over buss 52 to the reset input of the flip-flop in stage A21.

The command A* to A(R1) generated by the multiply sequence controls appears on lead 17 and is inverted at 720 before being applied to the gates 706 and 714. If the flip-flop is set the output of NOT 702 is positive to condition gate 706. The signal A* to A(R1) passes through gate 706 and over buss 48 to set stage A22. If the flip-flop in stage A*21 is reset, then the output of NOT 710 conditions gate 714 which passes the signal A* to A(R1). The output from gate 714 passes over buss 48 to the reset input of the flip-flop in stage A22.

The command A* to A(R2) generated by the multiply sequence controls appears on lead 15 and is inverted at 722 before being applied to the gates 708 and 716. If the flip-flop is set, the output of NOT circuit 702 is positive to condition gate 708. The signal A* to A(R2) passes through gate 708 and over buss 44 to set stage 23. If the flip-flop in stage A*21 is reset, then the output of NOT 710 conditions gate 716 which passes the signal A* to A(R2). The output from gate 716 passes over buss 44 to the reset input of the flip-flop in stage A23.

When A* is transferred to A with a shift of one place to the right, stage A*23 is entered into Q*00 and when A* is transferred to A with a shift of two binary places to the right, A*23 is entered into Q01 and A*22 is entered into Q00. During the multiply operation the A and Q registers are interconnected to form a single double length register. Any time a command is generated to shift Q* to Q. The signals appearing on leads 338 and 354 are employed to transfer the content of A*22 and A*23 to Q00 and Q01. These leads are connected to the transfer gates previously described with reference to the Q* register and shown in the left portion of FIGURE 3A.

The A* register has a twenty-fifth stage designated A*—1. This stage contains a flip-flop 724 which is either set or reset by the overflow digit from the ADD TREE.

The reset output of flip-flop 724 is connected to $\overline{AND}$ 726 and the set output is connected to $\overline{AND}$ 728. When it is desired to inject the overflow digit from the ADD TREE into A01, the multiply controls issue the command A*—1 to A01. The manner in which this command is generated is described subsequently in connection with the multiply sequence controls of FIGURE 9. When the command A*—1 to A01 appears on lead 25 it is applied to one input of 726 and 728. If flip-flop 724 is reset, 726 produces a negative output signal which is inverted at 730 and conditions one input of $\overline{AND}$ 732. If flip-flop 724 is set, 728 produces a negative output signal which is inverted at 734 and conditions one input of $\overline{AND}$ 736. Both 732 and 736 are conditioned by the command A* to A(R2).

Therefore, if $A*-1$ is reset and the commands $A*-1$ to A01 and A* to A(R2) are present, the negative output from 732 passes over buss 44 to the reset input of stage A01 in FIGURE 5. On the other hand, if $A*-1$ is set and the commands $A*-1$ to A01 and A* to A(R2) are present, the negative output from 736 passes over buss 44 to the set input of stage A01. If the commands $A*-1$ to A01 and A* to A(R2) do not occur simultaneously then the content of $A*-1$ cannot be transferred to A01.

During the set-up portion of a multiplication operation both the multiplier and multiplicand are checked for a value of 0 or —1. These operations take place in the A* register. The reset outputs of the flip-flops in stages A01 through A23 are connected to NOR circuits 738 and 740. The reset output of the sign stage A00 is connected directly to NOR 738 and is inverted and applied to NOR 740.

If all stages of A* are reset NOR 738 has positive signals applied to all inputs and produces a negative output signal. The output signal is inverted at 742 and becomes the signal $A*=0$. If any stage of A* contains a binary 1 the negative signal applied to 738 from this stage causes NOR 738 to produce a positive output signal which is applied to the multiply controls as the signal $A*\neq 0$.

If sign stage A*00 is set, and stages A*01 through A*23 are reset, all inputs to NOR 740 are positive. This causes NOT 744 to produce the positive output signal $A*=-1$. If sign stage A*00 is not set and stages A*01 through A*23 are not reset, then at least one input to NOR 740 is positive causing the positive signal $A*\neq-1$ to be produced.

Iteration Counter

The Iteration Counter keeps track of the number of iterations performed and signals the multiplier controls when the proper number of iterations has been performed. The counter is shown in FIGURE 8 and comprises two registers K and K*, means for subtracting 2 from a value as it is transferred from K* to K, and means for returning the result to K*.

Both the K and K* registers are cleared by the command CLEAR K and K* which appears on lead 7 on each cycle in which the EXTENDED SEQUENCE FF is not set. For present purposes, it is sufficient to assume that the command CLEAR K and K* occurs at MP5 immediately before initiation of the multiplication operation and does not appear again until MP5 of the cycle in which the multiplication operation is completed.

The command MULTIPLY is generated by the main computer control circuits at MP6 to initiate the multiply operation. This command appears on lead 802 to set flip-flops 00, 02, 03, and 04 in both the K and K* registers. Since stage 00 is the highest order, this has the effect of entering the value 23 into both K and K*. For the general case K and K* should be set to $N-1$ where N is an even number representing the number of digits in the multiplier. Since the specific embodiment shown herein utilizes a twenty-four digit multiplier K and K* are set to 24—1=23.

The output from the reset side of the flip-flop in each stage of K is connected to a $\overline{AND}$ circuit 804 and the output from the set side is connected to a $\overline{AND}$ circuit 806. The command K to K* is generated by the multiply control circuits and appears on lead 16 during a normal multiplication (no short cuts). This command first appears at the first MP3 time following the initiation of the multiplication operation. It then occurs every fourth main pulse time until the last MP15 immediately preceding the termination of the multiply operation. The signal on lead 16 is applied to each of the $\overline{AND}$ circuits 804 and 806. If a given stage of K contains a binary 1 then $\overline{AND}$ 806 produces a negative output pulse to set the flip-flop in the corresponding stage of K*. If a given stage of K contains a binary 0, then $\overline{AND}$ circuit 804 produces a negative output pulse to reset the flip-flop in the corresponding stage of K*.

The command K*—2 is generated by the multiply controls. As will be shown subsequently this command appears on lead 11 at the first MP15 after the MULTIPLY instruction is received and, if the multiplication is a normal multiplication, it remains negative until MP15 of the last cycle of the operation. The signal is inverted at 812 and applied to $\overline{AND}$ 814. The second input lead to 814 is positive as long as K* contains a value equal to or greater than 2. The negative output of 814 blocks gates 816 and 818 connected to the reset and set outputs respectively of flip-flop K*04. With an initial count of 23 in both K and K* and the value 2 being subtracted each time as K* is transferred to K, it is obvious that the least significant digit in K and K* never changes. Therefore, gates 816 and 818 are blocked to prevent K04 from being changed when K* is transferred to K.

The command $K*-N$ to $K$ appearing on lead 12 is also generated by the multiply controls. This command first appears at the first MP1 time following initiation of the multiplication operation and appears every fourth main pulse time until the last MP13 preceding the termination of the multiply operation. The command $K*-N$ to $K$ is applied to $\overline{AND}$ circuits 824 through 830.

Subtraction is accomplished in the Iteration Counter by sensing the K* register beginning with K*03 and proceding toward the high order stage K*00. As the stages of K* are sensed the corresponding stage of K is set to the complement of K*, up to and including the first stage of K* that contains a binary 1.

The output of NOR 820 initiates the sense operation and is applied to $\overline{AND}$ circuits 830 and 832. If K*03 contains a binary 1 the command $K*-N$ to K gates the output of NOR 820 through $\overline{AND}$ 830 to reset K03. On the other hand, if K*03 contains a binary 0 both inputs of $\overline{AND}$ 832 are positive and the sense signal from 820 passes through $\overline{AND}$ 832 and is inverted at 834 before being applied to $\overline{AND}$ circuits 828 and 829. In this case the command $K*-N$ to $K$ passes through $\overline{AND}$ 829 to set K03. If K*02 contains a binary 1 at this time the output of NOT 834 also passes through $\overline{AND}$ 828 to reset K02.

The output of NOT 834 is also applied to $\overline{AND}$ 836 which is connected to the set side of K*02. The output of $\overline{AND}$ 836 is inverted at 838 and applied to $\overline{AND}$ circuits 826, 827, and 840. If K*03 contains a binary 0 and K*02 contains a binary 0 the sense signal conditions $\overline{AND}$ 827 which then passes the command $K^*-N$ to $K$ to set K02. If K*03, K*02, and K*01 all contain binary zeros the sense signal output from NOT 838 passes through $\overline{AND}$ 840 and NOT 842 and is applied to $\overline{AND}$ circuits 824 and 825. The command $K^*-N$ to $K$ is then gated through $\overline{AND}$ 825 to set K01 and gated through 827 and 829 to set K02 and K03. On the other hand, if K*03 and K*02 contain binary zeros and K*01 contains a binary 1, the command $K^*-N$ to $K$ passes through $\overline{AND}$ 826 to reset K01 and through 827 and 829 to set K02 and K03.

Finally, if K*03, K*02, and K*01 all contain binary zeros and K*00 contains a binary 1, the sense signal conditions one input of AND circuits 824, 825, 827, and 829. When the command $K^*-N$ to $K$ appears on lead 822 it passes through 824 to reset K00 and through 825, 827 and 829 to set K01, K02 and K03.

It is seen therefore that the sense output from NOR 822 samples the $\overline{AND}$ circuits on both the set and reset side of succeeding stages K*. If a given stage contains a binary 1 then the corresponding stage of K is reset. If a given stage of K* contains a binary 0, then the corresponding stage of K is set and the sense signal propagated to the next stage.

The reset side of flip-flops K*00, K*01, and K*02 are connected to $\overline{AND}$ circuit 844. The output of 844 is inverted at 846 and applied to $\overline{AND}$ circuits 848, 850, and 852. The output of NOT 846 is the signal $K^*\leqq 3$ which is positive as long as the three high order stages of K* are reset.

The reset output of K*03 is applied to $\overline{AND}$ circuits 848, 850, and 854. The output from the reset side of K*04 is also applied to $\overline{AND}$ 854 the output of which is inverted at 856 before being applied to $\overline{AND}$ 852. If K*04 and K*03 are both reset the output from 854 conditions a second input of 852. As a result, 852 produces the positive signal $K^*\neq 0$ when at least one stage of K* is set, this signal becoming negative only when all stages are reset.

All inputs to $\overline{AND}$ 848 are positive if K*00 through K*03 are reset and 848 produces the positive output signal $K^*\geqq 2$ if any of these stages of K* contain a binary 1.

The output from the set side of K*04 is applied to $\overline{AND}$ 850. If K*04 contains a binary 1 and K*03 through K*03 through K*00 all contain binary zeros all inputs to $\overline{AND}$ 850 are positive. The output signal of 850 is inverted at 858 to become the positive signal $K^*=1$.

There is one cycle during the multiply operation in which the value 1 is subtracted from the content of the Iteration Counter. With an initial count of 23 the count is reduced to 1 after 11 iterations. At this time the output of $\overline{AND}$ 848 becomes negative and blocks $\overline{AND}$ 814. The output of 814 becomes positive thus conditioning one input of $\overline{AND}$ 816. Upon occurrence of the command $K^*-N$ to $K$ gate 818 produces a negative output signal to reset K04. This effects the subtraction of one since the low order stage 04 is changed from binary 1 to binary 0.

*Multiply Control Circuits*

The Multiply Control Circuits comprise thirteen flip-flops and the associated gates shown in FIGURE 9. The operation of these circuits varies depending upon the value of the multiplier and multiplicand. As noted above, the registers are capable of representing binary numbers in the range $-1\leqq X<1$. Therefore, if both the multiplier and multiplicand are $-1$, then the product is $+1$ which is outside the range of representation of the registers.

The multiply control circuits sense for this condition and produce an error indication if it exists. Also, since it is known that the product resulting from the multiplication operation will be useless, circuits are set to terminate the multiplication operation.

The multiply control circuits are also sensed for a zero multiplier or zero multiplicand. If either or both of these operands is zero it is immediately known that the result will be zero. In this case the multiply control circuits enter a zero product into the double length product register AQ and terminate the multiply operation. A shortened multiplication operation is also performed if either the multiplicand or the multiplier (but not both) is $-1$. If the multiplier is $-1$ the multiply control circuits sense this condition and place the complement of the multiplicand in the AQ register as the product. If the multiplicand is $-1$, the multiply control circuits sense this condition and insert the complement of the multiplier in the AQ register as the product.

The different operations involved in a shortened multiplication will be described with reference to the timing diagram of FIGURE 10a-10c. These diagrams each show one machine cycle beginning at MP6 when the MULTIPLY instruction appears on lead 900 in FIGURE 9a.

The first type of shortened multiply operation to be considered is the case where either the multiplier or the multiplicand is 0 thereby indicating that the product in the AQ register should be 0. This case is illustrated by the timing diagram in FIGURE 10a. Assume the multiplier is initially contained in both the A and A* registers and the multiplicand is stored in a memory device not shown.

The multiply instruction from the main instruction controls appear on lead 900 at MP6 and sets the MULTIPLY SEQUENCE FF and the EXTENDED SEQUENCE FF. Since a normal multiply operation takes more than one machine cycle, it is necessary to signal the computer controls to hold up the next instruction until the multiply operation is completed. The command EXTENDED SEQUENCE taken off the reset side of the extended sequence flip-flop performs this function and as long as the flip-flop is set, the computer controls will not initiate the execution of another instruction which involves the arithmetic circuits necessary for the multiply operation.

The output from the set side of the EXTENDED SEQUENCE FF is inverted at NOT 901 and applied to $\overline{AND}$ circuits 902 and 903. Thus, $\overline{AND}$ circuits 902 and 903 are blocked as long as the EXTENDED SEQUENCE FF is set.

When the MULTIPLY SEQUENCE FF is set at MP6, the positive output off the set side conditions one input of $\overline{AND}$ circuits 904, 905 and 906. $\overline{AND}$ circuits 904 and 905 are blocked at this time by negative signals on their other input leads. However, the MULTIPLY ITERATION 1 FF (FIG. 9b) is reset and the negative output off the set side is inverted at 907 and applied to the second input of $\overline{AND}$ 906 causing it to conduct when the MULTIPLY SEQUENCE FF is set. The output from $\overline{AND}$ 906 passes over lead 908 and through NOR 909 and NOT 910 (FIG. 9c) to become the command $A-X$. This command is applied to the ADD TREE (FIG. 6) to insert a carry digit and to the X Register (FIG. 2) to condition the complement read-out gates 202. The output of $\overline{AND}$ 906 is also inverted at 911 and applied to $\overline{AND}$ 912. Since the second input to 912 is negative at this time, the circuit does not produce an output signal.

The MULTIPLY SEQUENCE FF produces a negative voltage level on the reset output while it is set. This signal is inverted at 913 and applied to AND circuits 914 through 920. The negative output off the reset side is also inverted at 921 and applied to $\overline{AND}$ 922. Although conditioned by the output from the MULTIPLY SEQUENCE FF these $\overline{AND}$ circuits are not turned on at this time because of negative signals applied to their other inputs.

The negative output off the reset side of the MULTIPLY SEQUENCE FF is also applied to $\overline{AND}$ 923 (FIG. 9b) and prevents it from producing an output signal as long as the flip-flop is set.

At MP7 a timing pulse on lead 924 conditions the second input of $\overline{AND}$ 912 thereby producing the command A to X. As the name implies, this command causes the value standing in A to be transferred to the X register. Since the multiplier was initially stored in both the A and A* registers this means that at MP7 the multiplier is entered into the X register.

The MP7 pulse on lead 924 is also applied to $\overline{AND}$ 915 which is conditioned by the MULTIPLY SEQUENCE FF. If the multiplier standing in the A* register is 0, the signal $A^*=0$ appears on lead 925 to condition the third input of 915. The output signal from 915 passes through NOR 926, NOT 927, NOR 928, and NOT 929 to reset the EXTENDED SEQUENCE FF. Thus, since the multiplier is 0 it is known that the product will be 0, so it is unnecessary to go through a complete multiplication operation. The positive signal off the reset side of the EXTENDED SEQUENCE FF indicates to the computer control circuits that this is the last cycle of the multiply operation. Actually, the multiply operation does not cease when the EXTENDED SEQUENCE FF is set but is completed at the next MP5 when the timing pulse appearing on lead 930 is applied to $\overline{AND}$ circuits 902 and 903. The output of $\overline{AND}$ 902 is connected to the reset input of the $MP=-1$, $Mc=-1$, and MULTIPLY SEQUENCE FLIP-FLOPS and resets these flip-flops at MP5 if they have been set. The output of $\overline{AND}$ 903 is the command CLEAR K and K*. This command is applied to the iteration counter shown in FIGURE 8 to reset the K and K* registers.

At MP8 the timing pulse on lead 931 conditions the second input of $\overline{AND}$ 922. Since the first input is conditioned by the MULTIPLY SEQUENCE FF 922 produces the command X to Q*. This commands opens readout gates in the X register to permit the multiplier to be transferred from X to the Q* register.

At MP9 the timing pulse appearing on lead 932 is applied to $\overline{AND}$ circuits 904 and 920 both of which are conditioned by the MULTIPLY SEQUENCE FF, $\overline{AND}$ 904 produces the command Q* to Q which opens the readout gates of the Q* register to permit the transfer of the multiplier from Q* to Q. $\overline{AND}$ 920 produces the command CLEAR A which resets the flip-flops in the A register. Actually, this operation accomplished nothing if the multiplier is 0 since the A register will already contain 0 before the command CLEAR A is generated. The command does perform a useful function when the multiplier is not 0.

At MP10 the X register is cleared and at MP11, the multiplicand is transferred from memory to the X register. The controls for these operations do not come from the multiplier controls shown in FIGURE 9 but come directly from the computer memory and control circuits.

At MP13 a timing pulse appearing on lead 933 is applied to $\overline{AND}$ 905. The other input of 905 is conditioned by the MULTIPLY SEQUENCE FF so at MP13 905 produces an output signal which passes through NOR 934 and NOT 935 to become the command GATE TOP 2.

It will be remembered that when the MULTIPLY SEQUENCE FF was set it caused the generation of the command $A-X$. This command is generated as long as $\overline{AND}$ 906 is conditioned by the MULTIPLY SEQUENCE FF and causes the complement of the value in the X register to be applied to the ADD TREE. As explained above, the contend of the A register is continuously applied to the ADD TREE. The GATE TOP 2 command opens the readout gates on the output of the ADD TREE so that the sum of A and the complement of X can be entered into A*. Since A was cleared at MP9, the net result of this operation is to enter the 2's complement of the multiplicand into A*. If the multiplicand has the value 0, then the 2's complement of the multiplicand as entered in A* is also 0, the carry out of the high order of the ADD TREE being ignored.

If the multiplicand is 0, A* produces the signal $A^*=0$ on lead 925. This signal is applied to $\overline{AND}$ 917 and at MP15 a timing pulse appearing on lead 936 passes through $\overline{AND}$ 917, NOR 926, NOT 927, NOR 928, and NOT 929 to reset the EXTENDED SEQUENCE FF. The output of $\overline{AND}$ 917 also passes through NOR 937 to become the command CLEAR Q. The multiplier was transferred to Q at MP9 and if the multiplier is some value other than 0 and the multiplicand is 0, it is necessary to clear Q in order that the product register AQ will contain a zero product.

In summary, the multiplier is placed in A* and at time MP7 A* is sampled for a zero multiplier. If the multiplier is 0 then the EXTENDED SEQUENCE FF is reset at this time as indicated by the dotted portion of the timing diagram. The multiplicand is complemented and entered into A* and at MP15 A* is sampled for a zero multiplicand. If the multiplicand has a zero value then the EXTENDED SEQUENCE FF is reset at this time if it has not been previously reset at MP7 because of a zero multiplier. If the multiplicand is zero then the Q register is cleared in order to insure a product of zero in the AQ register.

At MP5, the timing pulse appearing on lead 930 samples $\overline{AND}$ circuits 902 and 903. Since the EXTENDED SEQUENCE FF is reset, the other inputs of these circuits are conditioned and 903 produces the command CLEAR K and K* and 902 produces an output signal to reset the MULTIPLY SEQUENCE FF.

The timing diagram shown in FIGURE 10b illustrates the operation of the multiply control circuits when the multiplier is $-1$ and the multiplicand is some value other than $-1$ or zero. Since this is another condition in which a short cut multiplication operation can be performed the multiplication will be completed at the first MP5 following receipt of the MULTIPLY instruction.

The MULTIPLY instruction appears on lead 900 at MP6 to set the MULTIPLY SEQUENCE FF and the EXTENDED SEQUENCE FF in the manner described above. The EXTENDED SEQUENCE FF blocks gates 902 and 903, and the output off the reset side signals the computer controls that an operation involving the arithmetic circuits is being performed. The positive output off the set side of the MULTIPLY SEQUENCE FF conditions one input of $\overline{AND}$ circuits 904, 905, and 906. With the MULTIPLY ITERATION 1 FLIP-FLOP reset at this time, the negative output off the set side of the flip-flop is inverted at 907 to condition the second input of $\overline{AND}$ 906. The output of 906 passes through NOR 909 and NOT 910 to become the command $A-X$. The output of 906 also passes through NOR 911 to condition one input of $\overline{AND}$ 912.

The negative output off the reset side of the MULTIPLY SEQUENCE FF passes through NOT 913 and is applied to $\overline{AND}$ circuits 914 through 920. The negative output off the reset side of this flip-flop is also applied to $\overline{AND}$ 923 to block this gate. The output off the reset side of the MULTIPLY SEQUENCE FF is also inverted at 921 and applied to one input of AND 922.

At MP7 the timing pulse appearing on lead 924 passes through $\overline{AND}$ 912 to become the command A to X. This command causes the multiplier which is contained in the A and A* registers to be transferred to the X register.

The MP7 pulse appearing on lead 924 is also applied to $\overline{AND}$ 914. If the multiplier standing in A* has a value, of −1 then a positive signal is present on lead 938 to condition the third input of 914. Therefore, the MP7 pulse passes through 914 to set the $Mp=1FF$. The output off the set side of this flip-flop conditions one input of $\overline{AND}$ circuits 939 and 916.

At MP8 the clock pulse appearing on lead 931 samples $\overline{AND}$ 922 and since the other input is conditioned by the output of the MULTIPLY SEQUENCE FF, the command X to Q* is generated. This command causes the multiplier to be transferred from X to the Q* register.

Next, an MP9 pulse appearing on lead 932 samples $\overline{AND}$ circuits 904 and 920. Both of these circuits are conditioned by the MULTIPLY SEQUENCE FF so $\overline{AND}$ 904 produces the command Q* to Q and $\overline{AND}$ 920 produces the command CLEAR A.

At MP10 the X register is cleared and at MP11 the multiplicand is transferred from memory to the X register. As stated before, the controls for performing these operations do not appear in FIGURE 9 but are supplied by the main computer and memory control circuits.

At MP13 the timing pulse appearing on lead 933 samples $\overline{AND}$ 905 and since the other input of 905 is conditioned by the MULTIPLY SEQUENCE FF, an output signal is produced which passes through NOR 934 and NOT 935 to become the command GATE TOP 2. Because the command A–X is present, the 1's complement of the multiplicand now held in the X register is continuously applied to the ADD TREE. Also, the content of the A register which is now cleared is also applied continuously to the ADD TREE. As shown in FIGURE 6, the $A-X$ enable signal also causes a 1 to be added into the low order of the values being summed in the ADD TREE. As a result, the sum formed in the ADD TREE is the 2's complement of the multiplicand and the GATE TOP 2 command enables this value to be transferred from the ADD TREE to the A* register.

Assume for the moment that the multiplicand is −1 so that the value entered into A* is also −1. The signal on lead 938 remains positive and at MP15 a timing pulse passes through $\overline{AND}$ 916 and appears on lead 940 to indicate that a multiply error exists. This is as it should be since the product of −1 and −1 is +1 which is beyond the range of representation of the registers. The output of $\overline{AND}$ 916 also passes through NOR 926, NOT 927, NOR 918, and NOT 929 to reset the EXTENDED SEQUENCE FF.

If the value standing in A* is not −1 at the time the clock pulse appears on lead 936 an error condition does not exist. The clock pulse on lead 936 is also applied to $\overline{AND}$ circuit 919. If the multiplicand is neither 0 nor −1, the leads 941 and 942 are positive at this time. Also, lead 943 is positive at this time since the multiplier now held in Q* is not equal to zero. However, $\overline{AND}$ 919 is blocked at this time because of the negative signal off the reset side of the $Mp=-1FF$.

At MP1 a clock pulse on lead 944 is applied to $\overline{AND}$ 939. The second input of this circuit is conditioned because the $Mp=-1FF$ is set. Therefore, 939 produces a negative output signal which passes through NOR 945 and NOT 946 to become the command A* to A. This causes the complement of the multiplicand to be transferred from A* register to the A register.

The output of 939 also passes over lead 947 and through NOR 937 to produce the command CLEAR Q. This resets the flip-flops in the Q register. It will be noted that at this time the correct product, that is, the complement of the multiplicand, appears in the double length product register AQ.

The output signal from 939 also passes over lead 948 and through 926, 927, 928, and 929 to reset the EXTENDED SEQUENCE FF.

At MP5 the timing pulse on lead 930 samples $\overline{AND}$ circuits 902 and 903 and since the EXTENDED SEQUENCE FF is reset, 902 produces an output pulse to reset the MULTIPLY SEQUENCE FF and the $Mp=-1FF$ and 903 produces the command CLEAR K and K* to reset the ITERATION COUNTER.

The operation of the multiply control circuits is somewhat different when the multiplicand is −1 and the multiplier is some value other than −1 or 0 and this sequence is illustrated by the timing diagram of FIGURE 10C. As before, the multiply operation begins at MP6 with the appearance of the multiply instruction on lead 900 to set the MULTIPLY SEQUENCE FF and the EXTENDED SEQUENCE FF.

The output off the reset side of the EXTENDED SEQUENCE FF signals the main computer controls that the multiplication operation is in progress and the arithmetic circuits are not available for other arithmetic operations. The signal off the set side of the flip-flop blocks $\overline{AND}$ circuits 902 and 903.

The output off the set side of the MULTIPLY SEQUENCE FF conditions $\overline{AND}$ circuits 904, 905, and 906 while the negative output off the reset side blocks $\overline{AND}$ 923. With the MULTIPLY ITERATION 1 FLIP-FLOP reset at this time, the negative output off the set side is inverted at 907 to condition the second input of $\overline{AND}$ 906. The output of $\overline{AND}$ 906 passes through NOR 909 and NOT 910 to produce the command A−X.

The negative output off the reset side of the MULTIPLY SEQUENCE FF is inverted at 921 and applied to one input of $\overline{AND}$ 922 and is inverted at 913 and applied to one input of AND circuits 914 through 920.

At MP7, the clock pulse appearing on lead 924 passes through $\overline{AND}$ 912 to produce the command A to X. This causes the multiplier standing in the A register to be transferred to the X register. At MP8 the clock pulse appearing on lead 931 is applied to $\overline{AND}$ 922 and since the other input is conditioned by the MULTIPLY SEQUENCE FF 922 produces the output signal X to Q*. This causes the multiplier to be transferred from the X register to the Q* register. At MP9 the clock pulse appearing on lead 932 is applied to $\overline{AND}$ circuits 904 and 920. The other input of both of these circuits is conditioned by the MULTIPLY SEQUENCE FF. $\overline{AND}$ 904 produces the command Q* to Q which causes the multiplier to be transferred from the Q* register to the Q register. $\overline{AND}$ 920 produces the command CLEAR A to reset the flip-flops in the A register.

At MP10, the X register is cleared and the multiplicand transferred into the X register from memory. As noted above, these operations are controlled by the main computer control circuits and not by the multiplier control circuits shown in FIGURE 9.

A clock pulse appearing on lead 933 at MP13 is applied to $\overline{AND}$ circuit 905 and since the other input of this circuit is conditioned by the MULTIPLY SEQUENCE FF an output signal is produced which passes through NOR 934 and NOT 935 to become the command GATE TOP 2. As explained previously, the GATE TOP 2 command in combination with the $A-X$ command causes the 2's complement of the multiplicand to be entered into A*. It was also previously explained that if the multiplicand is −1, then the complement of the multiplicand as it appears in A* is also −1. Hence, lead 933 becomes positive when the complement of the multiplicand is entered into A*. This signal is applied to one input $\overline{AND}$ 918 which is also conditioned at this time by the inverted signal off the reset side of the MULTIPLY SEQUENCE FF and by the positive signal off the reset side of the $Mp=-1FF$. At MP15 the clock pulse appearing on lead 936 conditions the fourth input to $\overline{AND}$ 918 and it produces an output signal to set the $Mc=-1FF$.

The set side of the $Mc=-1FF$ is connected to $\overline{AND}$ circuits 950 and 951 and NOT 952. The output of NOT 952 is connected to NOR 953 and NOT 954. The output of NOT 954 conditions one input of $\overline{AND}$ circuits 955 and 956. The output of NOR 953 conditions one input of $\overline{AND}$ 957.

At MP0 a clock pulse appears on lead 958 to condition the second input of $\overline{AND}$ 955. This circuit then produces the command Q to X which causes the multiplier standing in Q to be transferred to the X register.

A clock pulse appearing on lead 959 at MP2 conditions the second inputs of $\overline{AND}$ circuits 951 and 956. The output signal from 951 passes through NOR 937 to become the command CLEAR Q which resets the flip-flops in the Q register. The output signal from 956 passes through NOR 934 and NOT 935 to become the command GATE TOP 2. Since the A register was cleared at MP9 it is applying a zero value to the ADD TREE at time MP2. At this time the multiplier is in the X register, and because the command $A-X$ is still present because the MULTIPLY SEQUENCE FF is set the GATE TOP 2 command causes the complement of the multiplier to be placed in A*.

A clock pulse appears on lead 960 at time MP4. This pulse conditions the second input of $\overline{AND}$ circuits 950 and 957. The output signal from 957 passes through NOR 945 and NOT 946 to become the command A* to A. This transfers the complement of the multiplier from A* to A. It will be noted that at this time the correct product appears in the product register AQ with the complement of the original multiplier being held in A and Q holding a value of zero.

The output of $\overline{AND}$ 950 at time MP4 passes through NOR 926, NOT 927, NOR 928, and NOT 929 to reset the EXTENDED SEQUENCE FF. At MP5, the clock pulse appearing on lead 930 is applied to $\overline{AND}$ circuits 902 and 903 both of which are conditioned at this time by the output signal from the set side of the EXTENDED SEQUENCE FF. $\overline{AND}$ 903 produces the command CLEAR K and K* to reset the ITERATION COUNTER and $\overline{AND}$ 902 produces an output signal to reset the MULTIPLY SEQUENCE FF and the $Mc=1$ FF.

The following description of the multiply control circuits may be better understood by first considering the over-all objectives. From the timing diagram of FIGURE 11a, it is noted that a complete regular multiplication operation begins with the set-up operation which places the multiplier in the Q register and the multiplicand in the X register after checking each of them in the manner described above to see if a short cut multiplication can be made. These introductory operations occur between MP6 when the MULTIPLY instruction occurs and MP5 of the next machine cycle. A short cut multiplication operation is completed at this time.

A regular multiply operation also includes eleven iterative cycles during which the following operations take place: 1X is subtracted or 0X, 1X, or 2X is added to A by the ADD TREE and the result placed in A* at the same time Q is transferred to Q*; A*Q* is shifted right two places and entered into AQ; two is subtracted from the value in the ITERATION COUNTER; correction digits are entered into A00 and A01; and the two low order digits of the multiplier are sensed to determine the arithmetic operation for the next iteration. As shown in FIGURE 11a, the first iteration cycle overlaps the setup operations and occurs between MP0 and MP4 while the last of the similar iteration cycles occurs between MP9 and MP12 of the third machine cycle following the one in which the multiply operation is initiated.

A twelfth iteration cycle follows the first eleven iteration cycles and includes the following operations. Q is transferred to Q* at the same time 0 or X is added to A and result placed in A*. Zero is added if the multiplier digit sensed is 0 and X is added if the single multiplier digit sensed is a 1. A* and Q* are then shifted right one position into AQ and the correction digit injected into A0. Finally, one is subtracted from the value in the ITERATION COUNTER.

An end correction cycle follows the twelfth iteration cycle. During this cycle X is subtracted from A and result placed in A* if the sign of the multiplicand is minus. The low order bits of Q23 and Q*23 are cleared and the final product is transferred from A*Q* to AQ.

The operation of the multiply control circuits during a normal multiply operation (no short cuts) will now be described with reference to the circuits shown in FIGURE 9 and the timing diagram shown in FIGURE 11. FIGURE 11 is drawn for the specific case where The MULTIPLY instruction appears on lead 900 at time MP6 and sets the EXTENDED SEQUENCE FF and the MULTIPLY SEQUENCE FF. The output off the zero side of the EXTENDED SEQUENCE FF signals the main computer controls that an arithmetic operation is in progress and the arithmetic circuits are not available for use.

The positive signal from the set side of the MULTIPLY SEQUENCE FF conditions one input $\overline{AND}$ circuits 904, 905, and 906. The MULTIPLY ITERATION 1 FF is reset at this time and the negative signal off the set side is inverted at 907 to condition the second input of $\overline{AND}$ 906. The output from 906 passes over lead 908 and through NOR 909 and NOT 910 to become the command $A-X$. The output of 906 is also applied to $\overline{AND}$ 912 through NOR 911.

The negative signal appearing on the reset side of the MULTIPLY SEQUENCE FF is applied to $\overline{AND}$ 923 thereby blocking it. The output off the reset side of the MULTIPLY SEQUENCE FF is inverted at 921 and applied to one input of $\overline{AND}$ 922 and is inverted at 913 and applied to one input of $\overline{AND}$ circuits 914 through 920.

A clock pulse appearing on lead 924 at time MP7 passes through $\overline{AND}$ 912 to become the command A to X. This causes the multiplier to be transferred from the A register to the X register.

At MP8, a clock pulse appears on lead 931 and passes through $\overline{AND}$ 922 to become the command X to Q*. This command causes the multiplier to be transferred from the X register to the Q* register.

The clock pulse appearing on lead 932 at MP9 is applied to $\overline{AND}$ circuits 904 and 920 both of which are conditioned at this time by the MULTIPLY SEQUENCE FF. The output signal from 904 is the command Q* to Q which causes the multiplier to be transferred from Q* to the Q register. The output signal from $\overline{AND}$ 920 is the command CLEAR A which resets the flip-flops in the A register.

The X register is cleared at MP10 and the multiplicand entered therein at MP11 by signals from the main computer memory and control circuits.

A clock pulse appears on lead 933 at time MP13 and is applied to AND 905 the second input of which is conditioned by the MULTIPLY SEQUENCE FF. The output signal from 905 passes through NOR 934 and NOT 935 to become the command GATE TOP 2. With the A register cleared and applying a zero value to one set of inputs of the ADD TREE and the signal $A-X$ present thereby applying the complement of the value of the X register to the second set of inputs of the ADD TREE, the GATE TOP 2 command causes the complement of the value in the X register to be entered into A*. Since the multiplicand was entered into X at time MP11, the value which is entered into A* MP13 is the complement of the multiplicand.

Under the assumed conditions, that is, with neither the multiplier nor the multiplicand equal to 0 or −1, leads 941, 942, and 943 (FIG. 9b) are positive at MP15. The complement of the multiplicand contained in A* at this time is neither 0 nor −1, therefore A* produces the positive signal $A*\neq 0$ on lead 941 and the signal $A*\neq -1$ on lead 942. The multiplier contained in Q* at this time is not 0 so that the Q* register produces the positive signal $Q*\neq 0$ on lead 943. At MP15 a clock pulse appearing on lead 936 passes through $\overline{AND}$ 919 to set the MULTIPLY ITERATION 1 FF and reset the PHASE ADD FF. The output of $\overline{AND}$ 919 is also connected to NOT 964 (FIG. 9c) and the output of this inverter conditions one input of $\overline{AND}$ circuits 965 and 966 when 919 is turned on.

The reset side of the MULTIPLY ITERATION 1 FLIP-FLOP is connected to $\overline{AND}$ circuit 967 through NOT 968. The second input of $\overline{AND}$ 967 receives clock pulses appearing at MP1, 5, 9, and 13 on lead 969. These pulses pass through 967 to become the command GATE TOP 1 as long as the MULTIPLY ITERATION 1 FF is set.

Figure 9A:
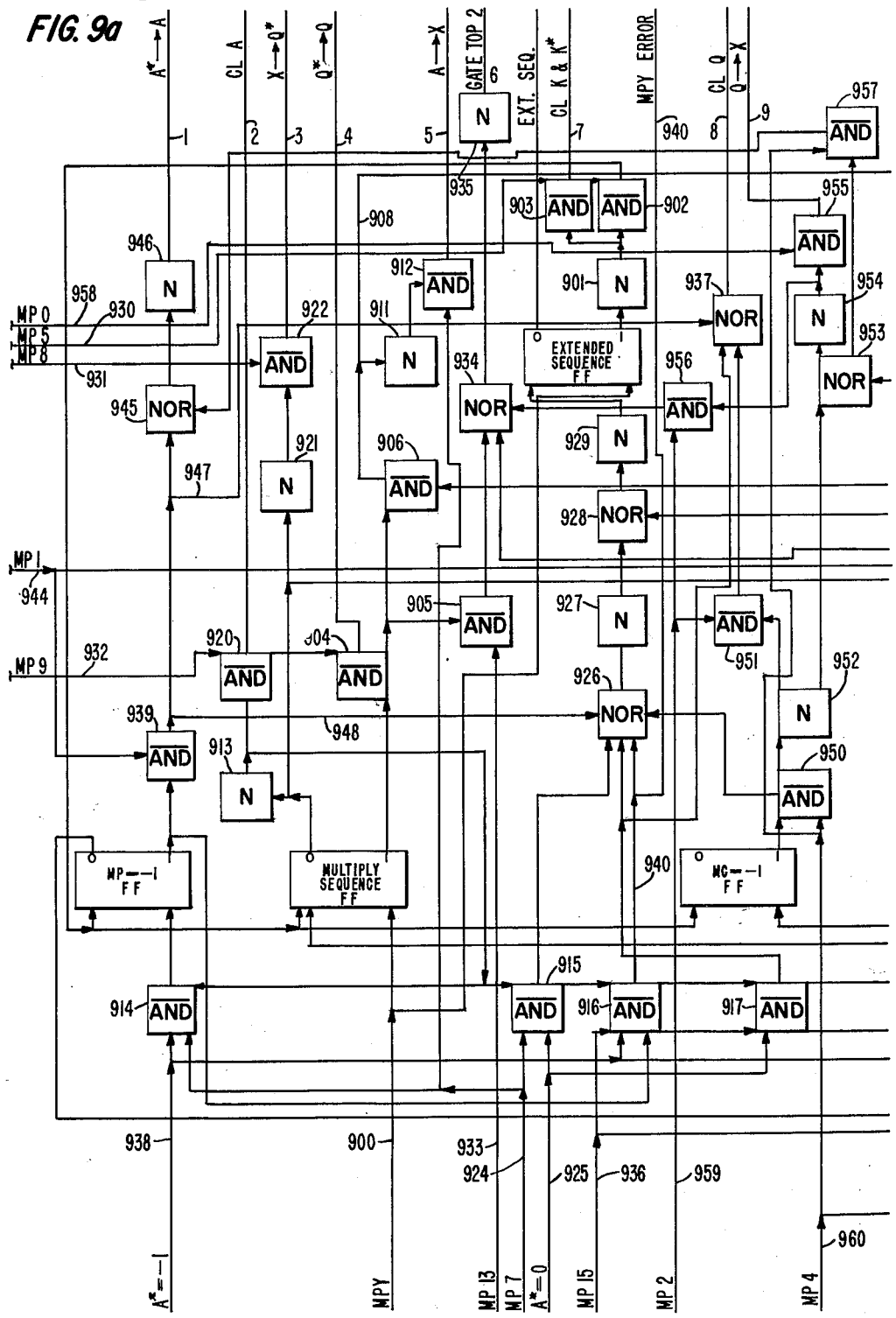
Figure 9B:
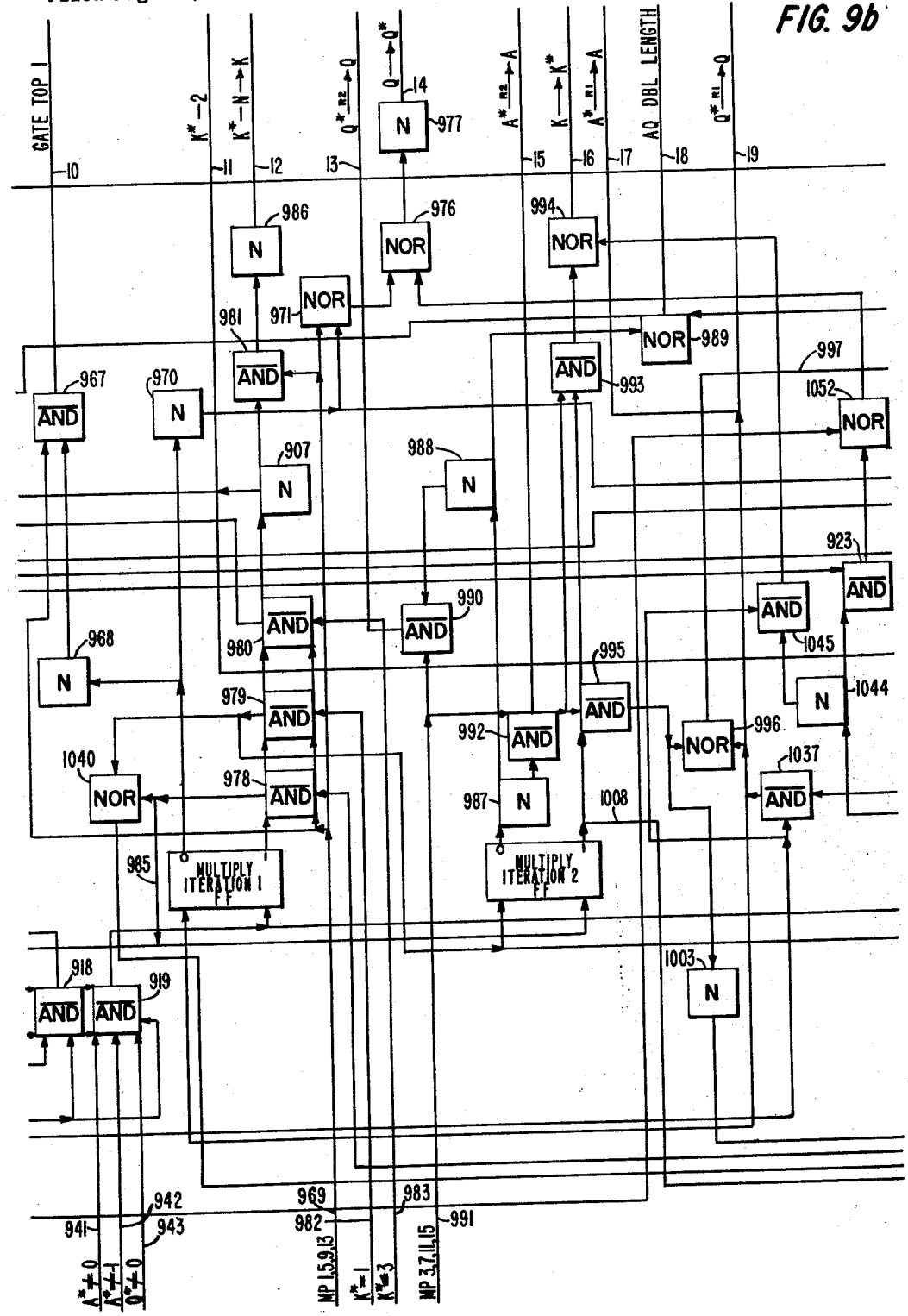
Figure 9C:
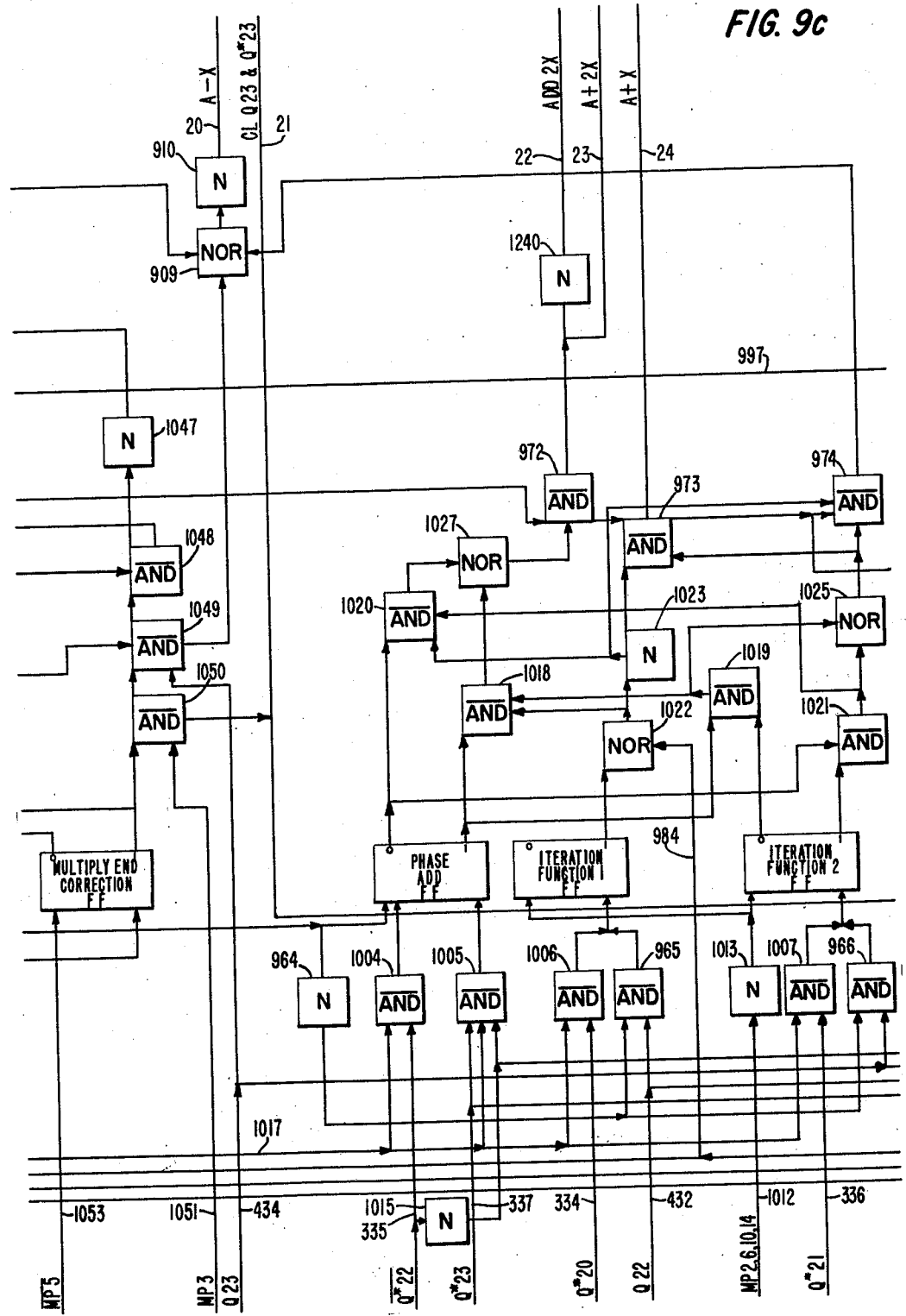
Figure 9D:
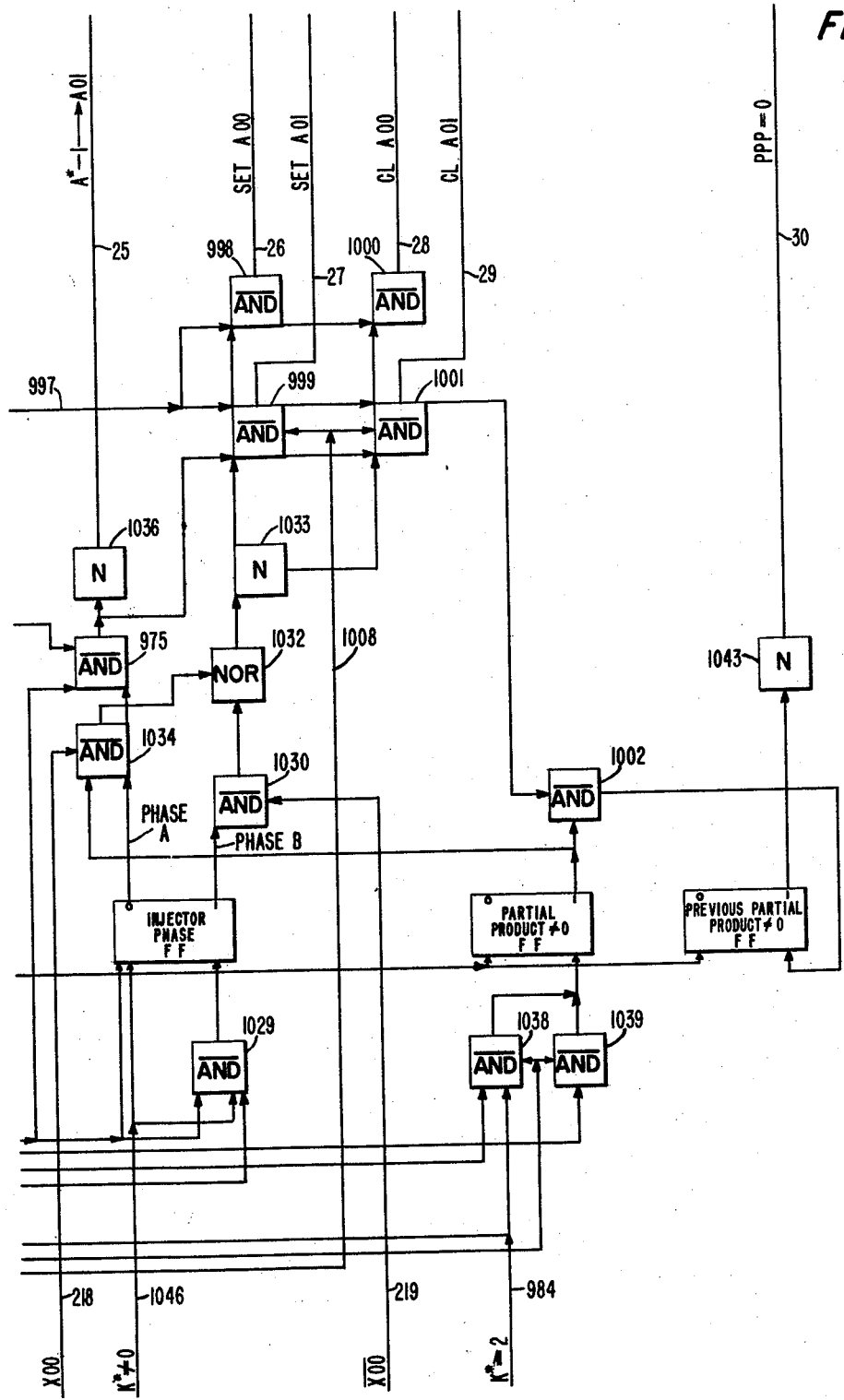

The reset side of the MULTIPLY ITERATION 1 FF is also connected through NOT 970 to one input of NOR 971 and to one input of $\overline{AND}$ circuits 972, 973, 974 (FIG. 9c) and 975 (FIG. 9d). Clock pulses appearing on lead 969 at times MP1, 5, 9, and 13 apply a positive voltage to the second input of NOR 971. Therefore, at these times, the output of NOR 971 is negative and this signal passes through NOR 976 and NOT 917 to become the command Q to Q*.

The positive signal off the set side of the MULTIPLY ITERATION 1 FF conditions one input of $\overline{AND}$ circuits 978, 979, 980, and 981 and is applied to NOT circuit 907. The negative output from 907 blocks $\overline{AND}$ circuit 906 and since 906 produces the command $A-X$ this command ceases when the MULTIPLY ITERATION 1 FF is set. The negative output of NOT 907 is the command $K*-2$.

MP1, 5, 9 and 13 timing pulses are also applied to $\overline{AND}$ circuits 978, 979, 980, and 981. With a count of twenty-three in the ITERATION COUNTER at this time, $K*\neq 1$ and $K*-3$ so the leads 982 and 983 are negative at this time to block $\overline{AND}$ circuits 979 and 980. However the signal $K\geq 2$ appearing on lead 984 is positive and 978 produces output signals at times 1, 5, 9, and 13 which are applied over lead 985 to reset the MULTIPLY SEQUENCE FF and set the MULTIPLY ITERATION 2 FF.

MP1, 5, 9, and 13 clock pulses applied to $\overline{AND}$ 981 pass through NOT 986 to become the command $K*-N$ to $K$. This command in conjunction with the command $K*-2$ produced by the output of NOT 907 causes the value 2 to be subtracted from the content of the K* register and the result to be entered into the K register of the ITERATION COUNTER.

The MULTIPLY ITERATION 2 FF is set by the first MP1 pulse passing through $\overline{AND}$ 978 after the MULTIPLY ITERATION 1 FF is set. The negative signal off the reset side of the MULTIPLY ITERATION 2 FF is applied to NOT 987, NOT 988, and NOR 989. The output of NOR 989 is the command AQ DOUBLE LENGTH. As explained with reference to the Q* register, this command has the effect of connecting the A and Q register into a single double length register by connecting A*22 and A*23 to a shift circuit the output of which is connected to Q00 and Q01.

The output of NOT 988 is connected to one input of $\overline{AND}$ 990. Clock pulses appearing on lead 991 condition the second input of $\overline{AND}$ 990 and cause the command Q* to Q(R2) to be produced at MP3, 7, 11, and 15.

The output of NOT 987 is connected to one input of $\overline{AND}$ 992 which also receives the clock pulses appearing on lead 991. The output of 992 is the command A* to A(R2) which appears at times MP3, 7, 11, and 15 as long as the MULTIPLY ITERATION 2 FF is set.

The positive output off the set side of the MULTIPLY ITERATION 2 FF conditions one input of AND circuits 993 and 995 which also receives the clock pulses appearing on lead 991. The output of 993 is inverted at 994 to produce the positive command K to K* which appears at MP3, 7, 11, and 15 as long as the MULTIPLY ITERATION 2 FF is set. This command causes the content of the K register to be transferred to the K* register of the ITERATION COUNTER.

The output of 995 passes through NOR 996 and over lead 997 to condition one input of each of the $\overline{AND}$ circuits 998 through 1002 of FIG. 9d. The output of 995 is inverted at 1003 and applied to $\overline{AND}$ circuits 1004 through 1007 in FIG. 9c. Therefore, one input of gates 998 through 1002 and 1004 through 1007 is conditioned at MP3, 7, 11, and 15 as long as the MULTIPLY ITERATION 2 FF is set.

The output off the set side of the MULTIPLY ITERATION 2 FF is applied directly to $\overline{AND}$ circuits 999 and 1001 over the lead 1008. The negative signal on this lead when the MULTIPLY ITERATION 2 FF is reset blocks 999 and 1001 even though the lead 997 may be positive because of the signal applied to NOR 996 when the MULTIPLY END CORRECTION FF is set.

The function of the PHASE ADD, ITERATION FUNCTION 1, and ITERATION FUNCTION 2 flip-flops, will be explained before proceeding with the general description of FIGURE 9. As noted before, the two low order multiplier digits are sensed simultaneously to determine the value to be added to the partial product on the next iteration. It is possible, therefore, that the two multiplier digits may specify that the present partial product be 0, 1, 2, or 3 times the multiplicand. If the two multiplier digits are 00, then the multiplicand is not read out from the X register to the ADD TREE to be combined with the previous partial product. If the two multiplier digits are 01, then the multiplicand is read out without shift from the X register to the ADD TREE and added to the previous partial product. If the two multiplier digits are 10, then the multiplicand is read out from the X register with a shift of one binary place to the left and applied to the ADD TREE where it is added to the previous partial product. A shift of one binary place to the left is equivalent to multiplying the multiplicand by 2 and is accomplished by pulsing the read-out gates on the output of the X register with the command $A+2X$.

A special problem is presented if the two multiplier digits are 11. The formation of 3X and its addition to the previous partial product cannot be accomplished during one iteration cycle where a single two-input adder is used. The present device accomplishes the multiplication of 3 times X by subtracting 1X from the previous partial product during one iteration and adding 4X on the next iteration.

The previous partial product is contained in the double length re-register AQ. This register is shifted to the right 2 places after each add (subtract) operation. Thus, for the case where the low order multiplier digits are 11, X is subtracted from the previous partial product and the result shifted two places to the right as it is returned to AQ. On the next iteration cycle, 1X is added to the previous partial product, but since the previous partial product has been shifted two places to the right this is equivalent to adding in 4X.

A further problem is presented at this point. At the time 4X is to be added to the previous partial product, the next two high order multiplier digits have been sensed and the circuits should be set to subtract the multiplicand or add in either 0, 1, 2, or 3 times the multiplicand. If these multiplier digits are 00, then nothing is to be added for these digits and it is sufficient to add X to take care of the "carry-over" of 4 times the multiplicand from the previous iteration. If these two multiplier digits are 01, then 2X must be added to the partial product, 1X for these multiplier digits and 1X to take care of the carry-over of 4X from the last iteration. If these multiplier digits are 10, then 3 times the multiplicand must be added to the previous partial product, 2X as specified by these multiplier digits, and 1X to take care of the carry-over of 4X from the last iteration. Finally, if the multiplier digits are 11 then 4X must be added to the accumulated partial product, 3X as specified these multiplier digits, and 1X to take care of the carry-over of 4X from the last iteration.

The last two conditions stated above require the addition of 3X and 4X respectively. The addition of 3X is accomplished in the same manner as for the first pair of multiplier digits by subtracting 1X on this cycle and adding X on the next cycle after the double shift to the right of the product register. The addition of 4X is accomplished by merely adding X on the next cycle.

For purposes of explanation, an iteration cycle wherein there is no carry-over from the preceding iteration cycle to be considered is designated phase A and is characterized by the PHASE ADD FF being reset. An iteration cycle wherein a carry-over from the preceding cycle must be considered is designated phase B and is indicated by the PHASE ADD FF being set. Table 1 summarizes the arithmetic operations which must be performed and the requirements for determining the phase of the next iteration.

| Phase of present iteration | Multiplier Digits | Operation | Next iteration is in phase |
|---|---|---|---|
| A | 00 | Add nothing | A |
| A | 01 | Add X | A |
| A | 10 | Add 2X | A |
| A | 11 | Subtract X | B |
| B | 00 | Add X | A |
| B | 01 | Add 2X | A |
| B | 10 | Subtract X | B |
| B | 11 | Add nothing | B |

Returning now to the description of FIGURE 9, the ITERATION FUNCTION 2 FF is set in accordance with the value of the low order multiplier digit and the ITERATION FUNCTION 1 FF is set in accordance with the next to the low order digit. ITERATION FUNCTION 2 FF is set if the low order multiplier digit is a 1 and ITERATION FUNCTION 1 FF is set if the next to the low order digit is a 1.

Because of certain timing considerations, it is expedient to sense the two low order digits of the multiplier while they are in the Q register for the first iteration and to sense the two multiplier digits in the Q* register before they are shifted into the Q register for the remaining iteration cycles. For this reason, stages Q22 and Q23 continuously apply indications of their binary content to $\overline{AND}$ circuits 965 and 966 respectively. The second input of 965 and 966 becomes positive at the first MP15 when the clock pulse passes through $\overline{AND}$ 919 and NOT 964. Succeeding MP15 pulses cannot pass through 919 to condition 965 and 966 because the MULTIPLY SEQUENCE FF is reset by the output of 978 at MP1 immediately following the first MP15 thereby applying a negative signal to 919.

As previously explained, the multiplier is stored in the Q register and the product developed in the combined or double length register AQ. On each iteration, AQ is transferred to A*Q* with some value from X being added to AQ after which the content of A*Q* is transferred to AQ with a shift of two places to the right. Therefore, the two multiplier digits in Q22 and Q23 are transferred to Q*22 and Q*23 and are subsequently lost when the shift of two places to the right is made as Q* is transferred to Q. Also, the stages Q20 and Q21 are transferred to Q*20 and Q*21 and then shifted right two places and entered into Q22 and Q23 as the transfer is made from Q* to Q. It is obvious therefore that the two low order digits of the multiplier which are sensed to control each iteration cycle after the first appear in Q*20 and Q*21 previous to the time they are entered into Q22 and Q23. Thus, for the second and subsequent iterations Q*20 and Q*21 are sensed to determine the arithmetic operation to be performed on the next iteration.

The lead 334 (FIG. 9c) is positive as long as Q*20 contains a binary 1 and lead 336 is positive as long as Q*21 contains a binary 1. The MULTIPLY ITERATION 2 FF is set as described above at the first MP1 following the appearance of the multiply instruction, thereby conditioning gates 1004 through 1007 at times MP3, 7, 11 and 15. If Q*20 contains a binary 1 $\overline{AND}$ 1006 sets the ITERATION FUNCTION 1 FF and if Q*21 contains a binary 1 $\overline{AND}$ 1007 sets the ITERATION FUNCTION 2 FF. These flip-flops are reset at MP2, 6, 10, and 14 by positive clock pulses appearing on lead 1012 and inverted at 1013.

The PHASE ADD FF indicates whether or not a carry-over of 4X must be taken into account during an iteration cycle. The PHASE ADD FF is reset at the first MP15 by the output of $\overline{AND}$ 919. Thus, the iteration cycles always begin with the PHASE ADD FF reset, so that the first iteration always takes place in Phase A.

As explained with reference to the sensing of Q*20 and Q*21 the two low order multiplier digits Q22 and Q23 (Q*20 and Q*21) used in one iteration appear in Q*22 and Q*23 during the next iteration cycle. These digits indicate whether the iteration is to be of the Phase A type wherein no carry-over is to be taken into account or of the Phase B type where a carry-over must be taken into account.

Table 1 shows the phase must be Phase B regardless of the previous phase if the previous multiplier digits (now in Q*22 and Q*23) are 11. With Q*22=1, lead 335 is negative and blocks $\overline{AND}$ 1004. The signal on lead 335 is inverted at 1015 and conditions one input of $\overline{AND}$ 1005. With Q*23=1, lead 337 is positive. Therefore, a clock pulse appearing on lead 1017 at MP3, 7, 11, or 15 will set the PHASE ADD FF to indicate a Phase B condition.

Table 1 also shows that the next phase must be Phase A regardless of the previous phase if the next to the lower digit of the previous multiplier pair was 0. This digit is in Q*22 so if Q*22=0, lead 335 is positive to condition $\overline{AND}$ 1004 while the signal on 335 is inverted at 1015 to block $\overline{AND}$ 1005. A clock pulse appearing on lead 1017 at MP3, 7, 11, or 15 passes through $\overline{AND}$ 1005 to set the PHASE ADD FF and indicate the next iteration is in Phase A.

If the previous multiplier digits were 10, then the present phase must be the same as the last phase. With previous multiplier digits of 10 lead 335 is negative and blocks $\overline{AND}$ 1004 while lead 337 is negative to block $\overline{AND}$ 1005. Thus, the PHASE ADD FF remains in the same phase as for the preceding iteration.

The set side of the PHASE ADD FF is connected to $\overline{AND}$ circuits 1018 and 1019 and the reset side is connected to $\overline{AND}$ circuits 1020 and 1021. The set side of the ITERATION FUNCTION 1 FF is connected to NOR 1022 which also receives a positive signal on lead 984 as long as K* is equal to or greater than 2. When K* is less than 2 or the ITERATION FUNCTION 1 FF is reset, NOR 1022 produces a positive output signal to condition one input of $\overline{AND}$ circuits 973 and 1018. The output of NOR 1022 is inverted at 1023 and blocks $\overline{AND}$ circuits 974 and 1020. The negative output from 1022 as a result of K* being equal to or greater than 2 and the ITERATION FUNCTION 1 FF being set conditions one input of 974 and 1020 and blocks 973 and 1018.

The set and reset outputs of the ITERATION FUNCTION 2 FF are connected to $\overline{AND}$ circuits 1021 and 1019 respectively. With the PHASE ADD FF set and the ITERATION FUNCTION 2 FF reset, 1019 produces a negative output signal to block 1018. The output of 1019 is inverted at NOR 1025 and conditions one input of $\overline{AND}$ circuits 973 and 974. With either the PHASE ADD FF reset or the ITERATION FUNCTION 2 FF set 1019 produces a positive output signal to condition $\overline{AND}$ 1018 and block $\overline{AND}$ circuits 973 and 974.

The output of $\overline{AND}$ 1021 is negative if the PHASE ADD FF is reset and the ITERATION FUNCTION 2 FF is set. This output blocks $\overline{\text{AND}}$ 1020 and is inverted at 1025 to condition $\overline{\text{AND}}$ circuits 973 and 974. If the PHASE ADD FF is set or the ITERATION FUNCTION 2 FF is reset the output of 1021 is positive thereby conditioning 1020 and blocking 973 and 974.

An inverted output off the reset side of the MULTIPLY ITERATION 1 FLIP-FLOP (FIG. 9b) conditions one input of 972, 973, and 974 as long as the flip-flop is set.

Table 1 above tabulates the conditions under which the commands $A+X$, $A+2X$, and $A-X$ should be generated. The command $A+X$ causes X (the multiplicand) to be read out to the ADD TREE where it is added to A. The command $A+2X$ causes X to be read out to the ADD TREE with a shift of one place to the left and then added to A. The command $A-X$ causes the complement of X to be read out to the AND TREE and added to A. The result developed in the ADD TREE is gated out to the A* register by the command GATE TOP 1 which appears at MP1, 5, 9, 13 as long as the MULTIPLY ITERATION 1 FF is set.

It will now be shown that the circuits associated with the PHASE ADD, ITERATION FUNCTION 1, and ITERATION FUNCTION 2 FLIP-FLOPS do in fact cause these commands to be produced under the conditions stated in Table 1.

In Phase A with the multiplier digits 00, the PHASE ADD FF is set and the ITERATION FUNCTION 1 and 2 FF's are reset. The negative output off the set side of the PHASE ADD FF blocks $\overline{\text{AND}}$ 1018. The output of 1018 is inverted at 1027 and applied to $\overline{\text{AND}}$ 972. This blocks 972 and prevents it from producing the command $A+2X$. The output off the set side of the ITERATION FUNCTION 1 FF is negative and this signal is inverted at 1022, inverted again at 1023, and applied to $\overline{\text{AND}}$ 974 thereby preventing 974 from producing the command $A-X$. The negative signal off the set side of the ITERATION FUNCTION 2 FF blocks $\overline{\text{AND}}$ 1021. The output of 1021 is inverted at 1025 and applied to $\overline{\text{AND}}$ 973 to prevent the production of the command $A+X$. It is seen therefore that if the two multiplier digits being sensed are both 0 and this is a Phase A operation, no commands are issued to cause the multiplicand to be added to the content of the A register. This is in agreement with Table 1.

In a Phase A operation with multiplier digits 01, the PHASE ADD and ITERATION FUNCTION 1 FF's are reset and the ITERATION FUNCTION 2 FF is set. Under these conditions, $\overline{\text{AND}}$ 1021 produces a negative output signal which is inverted at 1025 to condition one input of $\overline{\text{AND}}$ 973. With the ITERATION FUNCTION 1 FF reset the negative signal off the set side is inverted at 1022 to condition the second input of $\overline{\text{AND}}$ 973. With the third input of 973 conditioned by the MULTIPLY ITERATION 1 FF the circuit produces the command $A+X$.

In a Phase A operation with multiplier digits 10, the PHASE ADD FF and ITERATION FUNCTION 2 FF are reset and the ITERATION FUNCTION 1 FF is set. The positive signal off the reset side of the PHASE ADD FF conditions one input of 1020. The positive signal off the set side of the ITERATION FUNCTION 1 FF is inverted at 1022 and inverted again at 1023 to condition the second input of 1020. With the ITERATION FUNCTION 2 FF reset the negative output off its set side blocks $\overline{\text{AND}}$ 1021. The resulting positive output from 1021 conditions the third input of 1020 which produces a negative output signal that is inverted at 1027 to condition AND 972. This causes the command $A+2X$ to be produced.

In a Phase A operation with multiplier digits 11, the PHASE ADD FF is reset and the ITERATION FUNCTION 1 and 2 FF's are set. The positive outputs from the reset side of the PHASE ADD FF and the set side of the ITERATION FUNCTION 2 FF condition $\overline{\text{AND}}$ 1021. The output of 1021 is inverted at 1025 and conditions one input of $\overline{\text{AND}}$ 974. The positive signal off the set side of the ITERATION FUNCTION 1 FF is inverted at 1022, inverted again at 1023 and applied to AND 974 to condition a second input. With all inputs conditioned 974 produces an output signal which passes through NOR 909 and NOT 910 to become the command $A-X$.

In a Phase B operation with multiplier digits 00 the PHASE ADD FF is set and ITERATION FUNCTION 1 and 2 FF's are reset. The negative output off the set side of the ITERATION FUNCTION 1 FF is inverted at 1022 and conditions one input of $\overline{\text{AND}}$ 973. The positive signals off the set side of the PHASE ADD FF and the reset side of the ITERATION FUNCTION 2 FF condition $\overline{\text{AND}}$ 1019 which produces a negative output signal that is inverted at 1025 and applied to a second input of $\overline{\text{AND}}$ 973. With all inputs conditioned 973 produces the command $A+X$.

In a Phase B operation with multiplier digits 01 the PHASE ADD and ITERATION FUNCTION 2 FF's are set and the ITERATION FUNCTION 1 FF is reset. The positive signal off the set side of the PHASE ADD FF conditions one input of $\overline{\text{AND}}$ 1018. The negative output off the set side of the ITERATION FUNCTION 1 FF is inverted at 1022 to condition the second input of 1018. The negative output off the reset side of the ITERATION FUNCTION 2 FF blocks gate 1019 and the positive output from 1019 conditions the third input of 1018. With all three inputs conditioned 1018 produces a negative output signal which passes through 1027 and 972 to become the command $A+2X$.

In a Phase B operation, with multiplier digits 10, the PHASE ADD and ITERATION FUNCTION 1 FF's are set and the ITERATION FUNCTION 2 FF is reset. The positive signals off the set side of the PHASE ADD FF and the reset side of the ITERATION FUNCTION 2 FF condition $\overline{\text{AND}}$ 1019. The negative output of 1019 is inverted at 1025 and conditions one input of $\overline{\text{AND}}$ 974. The positive signal off the set side of the ITERATION FUNCTION 1 FF is inverted at 1022 and inverted again at 1023 and applied to $\overline{\text{AND}}$ 973 to prevent this circuit from producing the command $A+X$. The negative output off the reset side of the PHASE ADD FF also blocks AND 1021. The output of 1021 is a positive signal which is inverted at 1025 and applied to 974 to prevent this circuit from producing the command $A-X$. As a result, none of the arithmetic commands are generated and this agrees with the tabulation shown in Table I. It should be noted that in the case where none of the commands $A-X$, $A+X$ or $A+2$ are generated the ADD TREE responds to the command GATE TOP to gate the partial product applied to it from A to the A* register and nothing is added from the multiplicand register.

It is necessary to inject correction digits into the AQ register during the multiply operation. These digits are inserted into A00 and A01, the positions left empty when the AQ register is shifted to the right. Therefore, during the first eleven iterative cycles, it is necessary to inject digits into both A00 and A01 and on the last iteration cycle to inject a digit into A00 only.

The value of the digits which are injected depends upon the phase of the next iteration to be performed, the sign of the multiplicand (X00), and the value of the partial product at the end of the preceding iteration.

The INJECTOR PHASE, PARTIAL PRODUCT $\neq 0$, and PREVIOUS PARTIAL PRODUCT $\neq 0$ FF's and the gates associated with their outputs control the injection of correction digits into A00 and A01.

The rules for injecting digits are as follows:

Rule 1: If the next phase is to be Phase B, make A00 and A01 the complement of X00.

Rule 2: If in Phase A and the next phase is to be Phase A;

(a) Make A00 and A01 both 0 if the previous partial product is 0 and either nothing or X is being added.

(b) Make A00 and A01 the same as X00 if the previous partial product is not 0 and either nothing or X is being added.

(c) Make A00 the same as X00 and insert the overflow digit from the ADD TREE into A01 if 2X is being added and the partial product is not 0.

Rule 3: On the last iterative cycle make A00 the same as X00.

Returning now to the injection circuits shown in FIGURE 9d, the INJECTOR PHASE FF is set if $Q*23$ is a binary 1, $Q*22$ is a binary 1, and the iteration counter does not contain a zero value. Under these conditions $\overline{AND}$ 1029 is conditioned to set the INJECTOR PHASE FF. As explained above, $Q*23=Q*22=1$ is an indication that the iteration is to take place in Phase B. Thus, if the next iteration cycle is in Phase B the injector phase flip-flop is set at MP3, 7, 11, or 15 (depending on the iteration cycle) when the multiplier digits in AQ are transferred to $A*Q*$.

Once set, the injector phase flip-flop remains set until such time as the next iteration is to take place in Phase A. The lead 335 becomes positive if $Q*22$ is 0 and if the present phase is B, a positive signal on this lead is an indication that the next phase is Phase A. The positive signal on lead 335 is inverted at 1015 and applied to $\overline{AND}$ 1029 and the reset side of the INJECTOR PHASE FF. This blocks gate 1029 and resets the flip-flop.

The output off the set side of the INJECTOR PHASE FF is connected to $\overline{AND}$ 1030 which receives a second input over lead 219. Lead 219 is positive if the sign of the multiplicand is positive, that is, $\overline{X00}=1$.

The output of $\overline{AND}$ 1030 is inverted at 1032 and applied to NOT 1033 and $\overline{AND}$ circuits 998 and 999. The output of 1033 is connected to $\overline{AND}$ circuits 1000 and 1001.

The output off the reset side of the INJECTOR PHASE FF is connected to $\overline{AND}$ circuits 1034 and 975. Gate 1034 also receives an indication of the sign of the multiplicand over lead 218 and its output is connected to NOR 1032. The output of 975 is connected to $\overline{AND}$ circuits 999 and 1001. The output of 975 is also inverted to 1036 to become the command $A*-1$ to A01.

The injection gates 998 through 1001 are conditioned by a positive voltage on lead 997. This lead is made positive under two conditions. First, with the MULTIPLY ITERATION 2 FF set, clock pulses occurring at MP3, 7, 11, and 15 on lead 991 pass through $\overline{AND}$ 995 and NOR 996 to become positive pulses on lead 997. Second, at the end of the iterative cycles the MULTIPLY END CORRECTION FF is set and conditions one input of $\overline{AND}$ 1037 so that an MP15 pulse appearing on lead 936 passes through 1037 and NOR 996 to make lead 997 positive.

Injection gates 999 and 1001 are also conditioned by a positive signal on lead 1008. This lead is positive as long as the MULTIPLY ITERATION 2 FF is set, but becomes negative when the flip-flop is reset at the beginning of the end correction operation.

The PARTIAL PRODUCT $\neq 0$ FF is set if either $\overline{AND}$ 1038 or $\overline{AND}$ 1039 is conditioned. When the MULTIPLY ITERATION 1 FF is set at the first MP15, it conditions $\overline{AND}$ 978 which then produces negative output signals at MP1, 5, 9, and 13 as long as the flip-flop is set and the ITERATION COUNTER contains a count greater than 2. These signals are inverted at 1040 and condition one input of gates 1038 and 1039. Gate 1038 is also conditioned by a positive signal on lead 984 as long as the iteration counter contains a value greater than 2. Also, when the ITERATION COUNTER is reduced to a count of one the positive signal on lead 982 conditions 979 which then passes MP1, 5, 9 and 13 pulses through NOR 1040 to gates 1038 and 1039.

When $\overline{AND}$ 978 passes the first pulse at MP1, the PARTIAL PRODUCT $\neq 0$ FF is set by gate 1038 if lead 432 is positive indicating multiplier digit Q22 is a binary 1 or is set by gate 1038 if lead 434 is positive indicating Q23 is a binary 1. If both Q22 and Q23 are zero then the flip-flop is not set. Q22 and Q23 are thus sampled at each MP1, 5, 9, and 13 until a non-zero multiplier digit is found. Once set, the PARTIAL PRODUCT $\neq 0$ FF remains set until MP3 of the end correction cycle.

The output from the set side of the PARTIAL PRODUCT $\neq 0$ FF is connected to $\overline{AND}$ circuits 1034 and 1002. Gate 1042 also receives positive signals appearing on lead 997 and if the PARTIAL PRODUCT $\neq 0$ FF is set the output of 1002 sets the PREVIOUS PARTIAL PRODUCT $\neq 0$ FF. The output off the set side of this flip-flop is inverted at 1043 and becomes the signal PREVIOUS PARTIAL PRODUCT $\neq 0$ which is connected to the ADD TREE of FIGURE 6.

According to Rule 1 for injection, A00 and A01 are made the opposite of X00 if the next iteration is in phase B. The INJECTOR PHASE FF is set and if X00 is a 1 lead 219 blocks $\overline{AND}$ 1030. The positive output of 1030 is inverted to 1032, inverted again at 1033, and conditions gate 1000 and 1001. With the INJECTOR PHASE FF SET $\overline{AND}$ 975 is blocked and its output conditions another input of 1001. The negative outputs from 1000 and 1001 clear A00 and A01 respectively. If X00 equals 0, lead 219 conditions $\overline{AND}$ 1030. The negative output of 1030 is inverted at 1033 and conditions 998 and 999. Again, gate 975 is blocked and conditions a second input of 999. With the other inputs being positive as previously described, 998 and 999 produce output signals to set A00 and A01.

According to Rule 2a, if the next phase is phase A, and the previous partial product is 0, both A00 and A01 should be filled with zeros if either nothing or X is being added. The INJECTOR PHASE FF is reset and the PARTIAL PRODUCT $\neq 0$ FF is reset. $\overline{AND}$ 1030 is blocked by the negative output from the set side of the INJECTOR PHASE FF and makes one input of NOR 1032 positive. The negative output from the set side of the PARTIAL PRODUCT $\neq 0$ FF blocks $\overline{AND}$ 1034 causing a positive signal to be applied to the second input of NOR 1032. The negative output of 1032 is inverted at 1033 and conditions 1000 and 1001. Lead 335 is positive because $Q*22$ equals 0 and this signal is inverted at 1015 and applied to $\overline{AND}$ 975. This blocks 975 which then produces a positive output to condition another input of 1001. An MP3, 7, 11, or 15 pulse (depending on the iteration cycle) sample gates 1000 and 1001 to produce the signals CLEAR A00 and CLEAR A01.

According to Rule 2B, A00 and A01 are made the same as X00 if the previous partial product is not equal to 0 and either nothing or X is being added. Again, $Q*22$ equals 0 so $\overline{AND}$ 975 produces a positive output signal to condition gates 999 and 1001. The PARTIAL PRODUCT $\neq 0$ FF conditions one input of $\overline{AND}$ 1034. A second input is conditioned by the positive signal off the reset side of the INJECTOR PHASE FF. If X00 is a 1, all inputs of 1034 are conditioned and the negative output signal is inverted at 1032 before being applied to 998 and 999. These gates then produce the signals SET A00 and A01. If X00 is a 0 then $\overline{AND}$ 1034 is blocked. The positive output signal is inverted at 1032 and 1033 and conditions gates 1000 and 1001 to produce the signals CLEAR A00 and CLEAR A01.

According to Rule 2C, A00 is made equal to X00 and the over-flow digit from the ADD TREE is inserted into A01 if 2X is being added and the next iteration is phase A. Under these conditions $Q*22$ is a 1 so the negative signal appearing on lead 335 is inverted at 1015 and conditions one input of $\overline{\text{AND}}$ 975. The positive signal off the reset side of the INJECTOR PHASE FF conditions the second input of 975 which then produces a negative output signal. This signal is inverted at 1036 and becomes the command signal $A*-1$ to A01 which conditions the readout gates on the output of $A*-1$ in FIG. 7a. With the PARTIAL PRODUCT $\neq 0$ FF set and the INJECTOR PHASE FF reset, the output of 1034 is negative if X00 is a 1. The output of 1034 is inverted at 1032 and conditions one input of gates 999 and 998, the latter gate producing the signal SET A00. If X00 is a 0, then the output of 1034 is a positive signal which is inverted at 1032 and 1033 to condition gates 1000 and 1001. The gate 1000 produces a signal to reset A00. Gates 999 and 1001 are not conditioned to either set or reset A01 at this time. With Q*22 equal to 1 $\overline{\text{AND}}$ 975 produces a negative output signal to block 999 and 1001.

According to Rule 3 for injection, on the twelfth iteration cycle A00 is made the same as X00 with nothing being done to A01. The reason for this is that the last iteration is not the same as the preceding iterations because only one multiplier digit is sensed to control the arithmetic operation. The single digit Q*23 is sensed at MP11 of the eleventh iteration cycle, the new partial product entered into A*Q* at MP13 of the twelfth iteration cycle, and A*Q* transferred to A* with a shift of one binary place to the right at MP15 of the twelfth iteration cycle.

The injection according to Rule 3 is accomplished as follows. With the INJECTOR PHASE FF reset ($K*=0$) and the PARTIAL PRODUCT $\neq 0$ FF set the output of 1034 is negative if X00 is a 1. The output of 1034 is inverted at 1032 and conditions gate 998 to produce the signal set A00. If X00 is a 0 then 1034 produces a positive output signal which is inverted at 1032 and 1033 and conditions gate 1000 to produce the signal CLEAR A00.

At MP7 of the 10th iteration cycle (see FIGURE 11) K is transferred to K*. This places the value 3 in K* which produces a positive signal on lead 983 in FIG. 9b. With the MULTIPLY ITERATION 1 FF set and lead 983 positive $\overline{\text{AND}}$ 980 produces an output signal at MP9 that passes through NOR 928 and NOT 929 to reset the EXTENDED SEQUENCE FF.

At MP11 of the eleventh iteration cycle K is again transferred to K*. This places the value 1 in K* which produces a positive signal on lead 982. With the MULTIPLY ITERATION 1 FF set and lead 982 positive $\overline{\text{AND}}$ 979 produces an output signal at MP13. This signal resets the MULTIPLY ITERATION 2 FF and sets the MULTIPLY END CORRECTION FF. The output of 979 also passes through NOR 1040 to condition the gates 1038 and 1039 on the input to the PARTIAL PRODUCT $\neq 0$ FF. During the first eleven iteration cycles, the output of $\overline{\text{AND}}$ 978 has been conditioning 1038 and 1039 but with $K*=1$ the lead 984 becomes negative and blocks gate 978. It will be noted that on the last iteration cycle both 1038 and 1039 are conditioned by the output signal from 979 but only 1039 may set the PARTIAL PRODUCT $\neq 0$ FF since 1038 is blocked by the negative signal on lead 984. Thus, on the twelfth iteration cycle only the bit Q23 is sensed for the purpose of setting the PARTIAL PRODUCT $\neq 0$ FF.

When the MULTIPLY ITERATION 2 FF is reset at MP11, gates 990, 992, and 993 are blocked thereby preventing further production of the commands Q* to Q(R2), A* to A(R2), and K to K*. The input of NOR 989 from the flip-flop becomes positive so the command AQ DOUBLE LENGTH is no longer produced by the flip-flop. Also, when the MULTIPLY ITERATION 2 FF is reset $\overline{\text{AND}}$ 995 is blocked. This causes a negative voltage level on lead 997 to block the gates 998 through 1001 that inject the correction digits into A00 and A01.

To provide for the injection of A00 only during the twelfth iteration cycle the output off the set side of the MULTIPLY END CORRECTION FF conditions $\overline{\text{AND}}$ 1037. The next MP15 pulse passes through 1037 and NOR 996 to make lead 997 positive. This conditions one input of the injection gates 998 through 1001 so that a correction digit may be injected into A00.

The output off the reset side of the MULTIPLY END CORRECTION FF is inverted at 1044 and conditions one input of $\overline{\text{AND}}$ 1045. The output off the set side of the MULTIPLY END CORRECTION FF conditions one input of AND 1037. At MP15 a clock pulse appears on lead 936 and is applied to gates 1037 and 1045. The output of 1037 becomes the commands A* to A(R1), and Q* to Q(R1). The output of 1045 is inverted at 994 and becomes the command K to K* which transfers a 0 value from K to K*.

With $K*=0$, a negative signal appears on lead 1046 (FIG. 9d) to reset the INJECTOR PHASE FF if it is set.

The MULTIPLY END CORRECTION FF also produces the command AQ DOUBLE LENGTH so that when A and Q are right shifted one place into A*Q*, the low order bit of A will enter the high order position of Q*. The circuit for this command is from the set side of the MULTIPLY END CORRECTION FF through NOT 1047 and NOR 989.

The output off the set side of the MULTIPLY END CORRECTION FF is connected to $\overline{\text{AND}}$ circuits 1048, 1049, and 1050. At MP1 of the end correction cycle the clock pulse appearing on lead 944 passes through $\overline{\text{AND}}$ 1048, NOR 934 and NOT 935 to produce the command GATE TOP 2. With the MULTIPLY ITERATION 1 FF reset NOT 907 produces a positive output signal to condition $\overline{\text{AND}}$ 1049 which produces a negative output signal if Q23 is a binary 1. This signal passes through NOR 909 and NOT 910 to become the command $A-X$. Therefore, if Q23 contains a 1 at MP1 of the end correction cycle, indicating the sign of the multiplicand is minus, the multiplicand in X in subtracted from the partial product in A and the result entered into A*.

At MP3 a clock pulse appearing on lead 1051 passes through $\overline{\text{AND}}$ 1050 to clear Q23 and Q*23 and reset the PARTIAL PRODUCT $\neq 0$ and PREVIOUS PARTIAL PRODUCT $\neq 0$ FF's.

At MP4 the twenty-three low order digits of the product are transferred from Q* to Q and the twenty-three high order digits and the sign are transferred from A* to A. The MP4 clock pulse appearing on lead 960 passes through NOR 1052, NOR 978, and NOT 977 to generate the command Q* to Q. The MP4 pulse on lead 960 also passes through AND 957, NOR 945, and NOT 946 to generate the command A* to A.

At MP5 an inverted clock pulse appears on lead 1053 to reset the MULTIPLY END CORRECTION FF. An MP5 pulse on lead 930 passes through $\overline{\text{AND}}$ 903 to clear the K and K* Registers in the ITERATION COUNTER. This completes the multiply operation.

Various modifications in the form and details of the invention as described above will be obvious to those skilled in the art. For example, a double length, double rank register may be substituted for the double rank register A and A* thereby eliminating the requirement that the A and Q registers be interconnected during shift operations. With this arrangement Q may be a single rank register with the ability to shift to the right. It is intended therefore to be limited only by the scope of the appended claims.

We claim:
1. A binary device for performing the multiplication of a multiplicand by an N-digit multiplier in a plurality of iterative cycles, said device comprising: an iteration counter; means for initially setting said counter to a count of $N-1$; means for reducing said count by two on each iterative cycle; multiplier, multiplicand and product storage means; means responsive to said iteration counter for sensing the two low order digits of said multiplier on each iterative cycle when said counter contains a count greater than one and sensing the low order digit of said multiplier when said counter contains a count of one; arithmetic means responsive to said multiplicand storage means and said partial product storage means for entering partial products into said partial product storage means; control means responsive to said sensing means for controlling said arithmetic means to add zero, one, two, or minus one, times said multiplicand to said product storage means; means responsive to said iteration counter for shifting said mulitplier and the content of said product storage means two positions toward the order of least significance on each iterative cycle when said counter contains a count greater than one and only one position when said counter contains a count of one; and means responsive to said iteration counter for injecting a correction digit into any order of said product storage means which receives no input during said shift.

2. A binary device for performing the multiplication of a multiplicand by an N-digit multiplier in a plurality of iterative cycles, said device comprising: multiplier, multiplicand, and product storage means; means for sensing the two low order digits of said multiplier; phase control means responsive to said sensing means for controlling the phase of the next cycle, said phase control means having a set state and a reset state; arithmetic means having one input connected to said multiplicand storage means and one input and an output connected to said product storage means; arithmetic control means responsive to said phase control means and said sensing means for controlling said arithmetic means to add zero, one, two or minus one, times said multiplicand to said product storage means; means for shifting said multiplier and the content of said product storage means towards the order of least significance; means for injecting correction digits into any order of said product storage means which receives no input during said shift, said means for injecting correction digits comprising normally reset partial product indicating means; means for setting said partial product indicating means on the first iterative cycle in which either of the two low order multiplier digits is a binary one; injection phase control means responsive to the two low order multiplier digits on one cycle for controlling the injection of correction digits on the next cycle; and gating means responsive to said partial product indicating means, said injection phase control means, the next the low order multiplier digit, and the most significant order of the multiplicand storage means for injecting said correction digits into said product storage means.

3. A binary multiplier as claimed in claim 2 wherein said gating includes first circuit means for injecting the complement of the digit of the most significant order of said multiplicand storage means into the two most significant orders of said product storage means if said injection phase control means is set; second circuit means for injecting binary zeros into the two most significant orders of said product storage means if said injection phase control means and partial product indicating means are reset and the next to the low order multiplier digit is a binary zero; and third circuit means for making the digits in the two most significant orders of said product storage means the same as the digit in the most significant order of said multiplicand storage means if said injection phase control means is reset, said partial product indicating means is set, and the next to the low order multiplier digit is a binary zero.

4. A binary multiplier as claimed in claim 3 and further comprising means for storing an overflow digit from said arithmetic element; said gating means including fourth circuit means for making the digit in the most significant order of said product storage means the same as the digit in the most significant order of said multiplicand storage means and inserting said overflow digit into the next to the most significant order of said product storage means if said partial product indicating means is set, said injection phase control means is reset, and the next to the low order multiplier digit is a binary one.

5. A binary device for performing the multiplication of a multiplicand by an N-digit multiplier in a plurality of iterative cycles, said device comprising: multiplier, multiplicand and product storage means; means for sensing the two low order digits of said multiplier; phase control means responsive to said sensing means for controlling the phase of the next cycle, said phase control means having a set state and a reset state; arithmetic means having one input connected to said multiplicand storage means and one input and an output connected to said product storage means; arithmetic control means responsive to said phase control means and said sensing means for controlling said arithmetic means to add zero, one, two, or minus one, times said multiplicand to said product storage means; means for shifting said multiplier and the content of said product storage means towards the order of least significance; means for injecting correction digits into any order of said product storage means which receives no input during said shift; said phase control means being initially reset but setable by signals from said sensing means if the low order multiplier digits on the preceding cycle were both ones, said phase control means being reset by a signal from said sensing means indicating that the next to the low order multiplier digit on the preceding cycle was a zero.

6. A binary device as claimed in claim 5 wherein said arithmetic control means controls said arithmetic means to add 0, 1, 2 or −1 times said multiplicand to said product storage register if the low order multiplier digits are 00, 01, 10 or 11 respectively and said phase control means is reset, and said arithmetic control means controls said arithmetic means to add 1, 2, −1, or 0 times said multiplicand to said product storage register if the low order multiplier digits are 00, 01, 10, or 11 respectively and said phase control means is set.

7. A binary multiplier as claimed in claim 6 wherein said means for injecting correction digits comprises normally reset partial product indicating means; means for setting said partial product indicating means on the first iterative cycle in which either of the two low order multiplier digits is a binary 1, injection phase control means responsive to the two low order multiplier digits on one cycle for controlling the injection of correction digits on the next cycle; and gating means responsive to said partial product indicating means, said injection phase control means, the next to the low order multiplier digit, and the most significant order of said multiplicand storage means for injecting said correction digits into said product storage means.

8. A binary multiplier as claimed in claim 7 wherein said gating means includes first circuit means for injecting the complement of the digit of the most significant order of said multiplicand storage means into the two most significant orders of said product storage means if said injection phase control means is set; second circuit means for injecting binary zeros into the two most significant orders of said product storage means if said injection phase control means and partial product indicating means are reset and the next to the low order multiplier digit is a binary zero; and the third circuit means for making the digits in the two most significant orders of said product storage means the same as the digit in the most significant order of said multiplicand storage means if said injection phase control means is reset, said partial product indicating means is set, and the next to the low order multiplier digit is a binary zero.

9. A binary multiplier as claimed in claim 8 and further comprising means for storing an overflow digit from said arithmetic element; said gating means including fourth circuit means for making the digit in the most significant order of said product storage means the same as the digit in the most significant order of said multiplicand storage means and inserting said overflow digit into the next to the most significant order of said product storage means if said partial product indicating means is set, said injection phase control means is reset, and the next to the low order multiplier digit is a binary one.

10. A binary multiplier for performing the multiplication of two binary numbers in a series of iterative cycles each including an arithmetic operation followed by a shifting operation, said multiplier comprising; multiplier and accumulator storage means each having an upper rank and a lower rank; multiplicand storage means; gating means connected to the output of said multiplicand storage means; arithmetic means having inputs connected to said gating means and the upper rank of said accumulator storage means and an output connected to the lower rank of said accumulator storage means; arithmetic control means responsive to the two low order multiplier digits on each cycle for causing said gating means to apply 0, 1, or 2 times said multiplicand or the complement of said multiplicand to said arithmetic means if said multiplier digits are 00, 01, 10, or 11, respectively; means for transferring the content of the upper rank of said multiplier storage means to the lower rank thereof; means for transferring the content of the lower ranks of said multiplier and accumulator storage means to the upper ranks thereof with a shift of two binary orders towards the digit of least significance; means for injecting correction digits into the two most significant orders of the upper rank of said accumulator storage means; means for selectively connecting the two low orders of the lower rank of said accumulator storage means to the two high orders of the upper rank of said multiplier storage means; and phase control means having a set state and a reset state, said phase control means being responsive to the two low order multiplier digits on one cycle for modifying the response of said arithmetic control means to the low order multiplier digits of the next cycle.

11. A binary multiplier as claimed in claim 10 wherein said phase control means is set at the end of a cycle if the low order multiplier digits in that cycle are both ones and remain set until the end of a cycle in which the next to the low order multiplier digit is a zero.

12. A binary multiplier as claimed in claim 11 wherein said means for injecting correction digits comprises normally reset partial product indicating means; means for setting said partial product indicating means on the first iterative cycle in which either of the two low order multiplier digits is a binary 1; injection phase control means responsive to the two low order multiplier digits on one cycle for controlling the injection of correction digits on the next cycle; and gating means responsive to said partial product indicating means, said phase control means, the next to the low order multiplier digit, and the most significant order of said multiplicand storage means for injecting said correction digits into said product storage means.

13. A binary multiplier as claimed in claim 12 wherein said gating means includes first circuit means for injecting the complement of the digit of the most significant order of the multiplicand storage means into the two most significant orders of said product storage means if said injection phase control means is set; second circuit means for injecting binary zeros into the two most significant orders of said product storage means if said injection phase control means and partial product indicating means are reset and the next to the low order multiplier digit is a zero; and third circuit means for making the digits in the two most significant orders of said product storage means the same as the digit in the most significant order of said multiplicand storage means if said injection phase control means is reset, said partial product indicating means is set, and the next to the low order multiplier digit is a binary zero.

14. A binary multiplier as claimed in claim 13 and further comprising means for storing an overflow digit from said arithmetic means, said gating means including fourth circuit means for making the digit in the most significant order of said product storage means the same as the digit in the most significant order of said multiplicand storage means and inserting said overflow digit into the next to the most significant order of said product storage means if said partial product indicating means is set, said injection phase control means is reset, and the next to the low order multiplier digit is a binary one.

15. In a binary multiplier for developing the product of two signed binary numbers in a plurality of iterative cycles and wherein negative numbers are represented in twos complement form, the improvement comprising: first means for manifesting said two binary numbers as first and second groups of electrical signals; second means responsive to said first and second groups of electrical signals for producing a first signal when said first binary number has a value of $-1$ and a second signal when said second binary number has a value of $-1$; and third means responsive to said first means and said second means when said second means produces said first but not said second signal for exhibiting in one iterative cycle the complement of said second number as the product.

16. In a binary multiplier as claimed in claim 15 the further improvement comprising four means responsive to said second means when said second means produces both said first and said second signals for producing an error signal.

17. In a binary multiplier for developing the product of two signed binary numbers in a plurality of iterative cycles and wherein negative numbers are represented in twos complement form, the improvement comprising: register means; means for entering first and second binary numbers into said register means; a first bistable element having a set state and a reset state; means responsive to said register means for setting said first bistable element when said first binary number has the value $-1$; a second bistable element having a set state and a reset state; means responsive to said register means for setting said second bistable element when said second binary number has the value $-1$; and means responsive to said register means and said bistable elements for complementing said second binary number when said first bistable element is set and said second bistable element is reset.

References Cited by the Examiner

UNITED STATES PATENTS 2,856,126  10/58  Kilburn _____ 235—164
3,069,085  12/62  Cooper et al. _____ 235—164

OTHER REFERENCES

"Synthesis of Electronic Computing and Control Circuits," Harvard University Press, published May 17, 1951 (pp. 195–204, 6 pages as photostated).

MALCOLM A. MORRISON, *Primary Examiner.*

WALTER W. BURNS, Jr., *Examiner.*

UNITED STATES PATENT OFFICE
CERTIFICATE OF CORRECTION

Patent No. 3,192,366

June 29, 1965

Leslie L. Cochran et al.

It is hereby certified that error appears in the above numbered patent requiring correction and that the said Letters Patent should read as corrected below.

Column 3, lines 64 and 65, for "O*", each occurrence, read -- Q* --; column 4, line 32, for "enetred" read -- entered --; column 7, line 20, for "314" read -- 214 --; line 61, for "tre" read -- the --; column 8, line 11, after "possibility" insert -- of --; line 56, for "A*22", first occurrence, read -- $\overline{A*22}$ --; column 13, line 47, for "632" read -- 642 --; column 14, line 29, for "A*23", second occurrence, read -- A*20 --; column 24, lines 8 and 9, for "FIGURE 11", each occurrence, read -- FIGURE 12 --; same column 24, after line 9, insert the following:

$$Mc = 0.11000000000000000000 \text{ and}$$
$$Mp = 0.11000000000000001101.$$

column 38, line 32, for "four" read -- fourth --.

Signed and sealed this 15th day of March 1966.

(SEAL)
Attest:

ERNEST W. SWIDER
Attesting Officer

EDWARD J. BRENNER
Commissioner of Patents